United States Patent
Sato

(10) Patent No.: US 10,687,060 B2
(45) Date of Patent: Jun. 16, 2020

(54) DECODING DEVICE, DECODING METHOD, ENCODING DEVICE, AND ENCODING METHOD

(71) Applicant: SONY CORPORATION, Tokyo (JP)

(72) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 44 days.

(21) Appl. No.: 15/023,156

(22) PCT Filed: Oct. 2, 2014

(86) PCT No.: PCT/JP2014/005027
§ 371 (c)(1),
(2) Date: Mar. 18, 2016

(87) PCT Pub. No.: WO2015/052898
PCT Pub. Date: Apr. 16, 2015

(65) Prior Publication Data
US 2016/0255346 A1    Sep. 1, 2016

(30) Foreign Application Priority Data

Oct. 11, 2013  (JP) .................. 2013-214118

(51) Int. Cl.
*H04N 19/122* (2014.01)
*H04N 19/176* (2014.01)
(Continued)

(52) U.S. Cl.
CPC ......... *H04N 19/122* (2014.11); *H04N 19/126* (2014.11); *H04N 19/157* (2014.11); *H04N 19/176* (2014.11); *H04N 19/70* (2014.11)

(58) Field of Classification Search
CPC ... H04N 19/122; H04N 19/126; H04N 19/176
See application file for complete search history.

(56) References Cited

U.S. PATENT DOCUMENTS

2013/0343464 A1* 12/2013 Van der Auwera .......................... H04N 19/176
375/240.18
2014/0064381 A1* 3/2014 Terada ................. H04N 19/463
375/240.24

(Continued)

FOREIGN PATENT DOCUMENTS

| CN | 104521232 A | 4/2015 |
|---|---|---|
| GB | 2492333 A | 1/2013 |
| WO | WO2013/001279 A2 | 1/2013 |

OTHER PUBLICATIONS

Won, et al., Transform skip based on minimum TU size, Joint Collaborative Team on Video Coding (JCT-VC) of ITU-T SG16 WP3 and ISO/IEC JTC1/SC29/WG11, Jul. 25-Aug. 2, 2013, pp. 1-10, 14$^{th}$ Meeting: Vienna, AT.

(Continued)

*Primary Examiner* — Mainul Hasan
(74) *Attorney, Agent, or Firm* — Paratus Law Group, PLLC

(57) ABSTRACT

A decoding device, including circuitry configured to decode a bit stream and generate a quantized value, and inversely quantize the generated quantized value by using a flat scaling list, in a case where a block size of a transform block to which a transform skip is applied is larger than a 4 by 4 block size.

9 Claims, 37 Drawing Sheets

(51) Int. Cl.
*H04N 19/126* (2014.01)
*H04N 19/70* (2014.01)
*H04N 19/157* (2014.01)

(56) References Cited

U.S. PATENT DOCUMENTS

| | | | |
|---|---|---|---|
| 2014/0079329 A1* | 3/2014 | Shibahara | H04N 19/463 382/233 |
| 2014/0086311 A1* | 3/2014 | Lou | H04N 19/30 375/240.03 |
| 2014/0146894 A1* | 5/2014 | Yu | H04N 19/70 375/240.18 |
| 2014/0254674 A1* | 9/2014 | Lee | H04N 19/593 375/240.12 |
| 2015/0189289 A1* | 7/2015 | Kim | H04N 19/126 375/240.02 |
| 2015/0189327 A1* | 7/2015 | Kondo | H04N 19/00 382/233 |
| 2015/0326863 A1* | 11/2015 | Francois | H04N 19/176 375/240.24 |

OTHER PUBLICATIONS

Peng, et al., Non-RCE2: Transform skip on large TUs, JCTVC-N0288_r1, Joint Collaborative Team on Video Coding (JCT-VC) of ITU-T SG16 WP3 and ISO/IEC JTC1/SC2/WG11, Jul. 25-Aug. 2, 2013, pp. 1-5, 14$^{th}$ Meeting: Vienna, AT.
Flynn, et al., High Efficiency Video Coding (HEVC) Range Extension text specification: Draft 4, Joint Collaborative Team on Video Coding (JCT-VC) of ITU-T SG16 WP3 and ISO/IEC JTC1/SC29/WG11, Apr. 18-26, 2013, pp. i-309, 13$^{th}$ Meeting: Incheon, KR.
Peng, et al., Non-RCE2: Transform skip on large TUs, JCTVC-N0288, Joint Collaborative Team on Video Coding (JCT-VC) of ITU-T SG16 WP3 and ISO/IEC JTC1/SC29/WG11, Jul. 25-Aug. 2, 2013, pp. 1-5, 14$^{th}$ Meeting: Vienna, AT.
Sharman, et al., Transform Skip and Scaling Lists, Joint Collaborative Team on Video Coding (JCT-VC) of ITU-T SG16 WP3 and ISO/IEC JTC1/SC29/WG11, Oct. 23-Nov. 1, 2013, pp. 1-5, 15$^{th}$ Meeting: Geneva, CH.

Flynn, et al., Transform Skipping in the presence of Scaling Lists, Joint Collaborative Team on Video Coding (JCT-VC) of ITU-T SG16 WP3 and ISO/IEC JTC1/SC29/WG11, Jul. 11-20, 2012, pp. 1-6, 10$^{th}$ Meeting: Stockholm, SE.
Morigami, et al., On Transform Skip, Joint Collaborative Team on Video Coding (JCT-VC) of ITU-T SG16 WP3 and ISO/IEC JTC1/SC29/WG11, Jul. 11-20, 2012, pp. 1-12, 10$^{th}$ Meeting: Stockholm, SE.
Kim, et al., QM Bypass for Transform Skip Mode, Joint Collaborative Team on Video Coding (JCT-VC) of ITU-T SG16 WP3 and ISO/IEC JTC1/SC29/WG11, Jul. 11-20, 2012, pp. 1-5, 10$^{th}$ Meeting: Stockholm, SE.
Dec. 6, 2016, JP communication issued for related JP application No. 2013-214118.
Jun. 6, 2018, Chinese Office Action issued for related CN Application No. 201480054820.7.
May 2, 2017, JP communication issued for related JP application No. 2013-214118.
Wang, et al., High Efficiency Video Coding (HEVC) Defect Report, Joint Collaborative Team on Video Coding (JCT-VC) of ITU-T SG 16WP 3 and ISO/IEC JTC 1/SC 29/WG 11, Jul. 25-Aug. 2, 2013, pp. 1, 32-33, 67 and 144-145, 14$^{th}$ Meeting: Vienna, AT.
Peng, et al., Non-RCE2: Transform skip on large TUs, JCTVC-N0288_r3, Joint Collaborative Team on Video Coding (JCT-VC) of ITU-T SG16 WP3 and ISO/IEC JTC1/SC29/WG11, Jul. 25-Aug. 2, 2013, pp. 1-5, 14$^{th}$ Meeting: Vienna, AT.
Bross, et al., "Editors' proposed corrections to HEVC version 1", Joint Collaborative Team on Video Coding (JCT-VC) of ITU-T SG16 WP3 and ISO/IEC JTC1/SC29/WG11, Apr. 18-26, 2013, pp. i-298, 13$^{th}$ Meeting: Incheon, KR.
Oct. 30, 2018, Japanese Office Action issued for related JP Application No. 2018-005378.
Nov. 2, 2018, Chinese Office Action issued for related CN Application No. 201480054820.7.
Nov. 6, 2019, European Communication issued for related EP Application No. 14795676.7.
Apr. 17, 2020, European Communication issued for related EP Application No. 14795676.7.
Gabriellini et al., Adaptive transform skipping for improved coding of motion compensated residuals, Signal Processing: Image Communication, Elsevier, Dec. 5, 2012, pp. 197-208, vol. 28.

* cited by examiner

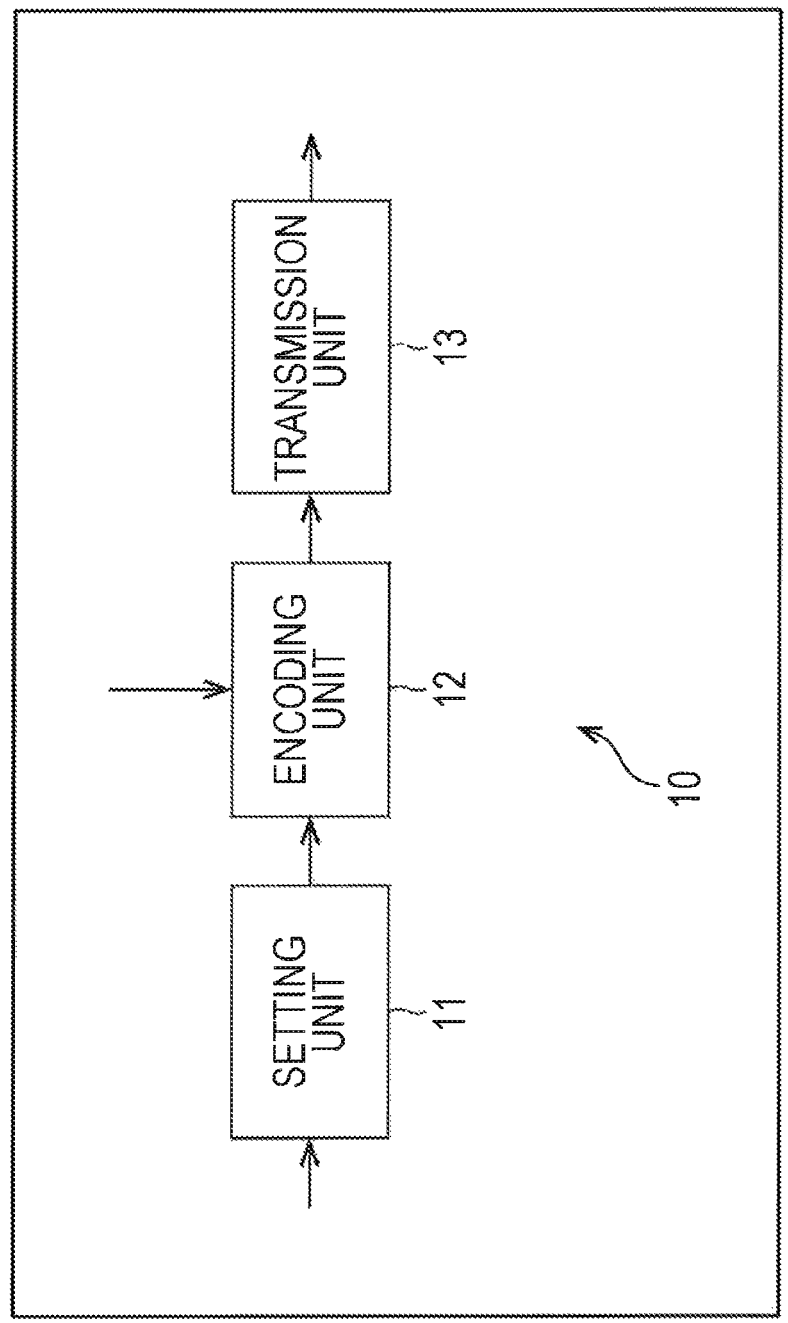

FIG. 2

| | Descriptor |
|---|---|
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |
|   profile_tier_level(sps_max_sub_layers_minus1) | |
|   sps_seq_parameter_set_id | ue(v) |
|   chroma_format_idc | ue(v) |
|   if(chroma_format_idc == 3) | |
|     separate_colour_plane_flag | u(1) |
|   pic_width_in_luma_samples | ue(v) |
|   pic_height_in_luma_samples | ue(v) |
|   conformance_window_flag | u(1) |
|   if(conformance_window_flag) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for(i = (sps_sub_layer_ordering_info_present_flag ? 0 : sps_max_sub_layers_minus1); i <= sps_max_sub_layers_minus1; i++) { | |
|     sps_max_dec_pic_buffering_minus1[i] | ue(v) |
|     sps_max_num_reorder_pics[i] | ue(v) |
|     sps_max_latency_increase_plus1[i] | ue(v) |
|   } | |
|   log2_min_luma_coding_block_size_minus3 | ue(v) |
|   log2_diff_max_min_luma_coding_block_size | ue(v) |
|   log2_min_transform_block_size_minus2 | ue(v) |
|   log2_diff_max_min_transform_block_size | ue(v) |
|   max_transform_hierarchy_depth_inter | ue(v) |
|   max_transform_hierarchy_depth_intra | ue(v) |
|   scaling_list_enabled_flag | u(1) |
|   if(scaling_list_enabled_flag) { | |
|     sps_scaling_list_data_present_flag | u(1) |
|     if(sps_scaling_list_data_present_flag) | |
|       scaling_list_data( ) | |
|   } | |
|   amp_enabled_flag | u(1) |
|   sample_adaptive_offset_enabled_flag | u(1) |
|   pcm_enabled_flag | u(1) |
|   if(pcm_enabled_flag) { | |
|     pcm_sample_bit_depth_luma_minus1 | u(4) |
|     pcm_sample_bit_depth_chroma_minus1 | u(4) |
|     log2_min_pcm_luma_coding_block_size_minus3 | ue(v) |
|     log2_diff_max_min_pcm_luma_coding_block_size | ue(v) |

FIG. 3

| | |
|---|---|
|     pcm_loop_filter_disabled_flag | u(1) |
| } | |
| num_short_term_ref_pic_sets | ue(v) |
| for( i = 0; i < num_short_term_ref_pic_sets; i++) | |
|     short_term_ref_pic_set(i) | |
| long_term_ref_pics_present_flag | u(1) |
| if(long_term_ref_pics_present_flag) { | |
|     num_long_term_ref_pics_sps | ue(v) |
|     for( i = 0; i < num_long_term_ref_pics_sps; i++) { | |
|         lt_ref_pic_poc_lsb_sps[i] | u(v) |
|         used_by_curr_pic_lt_sps_flag[i] | u(1) |
|     } | |
| } | |
| sps_temporal_mvp_enabled_flag | u(1) |
| strong_intra_smoothing_enabled_flag | u(1) |
| vui_parameters_present_flag | u(1) |
| if(vui_parameters_present_flag) | |
|     vui_parameters( ) | |
| sps_extension_flag | u(1) |
| if(sps_extension_flag) | |
|     while( more_rbsp_data( )) | |
|         sps_extension_data_flag | u(1) |
| rbsp_trailing_bits( ) | |
| } | |

*FIG. 4*

| pic_parameter_set_rbsp( ) { | Descriptor |
|---|---|
| pps_pic_parameter_set_id | ue(v) |
| pps_seq_parameter_set_id | ue(v) |
| dependent_slice_segments_enabled_flag | u(1) |
| output_flag_present_flag | u(1) |
| num_extra_slice_header_bits | u(3) |
| sign_data_hiding_enabled_flag | u(1) |
| cabac_init_present_flag | u(1) |
| num_ref_idx_l0_default_active_minus1 | ue(v) |
| num_ref_idx_l1_default_active_minus1 | ue(v) |
| init_qp_minus26 | se(v) |
| constrained_intra_pred_flag | u(1) |
| transform_skip_enabled_flag | u(1) |
| cu_qp_delta_enabled_flag | u(1) |
| if( cu_qp_delta_enabled_flag ) | |
|    diff_cu_qp_delta_depth | ue(v) |
| pps_cb_qp_offset | se(v) |
| pps_cr_qp_offset | se(v) |
| pps_slice_chroma_qp_offsets_present_flag | u(1) |
| weighted_pred_flag | u(1) |
| weighted_bipred_flag | u(1) |
| transquant_bypass_enabled_flag | u(1) |
| tiles_enabled_flag | u(1) |
| entropy_coding_sync_enabled_flag | u(1) |
| if( tiles_enabled_flag ) { | |
|    num_tile_columns_minus1 | ue(v) |
|    num_tile_rows_minus1 | ue(v) |
|    uniform_spacing_flag | u(1) |
|    if( !uniform_spacing_flag ) { | |
|      for( i = 0; i < num_tile_columns_minus1; i++ ) | |
|        column_width_minus1[ i ] | ue(v) |
|      for( i = 0; i < num_tile_rows_minus1; i++ ) | |
|        row_height_minus1[ i ] | ue(v) |
|    } | |
|    loop_filter_across_tiles_enabled_flag | u(1) |
| } | |
| pps_loop_filter_across_slices_enabled_flag | u(1) |
| deblocking_filter_control_present_flag | u(1) |
| if( deblocking_filter_control_present_flag ) { | |
|    deblocking_filter_override_enabled_flag | u(1) |
|    pps_deblocking_filter_disabled_flag | u(1) |
|    if( !pps_deblocking_filter_disabled_flag ) { | |
|      pps_beta_offset_div2 | se(v) |
|      pps_tc_offset_div2 | se(v) |
|    } | |
| } | |
| pps_scaling_list_data_present_flag | u(1) |

FIG. 5

| | |
|---|---|
| if( pps_scaling_list_data_present_flag ) | |
|   scaling_list_data( ) | |
| lists_modification_present_flag | u(1) |
| log2_parallel_merge_level_minus2 | ue(v) |
| slice_segment_header_extension_present_flag | u(1) |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

DECODING DEVICE, DECODING METHOD, ENCODING DEVICE, AND ENCODING METHOD

TECHNICAL FIELD

The present disclosure relates to a decoding device and a decoding method, and an encoding device and an encoding method, and more particularly, relates to a decoding device and a decoding method, and an encoding device and an encoding method, which can improve encoding efficiency in a case of applying transform skip to a block of a size other than 4 by 4 pixels.

CROSS REFERENCE TO RELATED APPLICATIONS

This application is a National Stage Patent Application of PCT International Patent Application No. PCT/JP2014/005027 filed on Oct. 2, 2014 under 35 U.S.C. § 371, which claims the benefit of Japanese Priority Patent Application JP 2013-214118 filed on Oct. 11, 2013, the entire contents of which are all incorporated herein by reference.

BACKGROUND ART

In recent years, devices based on a method such as MPEG (Moving Picture Experts Group phase) for performing compression with orthogonal transform such as discrete cosine transform and motion compensation by making use of redundancy unique to image information are widely spreading in not only information distribution such as a broadcast station but also information reception for ordinary households.

In particular, the MPEG2 (ISO/IEC 13818-2) method is defined as a general-purpose image coding method, and is a standard that covers both of interlaced scanning images and progressive scanning images, and standard resolution images and high resolution images. For example, MPEG2 is now widely used for wide range of applications such as professional use and consumer use. For example, in a case of an interlaced scanning image of a standard resolution of 720 by 480 pixels, the amount of codes (bit rate) of 4 to 8 Mbps is allocated. For example, in a case of an interlaced scanning image of a high resolution of 1920 by 1088 pixels, the amount of codes (bit rate) of 18 to 22 Mbps is allocated. Accordingly, a high compression rate and high image quality can be achieved by using the MPEG2 method.

MPEG2 is mainly targeted for high image quality coding suitable for broadcasting, but does not support coding method using less amount of codes (lower bit rate) than MPEG1. In other words, MPEG2 does not support a coding method of a higher compression rate. As portable terminals become widely prevalent, needs for such coding methods are considered to grow in the future, and in order to respond to such needs, MPEG4 coding method has been standardized. With regard to image coding method of MPEG4, the specification is admitted as ISO/IEC 14496-2 M international standard on December 1998.

Further, in recent years, a standard called H. 26L (ITU-T Q6/16 VCEG) has been standardized which was at first for the purpose of image coding of television conference. As compared with coding methods such as MPEG2 and MPEG4, H. 26L requires a higher amount of computation because of encoding and decoding process, but is known to achieve a higher encoding efficiency.

In recent Years, as a part of activity of MPEG4, Joint Model of Enhanced-Compression Video Coding has made standardization for achieving a higher encoding efficiency which is based on H. 26L and further employs functions not supported in H. 26L. This standardization has made into an international standard under the name of H. 264 and MPEG-4 Part 10 (AVC (Advanced Video Coding)) in March 2003.

Further, as an expansion thereof, FRExt (Fidelity Range Extension) including an encoding tool required for works on color difference signal formats such as 4:2:2 and 4:4:4, and RGB, and including 8 by 8 DCT (Discrete Cosine Transform) and quantization matrix defined in MPEG2, was standardized in February, 2005. Therefore, the AVC method is made into a coding method capable of finely expressing even film noises included in movies, and has made progress to be used in a wide range of applications such as BD (Blu-ray (registered trademark) Disc).

However, recently, the needs for a still higher compression rate encoding process, such as compression of an image having about 4000 by 2000 pixels which is about four times the high-definition television image or distributing a high-definition television image in an environment where there is only a limited transmission capacity such as the Internet, is growing. Therefore, VCEG (Video Coding Expert Group) under the ITU-T is continuing to study the improvement of the encoding efficiency.

Currently, in order to improve the encoding efficiency still greater than the AVC, JCT-VC (Joint Collaboration Team-Video Coding) which is a joint standardization organization of ITU-T and ISO/IEC has been standardizing an encoding method called HEVC (High Efficiency Video Coding). As of October 2013, NPL 1 has been issued as Draft.

However, where the size of TU (transform unit) is 4 by 4 pixels, the HEVC can use a function of transform skip in which orthogonal transform and inverse-orthogonal transform are not performed on the TU in question.

More specifically, when an image which is to be encoded is a nonnatural image such as a CG (Computer Graphics) image and a screen of a personal computer, 4 by 4 pixels is likely to be selected as the size of the TU. The encoding efficiency may increase when the orthogonal transform is not applied to nonnatural images. Therefore, when the size of TU is 4 by 4 pixels, the HEVC improves the encoding efficiency by allowing the transform skip to be applied.

On the other hand, in NPL 2, an encoding method is considered to improve images in color difference signal formats such as 4:2:2 and 4:4:4 and encoding of screen contents.

NPL 3, encoding efficiency is considered where transform skip is applied a TU having a size larger than 4 by 4 pixels.

Further, in NPL 4, when the minimum size of the TU is, for example, 8 by 8 pixels, which is other than 4 by 4 pixels, the transform skip is considered to be applied to the TU of the minimum size.

CITATION LIST

Non Patent Literature

NPL 1: Benjamin Bross, Gary J. Sullivan, Ye-Kui Wang, "Editors' proposed corrections to HEVC version 1", JCTVC-M0432_b3, 2013 Apr. 18-4.26

NPL 2: David Flynn, Joel Sole, Teruhiko Suzuki, "High Efficiency Video Coding (HEVC), Range Extension text specification: Draft 4", JCTVC-N1005_v1, 2013 Apr. 18-4.26

NPL 3: Xiulian Peng, Jizheng Xu, Liwei Guo, Joel Sole, Marta Karczewicz, "Non-RCE2: Transform skip on large Tus", JCTVC-N0288_r1, 2013 Jul. 25-8.2

NPL 4: Kwanghyun Won, Seungha Yang, Byeungwoo Jeon, "Transform skip based on minimum TU size", JCTVC-N0167, 2013 Jul. 25-8.2

SUMMARY OF INVENTION

Technical Problem

In the HEVC, during quantization of a TU in pixel domain where the transform skip is performed, a flat matrix is set as the default value of a scaling list for the TU having 4 by 4 pixels so as not to use a scaling list (quantization matrix) in a frequency domain other than the flat matrix. However, a matrix other than the flat matrix is set as the default value of a scaling list for a TU having a size other than 4 by 4 pixels.

Therefore, as described in NPL 3 and NPL 4, when the transform skip is applied to a TU having a size other than 4 by 4 pixels, a scaling list other than the flat matrix may be used during the quantization of the TU where the transform skip is performed. As a result, the encoding efficiency is reduced.

The present disclosure is made in view of such circumstances, and is to improve the encoding efficiency in a case of performing transform skip of a block having a size other than 4 by 4 pixels.

Solution to Problem

A decoding device according to an first embodiment of the present disclosure includes circuitry configured to decode a bit stream and generate a quantized value; and inversely quantize the quantized value by using a flat scaling list, in a case where a block size of a transform block to which a transform skip is applied is larger than a 4 by 4 block size.

A decoding method according to the first embodiment of the present disclosure corresponds to the decoding device according to the first embodiment of the present disclosure.

In the first embodiment of the present disclosure, a quantized value is generated by decoding the bit stream, and the quantized value is inversely quantized, using a flat scaling list, in a case where the block size of the transform block to which transform skip is applied is larger than a 4 by 4 block size.

An encoding device according to a second embodiment of the present disclosure includes: circuitry configured to generate a quantized value by quantizing a transform block to which transform skip is applied, using a flat scaling list, in a case where transform skip is applied to the transform block larger than a 4 by 4 block size; and encode the generated quantized value.

An encoding method according to the second embodiment of the present disclosure corresponds to the encoding device according to the second embodiment of the present disclosure.

In the second embodiment of the present disclosure, a quantized value is generated by quantizing a transform block to which transform skip is applied, using a flat scaling list, in a case where transform skip is applied to the transform block larger than a 4 by 4 block size, and the generated quantized value is encoded.

It should be noted that the decoding device of the first embodiment and the encoding device of the second embodiment can be realized by causing a computer to execute a program.

The program executed by the computer in order to realize the decoding device of the first embodiment and the encoding device of the second embodiment can be provided in such a manner that the program is transmitted via a transmission medium or the program is recorded to a recording medium.

The decoding device of the first embodiment and the encoding device of the second embodiment may be independent devices, or may be internal blocks constituting a single device.

Advantageous Effects of Invention

According to the first embodiment of the present disclosure, decoding can be performed. In addition, the encoded stream can be decoded, of which encoding efficiency where the transform skip is applied to a block of a size other than a 4 by 4 pixels has been improved.

According to the second embodiment of the present disclosure, encoding can be performed. The encoding efficiency where the transform skip is applied to a block of a size other than 4 by 4 pixels can be improved.

It should be noted that the effects described here are not necessarily limited, and may be any one of the effects described in the present disclosure.

BRIEF DESCRIPTION OF DRAWINGS

FIG. 1 is a block diagram illustrating an example of configuration of an embodiment of an encoding device to which the present disclosure is applied.

FIG. 2 is a figure illustrating an example of a syntax of SPS.

FIG. 3 is a figure illustrating an example of a syntax of SPS.

FIG. 4 is a figure illustrating an example of a syntax of PPS.

FIG. 5 is a figure illustrating an example of a syntax of PPS.

DESCRIPTION OF EMBODIMENTS

First Embodiment

Figure 6:
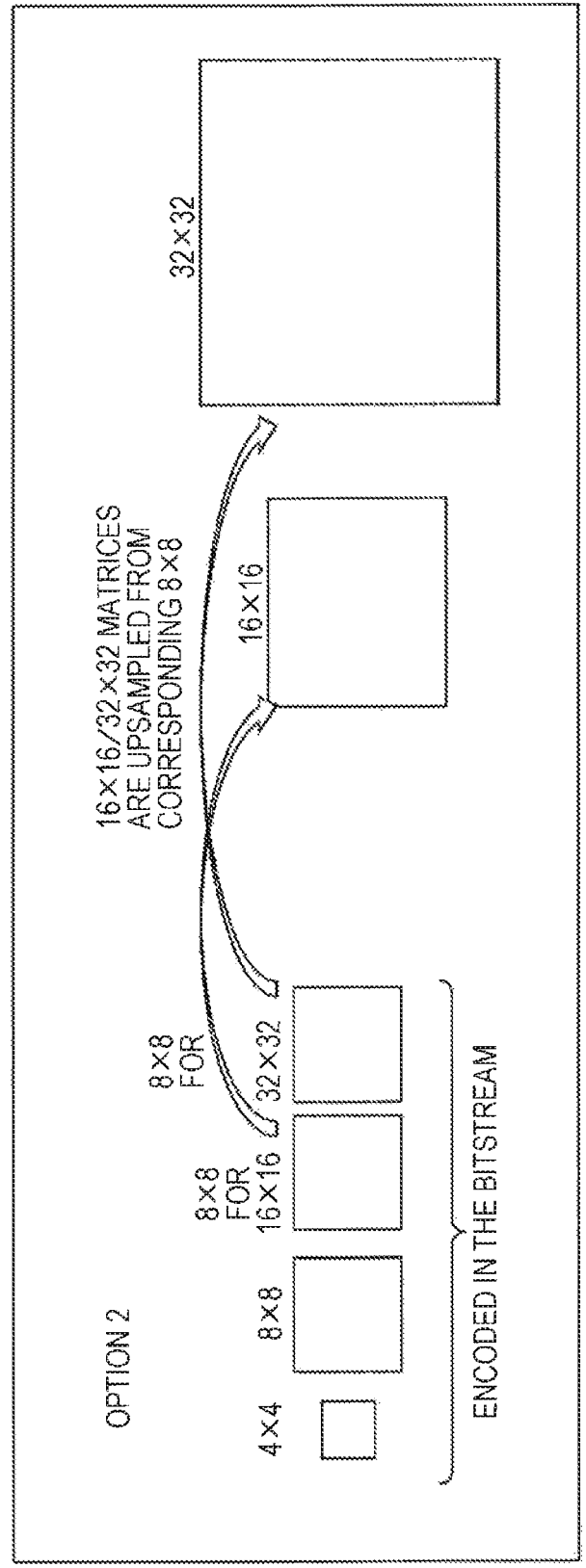
FIG. 6 is a figure for explaining a setting scaling list.

Example of Configuration of Embodiment of Encoding Device

FIG. 1 is a block diagram illustrating an example of configuration of an embodiment of an encoding device to which the present disclosure is applied.

An encoding device 10 of FIG. 1 includes a setting unit 11, an encoding unit 12, and a transmission unit 13, and encodes an image according to a method based on an HEVC method.

More specifically, the setting unit 11 of the encoding device 10 sets a SPS (Sequence Parameter Set) including minimum TU size information indicating the minimum size of the TU which is a size of a TU (orthogonal transform block) where transform skip can be performed in accordance with user's command and the like. The setting unit 11 also sets a PPS (Picture Parameter Set) including skip permission information indicating whether application of transform skip to the TU of the minimum size is permitted or not. Further, the setting unit 11 sets VUI (Video Usability Information), SEI (Supplemental Enhancement Information), and the like. The setting unit 11 provides the encoding unit 12 with parameter set such as SPS, PPS, VUI, SEI, which have been set.

The encoding unit 12 receives images in units of frames. The encoding unit 12 refers to the parameter set provided from the setting unit 11 to encode the received image according to the method based on the HEVC method. The encoding unit 12 generates an encoded stream from the parameter set and the encoded data generated as a result of encoding, and provides the encoded stream to the transmission unit 13.

The transmission unit 13 transmits the encoded stream, provided from the encoding unit 12, to a decoding device explained later.

(Example of Syntax of SPS)

FIGS. 2 and 3 are figures illustrating an example of a syntax of SPS.

As shown in FIG. 2, minimum TU size information (log 2_min_transform_block_size_minus2) is set in the SPS. For example, the minimum TU size information is one when indicating 8 by 8 pixels.

A scaling list usage flag (scaling_list_enabled_flag) indicating whether a scaling list is to be used or not during quantization is set in the SPS. The scaling list usage flag is one when the scaling list is used during the quantization, and the scaling list usage flag is zero when the scaling list is not used during the quantization.

When the sealing list usage flag is one, a SPS scaling list flag (sps_scaling_list_data_present_flag) indicating whether the scaling list is included in the SPS or not is set in the SPS. The SPS scaling list flag is one when the scaling list is included in the SPS. The SPS scaling list flag is zero when the scaling list is not included in the SPS.

When the SPS scaling list flag is one, a scaling list (scaling_list_data) is set in the SPS.

(Example of Syntax of PPS)

FIGS. 4 and 5 are figures illustrating an example of a syntax of PPS.

As shown in FIG. 4, skip permission information (transform_skip_enabled_flag) is set in the PPS. Therefore, application of the transform skip to the minimum size of the TU can be controlled in units of pictures. The skip permission information is one when indicating permission of application of the transform skip to the minimum size of the TU. The skip permission information is zero when indicating not permitting application of the transform skip to the minimum size of the TU.

As shown in FIG. 4, a PPS scaling list flag (pps_scaling_list_data_present_flag) indicating whether the scaling list is included in the PPS or not is set in the PPS. The PPS scaling list flag is one when the scaling list is included in the PPS. The PPS scaling list flag is zero when the scaling but is not included in the PPS.

As shown in FIG. 5, when the PPS scaling list flag is one, a scaling list (scaling_list_data) is set in the PPS. In the explanation below, the scaling list which is set in the SPS and the PPS will be referred to as a setting scaling list.

(Explanation About Setting Scaling List)

FIG. 6 is a figure for explaining a setting sealing list.

As shown in FIG. 6, in the HEVC, 4 by 4 pixels, 8 by 8 pixels, 16 by 16 pixels, and, 32 by 32 pixels can be selected as a size of TU. Therefore, a scaling list is prepared for each of the sizes. However, the amount of data a the scaling list is high for a large TU such as 16 by 16 pixels and 32 by 32 pixels. The encoding efficiency decreases because of the transmission of the scaling list.

Therefore, the scaling list for a large TU such as 16 by 16 pixels and 32 by 32 pixels is downsampled into 8 by 8 matrix as shown in FIG. 6, which is set in the SPS and the PPS and transmitted as the setting scaling list. However, the direct current component greatly affects the image quality, and therefore, it is transmitted separately.

The decoding device upsamples, with zero-order hold, the set scaling list which is 8 by 8 matrix thus transmitted, and accordingly, the scaling list for a large TU such as 16 by 16 pixels and 32 by 32 pixels is restored.

(Example of Configuration of Encoding Unit)

Figure 7:
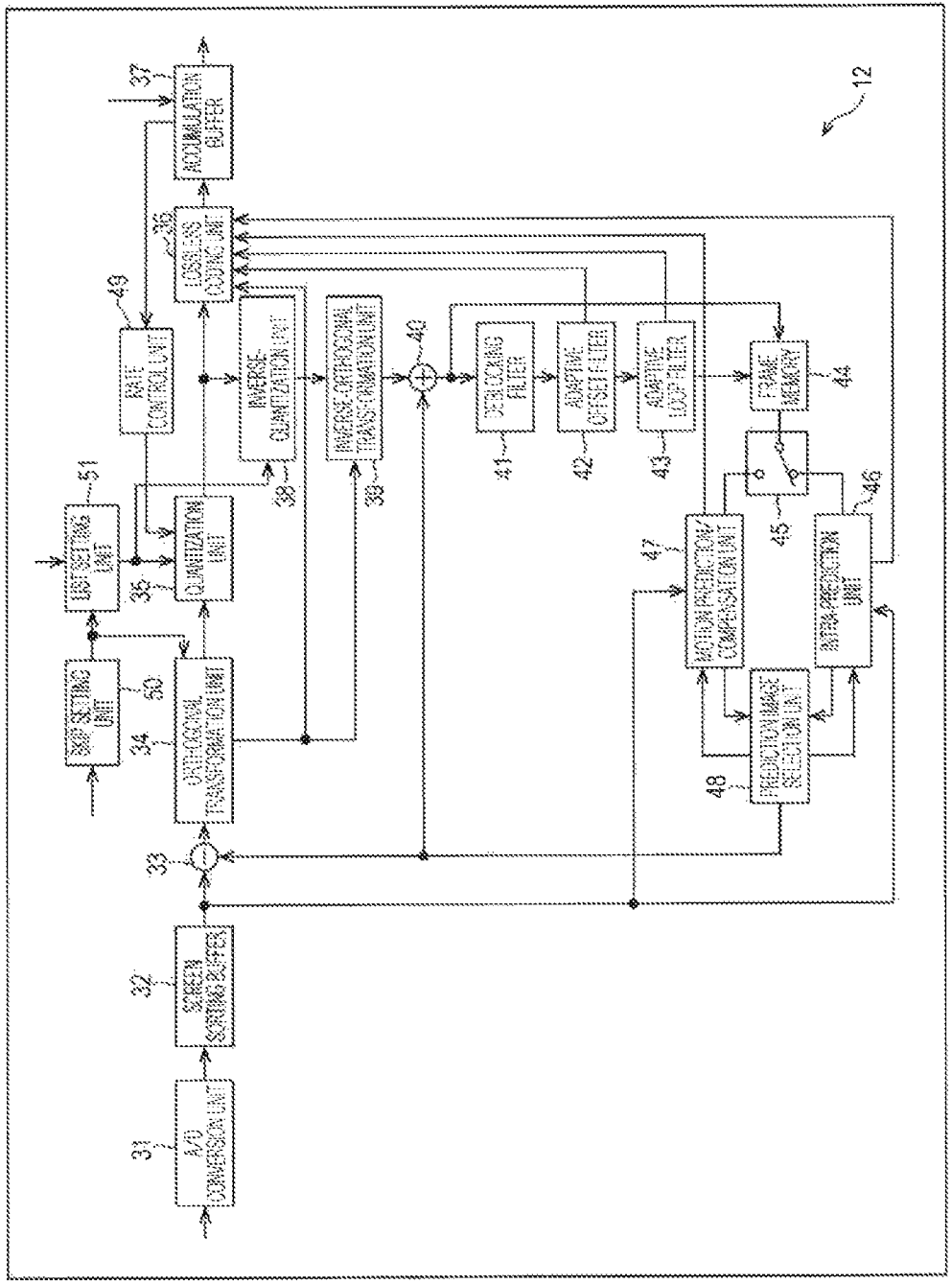
FIG. 7 is a block diagram illustrating an example of configuration of an encoding unit of FIG. 1.

FIG. 7 is a block diagram illustrating an example of configuration of the encoding unit 12 of FIG. 1.

The encoding unit 12 of FIG. 7 includes an A/D conversion unit 31, a screen sorting buffer 32, a calculation unit 33, an orthogonal transformation unit 34, a quantization unit 35, a lossless coding unit 36, an accumulation buffer 37, an inverse-quantization unit 38, an inverse-orthogonal transformation unit 39, and an adding unit 40. The encoding unit 12 includes a deblock filter 41, an adaptive offset filter 42, an adaptive loop filter 43, a frame memory 44, a switch 45, an intra-prediction unit 46, a motion prediction/compensation unit 47, a prediction image selection unit 48, and a rate control unit 49. Further, the encoding unit 12 includes a skip setting unit 50 and a list setting unit 51.

The A/D conversion unit 31 of the encoding unit 12 converts, from analog into digital, an image which is in units of frames received as an encoding target. The A/D conversion unit 31 outputs the image, which is the converted digital signal, to the screen sorting buffer 32 to store the image data therein.

The screen sorting buffer 32 sorts images in units of frames in the stored display order into the order of frames for coding in accordance with GOP structure. The screen sorting buffer 32 outputs the sorted images to the calculation unit 33, the intra-prediction unit 46, and the motion prediction/compensation unit 47.

The calculation unit 33 subtracts a prediction image, which is provided from the prediction image selection unit 48, from an image provided from the screen sorting buffer 32, and encodes the image. The calculation unit 33 outputs the image obtained as the result to the orthogonal transformation unit 34 as residual information (difference). When the prediction image is not provided from the prediction image selection unit 48, the calculation unit 33 outputs the image, which is read from the screen sorting buffer 32, to the orthogonal transformation unit 34 as the residual information as it is.

The orthogonal transformation unit 34 performs the orthogonal transform in units of TUs to the residual information provided by the calculation unit 33. The sizes of the TU may be 4 by 4 pixels, 8 by 8 pixels, 16 by 16 pixels, and 32 by 32 pixels. An example of orthogonal transform method includes a DCT (Discrete Cosine Transform).

When the TU has 32 by 32 pixels, the left half of the orthogonal transform matrix of the DCT is as follows.

[Math. 1]

$$\begin{bmatrix}
64 & 64 & 64 & 64 & 64 & 64 & 64 & 64 & 64 & 64 & 64 & 64 & 64 & 64 & 64 & 64 \\
90 & 90 & 88 & 85 & 82 & 78 & 73 & 67 & 61 & 54 & 46 & 38 & 31 & 22 & 13 & 4 \\
90 & 87 & 80 & 70 & 57 & 43 & 25 & 9 & -9 & -25 & -43 & -57 & -70 & -80 & -87 & -90 \\
90 & 82 & 67 & 46 & 22 & -4 & -31 & -54 & -73 & -85 & -90 & -88 & -78 & -61 & -38 & -13 \\
89 & 75 & 50 & 18 & -18 & -50 & -75 & -89 & -89 & -75 & -50 & -18 & 18 & 50 & 75 & 89 \\
88 & 67 & 31 & -13 & -54 & -82 & -90 & -78 & -46 & -4 & 38 & 73 & 90 & 85 & 61 & 22 \\
87 & 57 & 9 & -43 & -80 & -90 & -70 & -25 & 25 & 70 & 90 & 80 & 43 & -9 & -57 & -87 \\
85 & 46 & -13 & -67 & -90 & -73 & -22 & 38 & 82 & 88 & 54 & -4 & -61 & -90 & -78 & -31 \\
83 & 36 & -36 & -83 & -83 & -36 & 36 & 83 & 83 & 36 & -36 & -83 & -83 & -36 & 36 & 83 \\
82 & 22 & -54 & -90 & -61 & 13 & 78 & 85 & 31 & -46 & -90 & -67 & 4 & 73 & 88 & 38 \\
80 & 9 & -70 & -87 & -25 & 57 & 90 & 43 & -43 & -90 & -57 & 25 & 87 & 70 & -9 & -80 \\
78 & -4 & -82 & -73 & 13 & 85 & 67 & -22 & -88 & -61 & 31 & 90 & 54 & -38 & -90 & -46 \\
75 & -18 & -89 & -50 & 50 & 89 & 18 & -75 & -75 & 18 & 89 & 50 & -50 & -89 & -18 & 75 \\
73 & -31 & -90 & -22 & 78 & 67 & -38 & -90 & -13 & 82 & 61 & -46 & -88 & -4 & 85 & 54 \\
70 & -43 & -87 & 9 & 90 & 25 & -80 & -57 & 57 & 80 & -25 & -90 & -9 & 87 & 43 & -70 \\
67 & -54 & -78 & 38 & 85 & -22 & -90 & 4 & 90 & 13 & -88 & -31 & 82 & 46 & -73 & -61 \\
64 & -64 & -64 & 64 & 64 & -64 & -64 & 64 & 64 & -64 & -64 & 64 & 64 & -64 & -64 & 64 \\
61 & -73 & -46 & 82 & 31 & -88 & -13 & 90 & -4 & -90 & 22 & 85 & -38 & -78 & 54 & 67 \\
57 & -80 & -25 & 90 & -9 & -87 & 43 & 70 & -70 & -43 & 87 & 9 & -90 & 25 & 80 & -57 \\
54 & -85 & -4 & 88 & -46 & -61 & 82 & 13 & -90 & 38 & 67 & -78 & -22 & 90 & -31 & -73 \\
50 & -89 & 18 & 75 & -75 & -18 & 89 & -50 & -50 & 89 & -18 & -75 & 75 & 18 & -89 & 50 \\
46 & -90 & 38 & 54 & -90 & 31 & 61 & -88 & 22 & 67 & -85 & 13 & 73 & -72 & 4 & 78 \\
43 & -90 & 57 & 25 & -87 & 70 & 9 & -80 & 80 & -9 & -70 & 87 & -25 & -57 & 90 & -43 \\
38 & -88 & 73 & -4 & -67 & 90 & -46 & -31 & 85 & -78 & 13 & 61 & -90 & 54 & 22 & -82 \\
36 & -83 & 83 & -36 & -36 & 83 & -83 & 36 & 36 & -83 & 83 & -36 & -36 & 83 & -83 & 36 \\
31 & -78 & 90 & -61 & 4 & 54 & -88 & 82 & -38 & -22 & 73 & -90 & 67 & -13 & -46 & 85 \\
25 & -70 & 90 & -80 & 43 & 9 & -57 & 87 & -87 & 57 & -9 & -43 & 80 & -90 & 70 & -25 \\
22 & -61 & 85 & -90 & 73 & -38 & -4 & 46 & -78 & 90 & -82 & 54 & -13 & -31 & 67 & -88 \\
18 & -50 & 75 & -89 & 89 & -75 & 50 & -18 & -18 & 50 & -75 & 89 & -89 & 75 & -50 & 18 \\
13 & -38 & 61 & -78 & 88 & -90 & 85 & -73 & 54 & -31 & 4 & 22 & -46 & 67 & -82 & 90 \\
9 & -25 & 43 & -57 & 70 & -80 & 87 & -90 & 90 & -87 & 80 & -70 & 57 & -43 & 25 & -9 \\
4 & -13 & 22 & -31 & 38 & -46 & 54 & -61 & 67 & -73 & 78 & -82 & 85 & -88 & 90 & -90
\end{bmatrix}$$

The right half of the orthogonal transform matrix of the DCT is as follows.

[Math. 2]

$$\begin{bmatrix} 64 & 64 & 64 & 64 & 64 & 64 & 64 & 64 & 64 & 64 & 64 & 64 & 64 & 64 & 64 & 64 \\ -4 & -13 & -22 & -31 & -38 & -46 & -54 & -61 & -67 & -73 & -78 & -82 & -85 & -88 & -90 & -90 \\ -90 & -87 & -80 & -70 & -57 & -43 & -25 & -9 & 9 & 25 & 43 & 57 & 70 & 80 & 87 & 90 \\ 13 & 38 & 61 & 78 & 88 & 90 & 85 & 73 & 54 & 31 & 4 & -22 & -46 & -67 & -82 & -90 \\ 89 & 75 & 50 & 18 & -18 & -50 & 75 & -89 & -89 & -75 & -50 & -18 & 18 & 50 & 75 & 89 \\ -22 & -61 & -85 & -90 & -73 & -38 & 4 & 46 & 78 & 90 & 82 & 54 & 13 & -31 & -67 & -88 \\ -87 & -57 & -9 & 43 & 80 & 90 & 70 & 25 & -25 & -70 & -90 & -80 & -43 & 9 & 57 & 87 \\ 31 & 78 & 90 & 61 & 4 & -54 & -88 & -82 & -38 & 22 & 73 & 90 & 67 & 13 & -46 & -85 \\ 83 & 36 & -36 & -83 & -83 & -36 & 36 & 83 & 83 & 36 & -36 & -83 & -83 & -36 & 36 & 83 \\ -38 & -88 & -73 & -4 & 67 & 90 & 46 & -31 & -85 & -78 & -13 & 61 & 90 & 54 & -22 & -82 \\ -80 & -9 & 70 & 87 & 25 & -57 & -90 & -43 & 43 & 90 & 57 & -25 & -87 & -70 & 9 & 80 \\ 46 & 90 & 38 & -54 & -90 & -31 & 61 & 88 & 22 & -67 & -85 & -13 & 72 & 82 & 4 & -78 \\ 75 & -18 & -89 & -50 & 50 & 89 & 18 & -75 & -75 & 18 & 89 & 50 & -50 & -89 & -18 & 75 \\ -54 & -85 & 4 & 88 & 46 & -61 & -82 & 13 & 90 & 38 & -67 & -78 & 22 & 90 & 31 & -73 \\ -70 & 43 & 87 & -9 & -90 & -25 & 80 & 57 & -57 & -80 & 25 & 90 & 9 & -87 & -43 & 70 \\ 61 & 73 & -46 & -82 & 31 & 88 & -13 & -90 & -4 & 90 & 22 & -85 & -38 & 78 & 54 & -67 \\ 64 & -64 & -64 & 64 & 64 & -64 & -64 & 64 & 64 & -64 & -64 & 64 & 64 & -64 & -64 & 64 \\ -87 & -54 & 78 & 38 & -85 & -22 & 90 & 4 & -90 & 13 & 88 & -31 & -82 & 46 & 73 & -61 \\ -57 & 80 & 25 & -90 & 9 & 87 & -43 & -70 & 70 & 43 & -87 & -9 & 90 & -25 & -80 & 57 \\ 73 & 31 & -90 & 22 & 78 & -67 & -38 & 90 & -13 & -82 & 61 & 46 & -88 & 4 & 85 & -54 \\ 50 & -89 & 18 & 75 & -75 & -18 & 89 & -50 & -50 & 89 & -18 & -75 & 75 & 18 & -89 & 50 \\ -78 & -4 & 82 & -73 & -13 & 85 & -67 & -22 & 88 & -61 & -31 & 90 & -54 & -38 & 90 & -46 \\ -43 & 90 & -57 & -25 & 87 & -70 & -9 & 80 & -80 & 9 & 70 & -87 & 25 & 57 & -90 & 43 \\ 82 & -22 & -54 & 90 & -61 & -13 & 78 & -85 & 31 & 46 & -90 & 67 & 4 & -73 & 88 & -38 \\ 36 & -83 & 83 & -36 & -36 & 83 & -83 & 36 & 36 & -83 & 83 & -36 & -36 & 83 & -83 & 36 \\ -85 & 46 & 13 & -67 & 90 & -73 & 22 & 38 & -82 & 88 & -54 & -4 & 61 & -90 & 78 & -31 \\ -25 & 70 & -90 & 80 & -43 & -9 & 57 & -87 & 87 & -57 & 9 & 43 & -80 & 90 & -70 & 25 \\ 88 & -67 & 31 & 13 & -54 & 82 & -90 & 78 & -46 & 4 & 38 & -73 & 90 & -85 & 61 & -22 \\ 18 & -50 & 75 & -89 & 89 & -75 & 50 & -18 & -18 & 50 & -75 & 89 & -89 & 75 & -50 & 18 \\ -90 & 82 & -67 & 46 & -22 & -4 & 31 & -54 & 73 & -85 & 90 & -88 & 78 & -61 & 38 & -13 \\ -9 & 25 & -43 & 57 & -70 & 80 & -87 & 90 & -90 & 87 & -80 & 70 & -57 & 43 & -25 & 9 \\ 90 & -90 & 88 & -85 & 82 & -78 & 73 & -67 & 61 & -54 & 46 & -38 & 31 & -22 & 13 & -4 \end{bmatrix}$$

The orthogonal transform matrices of the DCT where the TU has 4 by 4 pixels, 8 by 8 pixels, and 16 by 16 pixels are obtained by skipping the orthogonal transform matrix of the DCT for the TU having 32 by 32 pixels into ⅛, ¼, ½, respectively. Therefore, the orthogonal transformation unit 34 may be provided as the common calculation unit for all the sizes of the TUs, and it is not necessary to provide a calculation unit for each of the sizes of TUs.

When the optimum prediction mode is an intra-prediction mode, and the TU has 4 by 4 pixels, DST (Discrete Sine Transform) is used as the orthogonal transform method. An orthogonal transform matrix H of the DST is represented by the following expression (1).

[Math. 3]

$$H = \begin{bmatrix} 29 & 55 & 74 & 84 \\ 74 & 74 & 0 & -74 \\ 84 & -29 & -74 & 55 \\ 55 & -84 & 74 & -29 \end{bmatrix} \quad (1)$$

As described above, when the optimum prediction mode is the intra-prediction mode and the TU has 4 by 4 pixels, i.e., when the residual information significantly decreases as an image is more similar to a peripheral image therearound already encoded, then, the DST is used as the orthogonal transform method, and therefore, the encoding efficiency is improved.

The orthogonal transformation unit 34 determines whether the transform skip can be applied or not in units of TUs on the basis of the minimum TU size information provided from the skip setting unit 50. When the transform skip is determined to be able to be applied, the orthogonal transformation unit 34 calculates a cost function value in a case where the orthogonal transform is performed and a cost function value in a case where the orthogonal transform is not performed, on the basis of the orthogonal transform coefficients obtained as the result of the orthogonal transform.

When the cost function with the orthogonal transform is less than the cost function value without the orthogonal transform, the orthogonal transformation unit 34 provides the orthogonal transform coefficient to the quantization unit 35. Then, the orthogonal transformation unit 34 provides a transform skip flag indicating absence of transform skip to the lossless coding unit 36 and the inverse-orthogonal transformation unit 39.

On the other hand, when the cost function without the orthogonal transform is less than the cost function value with the orthogonal transform, the orthogonal transformation unit 34 performs the transform skip, and provides the residual information to the quantization unit 35. Then, the orthogonal transformation unit 34 provides a transform skip flag indicating presence of transform skip to the lossless coding unit 36 and the inverse-orthogonal transformation unit 39.

It should be noted that the transform skip can be applies to not only a brightness signal but also a color difference signal. The transform skip can be performed regardless of whether the optimum prediction mode is the intra-prediction mode or the inter-prediction mode.

In a case where the transform skip is determined not to be able to be applied, or where the minimum TU size information is not provided, the orthogonal transformation unit 34 provides the orthogonal transform coefficients to the quantization unit 35.

The quantization unit 35 uses the scaling list provided from the list setting unit 51 to quantize the residual information or the orthogonal transform coefficients provided from the orthogonal transformation unit 34. The quantization unit 35 provides the quantized value obtained as the result of the quantization to the lossless coding unit 36.

The lossless coding unit 36 obtains the quantized value provided from the orthogonal transformation unit 34. The lossless coding unit 36 obtains information indicating the optimum intra-prediction mode (hereinafter referred to as intra-prediction mode information) from the intra-prediction unit 46. The lossless coding unit 36 obtains information indicating the optimum inter-prediction mode (hereinafter referred to as inter-prediction mode information), motion vectors, information for identifying a reference image, and the like from the motion prediction/compensation unit 47.

The lossless coding unit 36 also obtains offset filter information about an offset filter from the adaptive offset filter 42, and obtains filter coefficients from the adaptive loop filter 43.

The lossless coding unit 36 performs lossless coding such as variable length coding (for example, CAVLC (Context-Adaptive Variable Length Coding) and the like) and arithmetic coding (for example, CABAC (Context-Adaptive Binary Arithmetic Coding) and the like) on the quantized values provided from the quantization unit 35.

The lossless coding unit 36 performs lossless coding to encode, as encoded information about encoding, the intra-prediction mode information or the inter-prediction mode information, the motion vectors, the information for identifying the reference image, the transform skip flag, the offset filter information, and the filter coefficients. The lossless coding unit 36 provides the encoded information, which is lossless-coded, and the quantized values to the accumulation buffer 37 as encoded data to accumulate the data therein.

It should be noted that the lossless coded encoded information may be header information about the lossless-coded quantized values (for example, slice header). The transform skip flag (transform_skip_flag) is set, for example, in residual_coding.

The accumulation buffer 37 temporarily stores the encoded data provided from the lossless coding unit 36. The accumulation buffer 37 provides, as encoded stream, the stored encoded data as well as the parameter set provided from the setting unit 11 of FIG. 1 to the transmission unit 13.

The quantized values which are output from the quantization unit 35 are also input into the inverse-quantization unit 38. The inverse-quantization unit 38 uses the scaling list provided from the list setting unit 51 to perform inverse-quantization on the quantized values provided from the quantization unit 35 in accordance with the method corresponding to the quantization method of the quantization unit 35. The inverse-quantization unit 38 provides the residual information or the orthogonal transform coefficients obtained as a result of the inverse-quantization to the inverse-orthogonal transformation unit 39.

The inverse-orthogonal transformation unit 39 performs, in units of TUs, inverse-orthogonal transform on the orthogonal transform coefficients provided from the inverse-quantization unit 38 on the basis of the transform skip flag provided from the orthogonal transformation unit 34. Examples of methods of inverse-orthogonal transform include IDCT (inverse-discrete cosine transform and IDST (inverse-discrete sine transform). The inverse-orthogonal transformation unit 39 provides the residual information obtained as the result of the inverse-orthogonal transform or the residual information provided from the inverse-quantization unit 38 to the adding unit 40.

The adding unit 40 performs decoding by adding the residual information provided by the inverse-orthogonal transformation unit 39 and the prediction image provided by the prediction image selection unit 48. The adding unit 40 provides the decoded image to the deblock filter 41 and the frame memory 44.

The deblock filter 41 performs adaptive deblock filter processing to remove block noise from a decoded image provided by the adding unit 40, and provides the image obtained as the result to the adaptive offset filter 42.

The adaptive offset filter 42 performs adaptive offset filter (SAO (Sample adaptive offset)) processing to mainly remove ringing from the image which has been subjected to the adaptive deblock filter processing by the deblock filter 41.

More specifically, the adaptive offset filter 42 determines the type of adaptive offset filter processing for each LCU (Largest Coding Unit), which is the maximum encoding unit, and derives the offset used in the adaptive offset filter processing. The adaptive offset filter 42 uses the derived offset to perform the adaptive offset filter processing of the determined type to filter the image which has been subjected to the adaptive deblock filter processing.

The adaptive offset filter 42 provides the image which has been subjected to the adaptive offset filter processing to the adaptive loop filter 43. The adaptive offset filter 42 provides, as offset filter information, information indicating the offset and type of the adaptive offset filter processing that has been done to the lossless coding unit 36.

The adaptive loop filter 43 is constituted by, for example, a two dimensional Wiener Filter. For example, the adaptive loop filter 43 performs, for each LCU, adaptive loop filter (ALF) processing on the image which has been subjected to the adaptive offset filter processing and which is provided from the adaptive offset filter 42.

More specifically, the adaptive loop filter 43 calculates, for each LCU, the filter coefficients used in the adaptive loop filter processing so as to make the least residual between the original image which is the image that is output from the screen sorting buffer 32 and the image that has been subjected to the adaptive loop filter processing. Then, the adaptive loop filter 43 uses the calculated filter coefficients to perform, for each LCU, the adaptive loop filter processing on the image that has been subjected to the adaptive offset filter processing.

The adaptive loop filter 43 provides the image that has been subjected to the adaptive loop filter processing to the frame memory 44. The adaptive loop filter 43 provides the filter coefficients used for the adaptive loop filter processing to the lossless coding unit 36.

In this case, the adaptive loop filter processing is performed for each LCU, but the processing unit of the adaptive loop filter processing is not limited to the LCU. However, by using the same processing unit in the adaptive offset filter 42 and the adaptive loop filter 43, the processing can be done efficiently.

The frame memory 44 accumulates the image provided by the adaptive loop filter 43 and the image provided by the adding unit 40. Among the images which are accumulated in the frame memory 44 and which have not yet been subjected to the filter processing, images adjacent to the PU (Prediction Unit) are provided as peripheral images to the intra-prediction unit 46 via the switch 45. On the other hand, the images which have been subjected to the filter processing and accumulated in the frame memory 44 are output as reference image to the motion prediction/compensation unit 47 via the switch 45.

The intra-prediction unit 46 uses the peripheral images which have been read from the frame memory 44 via the switch 45 to perform, in units of PUs, the intra-prediction processing in all the intra-prediction modes serving as candidates.

The intra-prediction unit 46 calculates cost function values (the details of which will be explained later) for all the intra-prediction modes serving as candidates on the basis of the image which is read from the screen soiling buffer 32 and the prediction image generated as the result of the intra-prediction processing. Then, the intra-prediction unit 46 determines the intra-prediction mode, of which cost function value is the minimum, as the optimum intra-prediction mode.

The intra-prediction unit 46 provides the prediction image generated in the optimum intra-prediction mode and the corresponding cost function value to the prediction image selection unit 48. When the prediction image selection unit 48 notifies selection of the prediction image generated in the optimum intra-prediction mode, the intra-prediction unit 46 provides the intra-prediction mode information to the lossless coding unit 36.

It should be noted that the cost function value is also referred to as a RD (Rate Distortion) cost, and is calculated according to the method of High Complexity Mode or Low Complexity Mode implemented as defined in the JM (Joint Model) which is the reference software in H.264/AVC method, for example. It should be noted that the reference software of the H.264/AVC method is disclosed in http://iphome.hhi.de/suehring/millindex.htm.

More specifically, when the High Complexity mode is employed as the method for calculating the cost function value, up to decoding is temporarily performed for all the candidate prediction modes, and the cost function value represented by the following expression (2) is calculated for each prediction mode.

[Math.4]

$$\text{Cost (Mode)} = D + \lambda \cdot R \quad (4)$$

In this case, D denotes the difference (noise) between the original image and the decoded image. R denotes the amount of codes generated including up to coefficients of the orthogonal transform.

λ is a Lagrange undetermined multiplier which is given as a function of a quantization parameter QP.

On the other hand, when the Low Complexity mode is employed as the method for calculating the cost function value, the prediction image is generated and the amount of codes of the encoded information is calculated for all the candidate prediction modes, and the cost function represented by the following expression (3) is calculated for each prediction mode.

[Math.5]

$$\text{Cost (Mode)} = D + \text{QPtoQuant}(QP) \cdot \text{Header\_Bit} \quad (3)$$

In this case, D denotes the difference (noise) between the original image and the decoded image. Header_Bit denotes the amount of codes, of encoded information. QPtoQuant denotes a function given as a function of the quantization parameter QP.

In the Low Complexity mode, only the prediction image may be generated in all the prediction modes, and the decoded image need not be generated. For this reason, the Low Complexity Mode can be realized with a lower amount of computation as compared with the High Complexity Mode.

The motion prediction/compensation unit 47 performs motion prediction/compensation processing of all the inter-prediction modes serving as candidates in units of PUs. More specifically, the motion prediction/compensation unit 47 detects, in units of PUs, the motion vectors of all the inter-prediction modes serving as candidates on the basis of the image provided from the screen sorting buffer 32 and the reference image that is read from the frame memory 44 via the switch 45. Then, the motion prediction/compensation unit 47 performs, in units of PUs, the compensation processing on the reference image on the basis of the motion vectors, and generates the prediction image.

At this occasion, the motion prediction/compensation unit 47 calculates the cost function values for all the inter-prediction modes serving as candidates on the basis of the prediction image and the image provided from the screen sorting buffer 32, and determines the inter-prediction mode, of which cost function value is the minimum, as the optimum inter-prediction mode. Then, the motion prediction/compensation unit 47 provides the cost function value of the optimum inter-prediction mode and the corresponding prediction image to the prediction image selection unit 48. When the prediction image selection unit 48 notifies selection of the prediction image generated in the optimum inter-prediction mode, the motion prediction/compensation unit 47 outputs the inter-prediction mode information, the corresponding motion vectors, the information for identifying the reference image, and the like to the lossless coding unit 36.

On the basis of the cost function value provided from the intra-prediction unit 46 and the motion prediction/compensation unit 47, the prediction image selection unit 48 determines that one of the optimum intra-prediction mode and the optimum inter-prediction mode of which corresponding cost function value is smaller is the optimum prediction mode. Then, the prediction image selection unit 48 provides the prediction image in the optimum prediction mode to the calculation unit 33 and the adding unit 40. The prediction image selection unit 48 notifies the selection of the prediction image in the optimum prediction mode to the intra-prediction unit 46 or the motion prediction/compensation unit 47.

The rate control unit 49 controls the rate of the quantization operation of the quantization unit 35 so as not to cause overflow and underflow, on the basis of the amount of codes of the encoded data accumulated in the accumulation buffer 37.

The skip setting unit 50 provides the minimum TU size information included in the SPS provided from the setting unit 11 to the orthogonal transformation unit 34 and the list setting unit Si on the basis of the skip permission information included in the PPS provided from the setting unit 11 of FIG. 1.

The list setting unit 51 sets the minimum size indicated by the minimum TU size information and the default value of the scaling list of the TU having 4 by 4 pixels (hereinafter referred to as default scaling list) as a flat matrix, on the basis of the minimum TU size information provided from the skip setting unit 50. In this case, the minimum size of the TU is considered to be other than 4 by 4 pixels, but if the minimum size of the TU is 4 by 4 pixels, only the default scaling list of the TU having 4 by 4 pixels is made as the flat matrix. The list setting unit 51 also sets a matrix other than the flat matrix as the default scaling list of a TU of which size is larger than the minimum size indicated by the minimum TU size information.

The list setting unit 51 obtains the setting scaling list for each of the sizes of the TUs included in the SPS and the PPS provided from the setting unit On the basis of the SPS, the list setting unit 51 provides, for each of the sizes of the TUs, the default scaling list, the setting scaling list, or the scaling list which is the flat matrix (hereinafter referred to as flat scaling list) to the quantization unit 35 and the inverse-quantization unit 38.

As described above, the list setting unit 51 sets the flat matrix as the default scaling first of the minimum size of the TU which is the size of the TU where the transform skip is possible. Therefore, this can prevent the residual information of the TU where the transform skip is performed from being quantized using a scaling list other than the flat matrix. More specifically, this prevents weight coefficients in the frequency domain from being used during the quantization of the residual information in the pixel domain.

(Explanation About Coding Unit)

Figure 8:
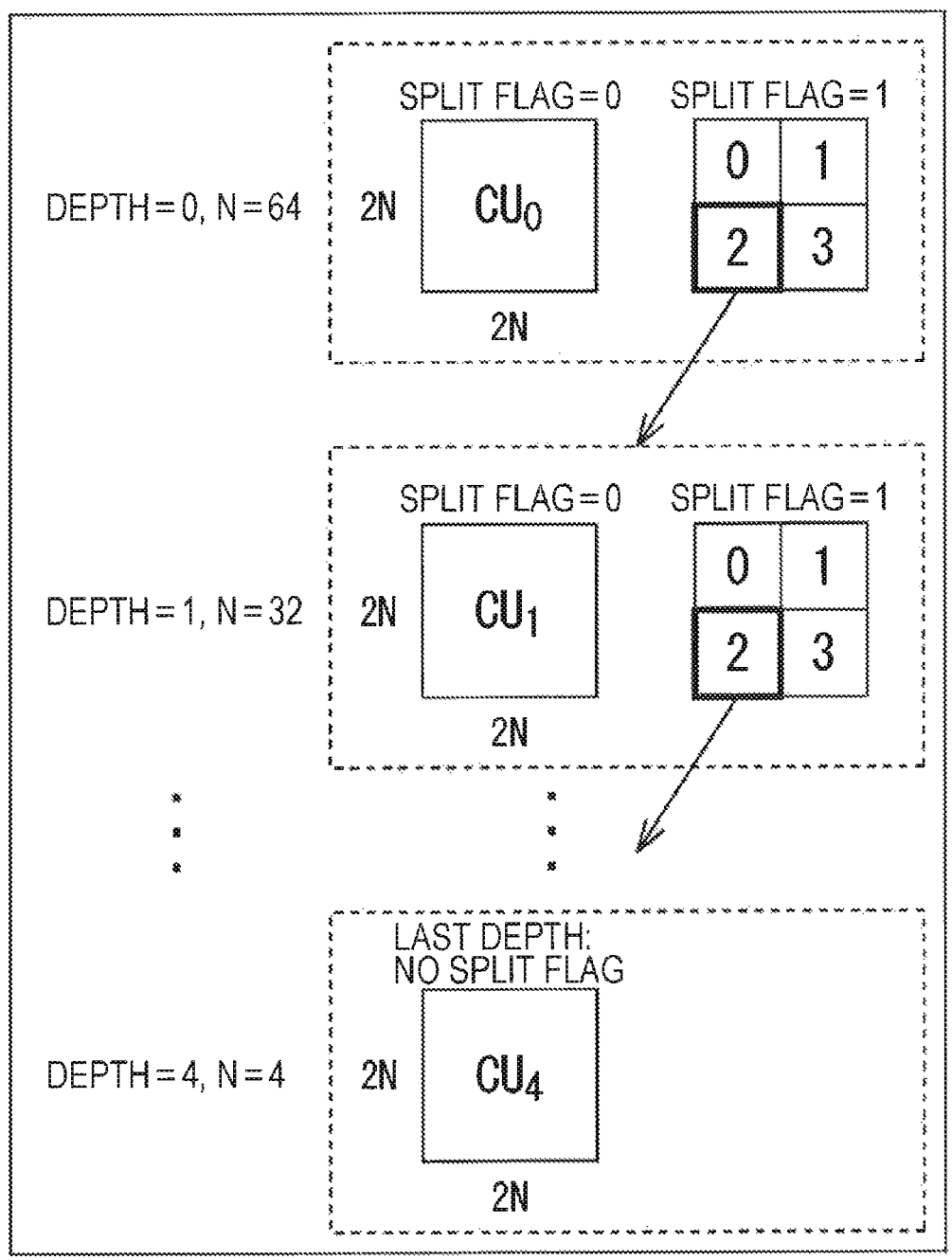
FIG. 8 is a figure for explaining a CU.

FIG. 8 is a figure for explaining a Coding UNIT (CU) which is a coding unit according to the HEVC method.

The HEVC method is targeted for an image of a large image frame such as UHD (Ultra High Definition) having 4000 pixels by 2000 pixels, and therefore, it is not best to fix the size of the coding unit at 16 pixels by 16 pixels. Therefore, in the HEVC method, CU is defined as a coding unit.

The CU plays the same role as the macro block in the AVC method. More specifically, a CU is divided into PUs and divided into TUs.

However, the size of CU is a square indicated by pixels of a power of two which is variable depending on sequence. More specifically, the CU is set by dividing into two pieces in the horizontal direction and the vertical direction any number of times so that the LCU which is a CU of the maximum size is not become less than the SCU (Smallest Coding Unit) which is a CU of the minimum size. More specifically, when a hierarchy is made so that the size of a higher level of hierarchy is ¼ of a lower level of hierarchy until the LCU becomes the SCU, the size in any given level of the hierarchy is the size of a CU For example, in FIG. 8, the size of the LCU is 128, and the size of the SCU is 8. Therefore, the depth of the hierarchy of the LCU is 0 to 4, the hierarchical depth number is 5. More specifically, the number of divisions corresponding to the CU is any one of 0 to 4.

It should be noted that information designating the sizes of the LCU and the SCU is included in the SPS. On the other hand, the number of divisions corresponding to the CU is designated by split_flag which indicates whether further division is made or not in each level of hierarchy. The details of the CU are described in NPL 1.

Like split_flag of the CU, the size of the TU can be designated using split_transform_flag. The maximum numbers of divisions of the TU in the inter-prediction and in the intra-prediction are designated as max_transform_hierarchy_depth_inter and max_transform_hierarchy_depth_intra, respectively, in the SPS.

In this specification, the CTU (Coding Tree Unit) is considered to be a unit including a CTB (Coding Tree Block) of the LCU and a parameter used when processing is done in the LCU base (level). The CU constituting the CTU is considered to be a unit including a CB (Coding Block) and a parameter used when processing is done in the CU base (level).

(Example of Configuration of List Setting Unit 51)

Figure 9:
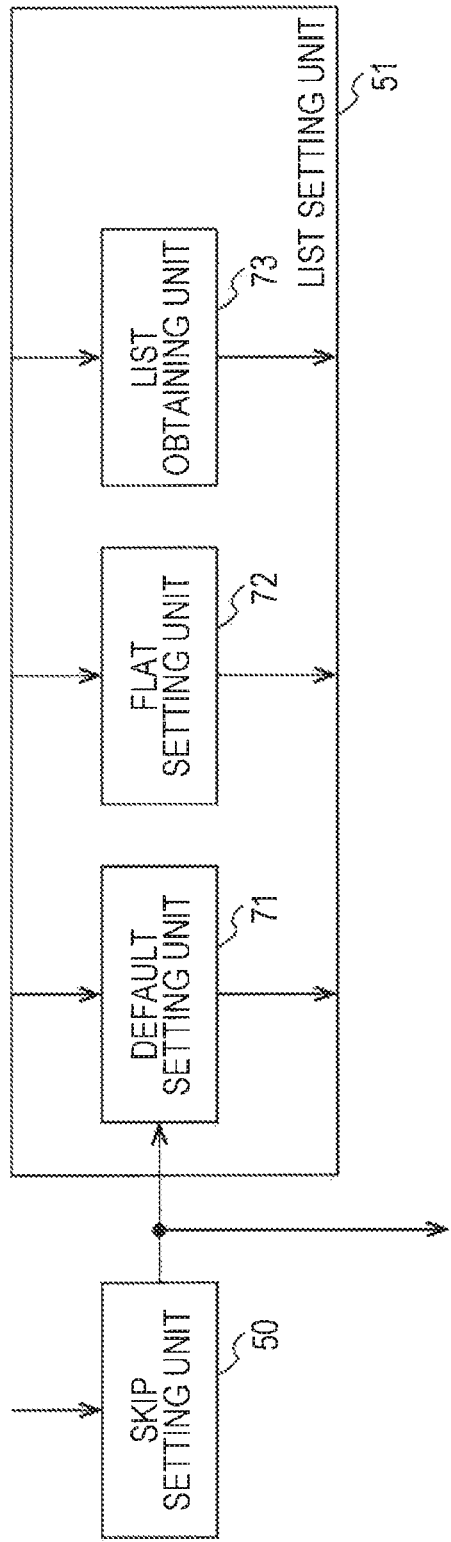
FIG. 9 is a block diagram illustrating an example of configuration of a list setting unit of FIG. 7.

FIG. 9 is a block diagram illustrating an example of configuration of the list setting unit 51 of FIG. 7.

As shown in FIG. 9, the skip setting unit 50 obtains the skip permission information included in the PPS provided from the setting unit 11 of FIG. 1 and the minimum TU size information included in the SPS. In a case where the skip permission information is one, the skip setting unit 50 provides the minimum TU size information to the orthogonal transformation unit 34 and the list setting unit 51 of FIG. 7.

As shown in FIG. 9, the list setting unit 51 is constituted by a default setting unit 71, a flat setting unit 72, and a list obtaining unit 73.

The default setting unit 71 sets the minimum sin indicated by the minimum TU size information and the default scaling list of 4 by 4 pixels to the flat matrix on the basis of the minimum TU size information provided from the skip setting unit 50. The default setting unit 71 sets default scaling lists of sizes larger than the minimum size indicated by the minimum TV size information to matrices other than the flat matrix.

The default setting unit 71 provides the default scaling list for each of the sizes of the TUs to the quantization unit 35 and the inverse-quantization unit 38 of FIG. 7 on the basis of the PPS scaling list flag included in the PPS or the SPS scaling list flag included in the SPS provided from the setting unit 11.

The flat setting unit 72 holds the flat scaling list for each of the sizes of the TUs. The flat setting unit 72 provides the default scaling list for each of the sizes of the to the quantization unit 35 and the inverse-quantization unit 38 on the basis of the scaling list usage flag included in the SPS provided from the setting unit 11.

The list obtaining unit 73 obtains the setting scaling list for each of the sizes of the TUs included in the SPS and the PPS provided from the setting unit 11. The list obtaining unit 73 provides the setting scaling list where the size of the ITS is 4 by 4 pixels or 8 by 8 pixels, as it is, to the quantization unit 35 and the inverse-quantization unit 38. The list obtaining unit 73 upsamples the setting scaling list of 8 by 8 pixels where the size of the TU is 16 by 16 pixels or 32 by 32 pixels, generates a scaling list for 16 by 16 pixels or 32 by 32 pixels, and provides the scaling list to the quantization unit 35 and the inverse-quantization unit 38.

(Explanation About Processing of Encoding Device)

Figure 10:
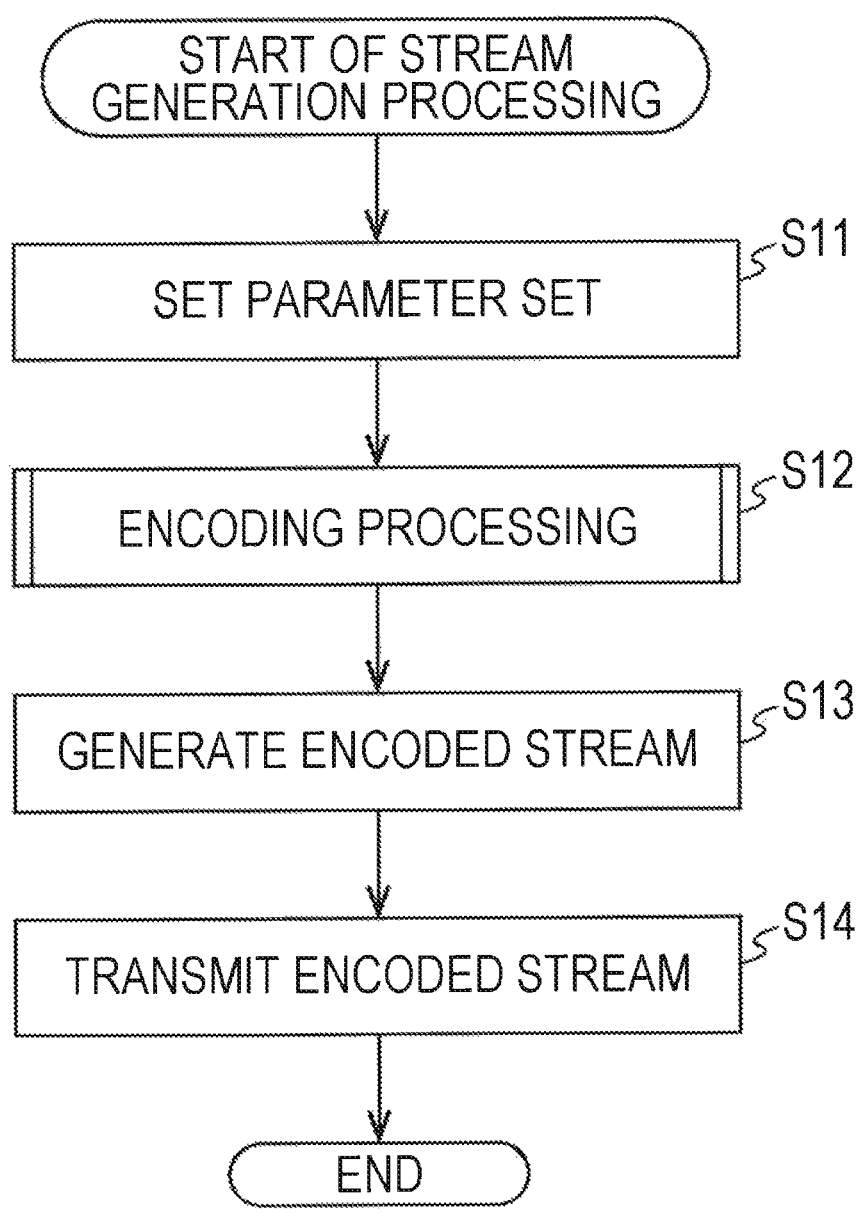
FIG. 10 is a flowchart for explaining stream generation processing.

FIG. 10 is a flowchart for explaining stream generation processing performed by the encoding device 10 of FIG. 1.

In step S11 of FIG. 10, the setting unit 11 of the encoding device 10 sets a parameter set. The setting unit 11 provides the parameter set that has been set to the encoding unit 12.

In step S12, the encoding unit 12 performs encoding processing for encoding images, in units of frames which are input from the outside, in accordance with the method based on the HEVC method. The details of this encoding processing will be explained with reference to FIGS. 11 and 12 explained later.

In step S13, the accumulation buffer 37 (FIG. 7) of the encoding unit 12 generates an encoded stream from the encoded data accumulated therein and the parameter set provided from the setting unit 11, and provides the encoded stream to the transmission unit 13.

In step S14, the transmission unit 13 transmits the encoded stream provided from the setting unit 11 to the decoding device explained later, and terminates the processing.

Figure 11:
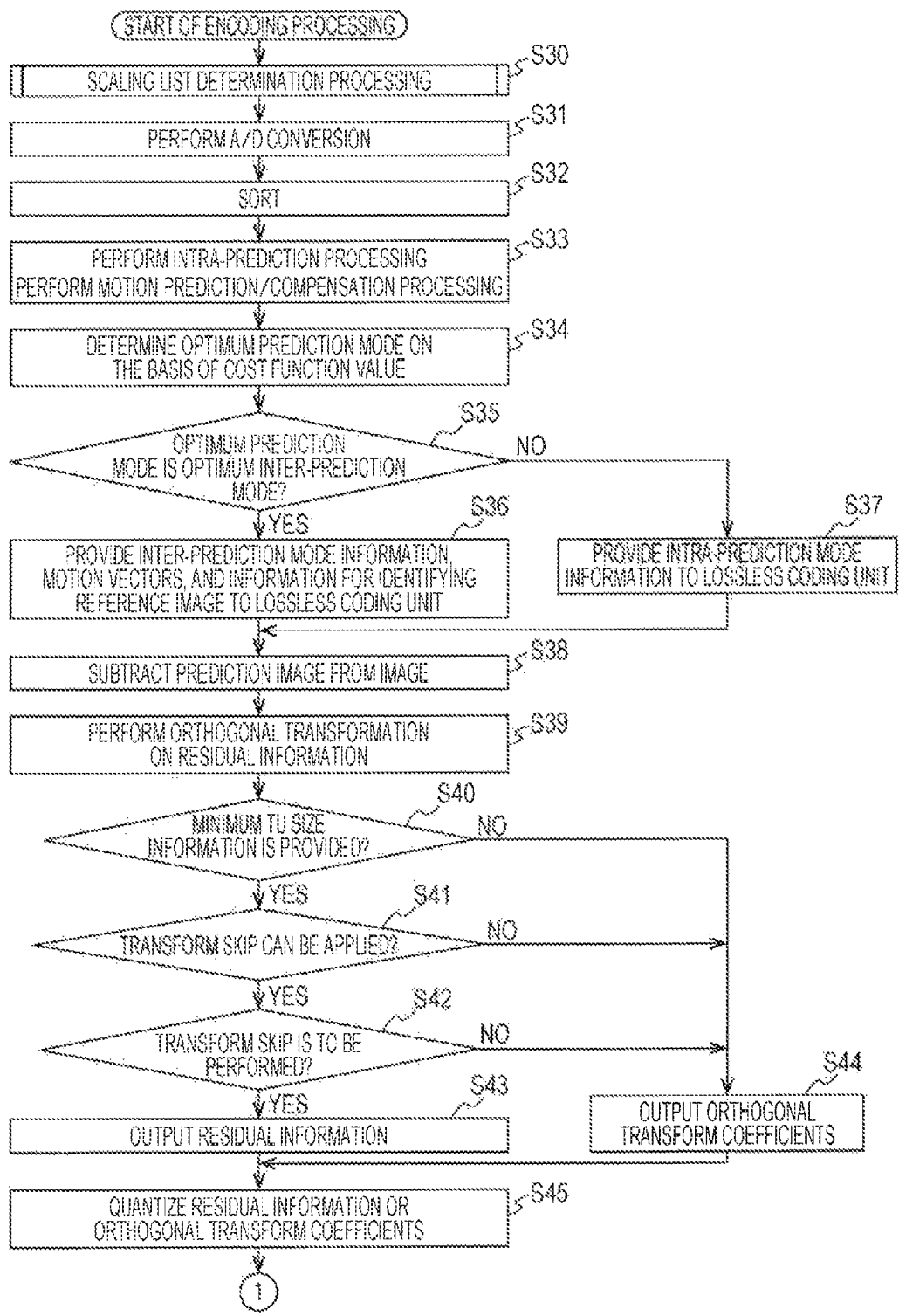
FIG. 11 is a flowchart for explaining the details of encoding processing of FIG. 10.
Figure 12:
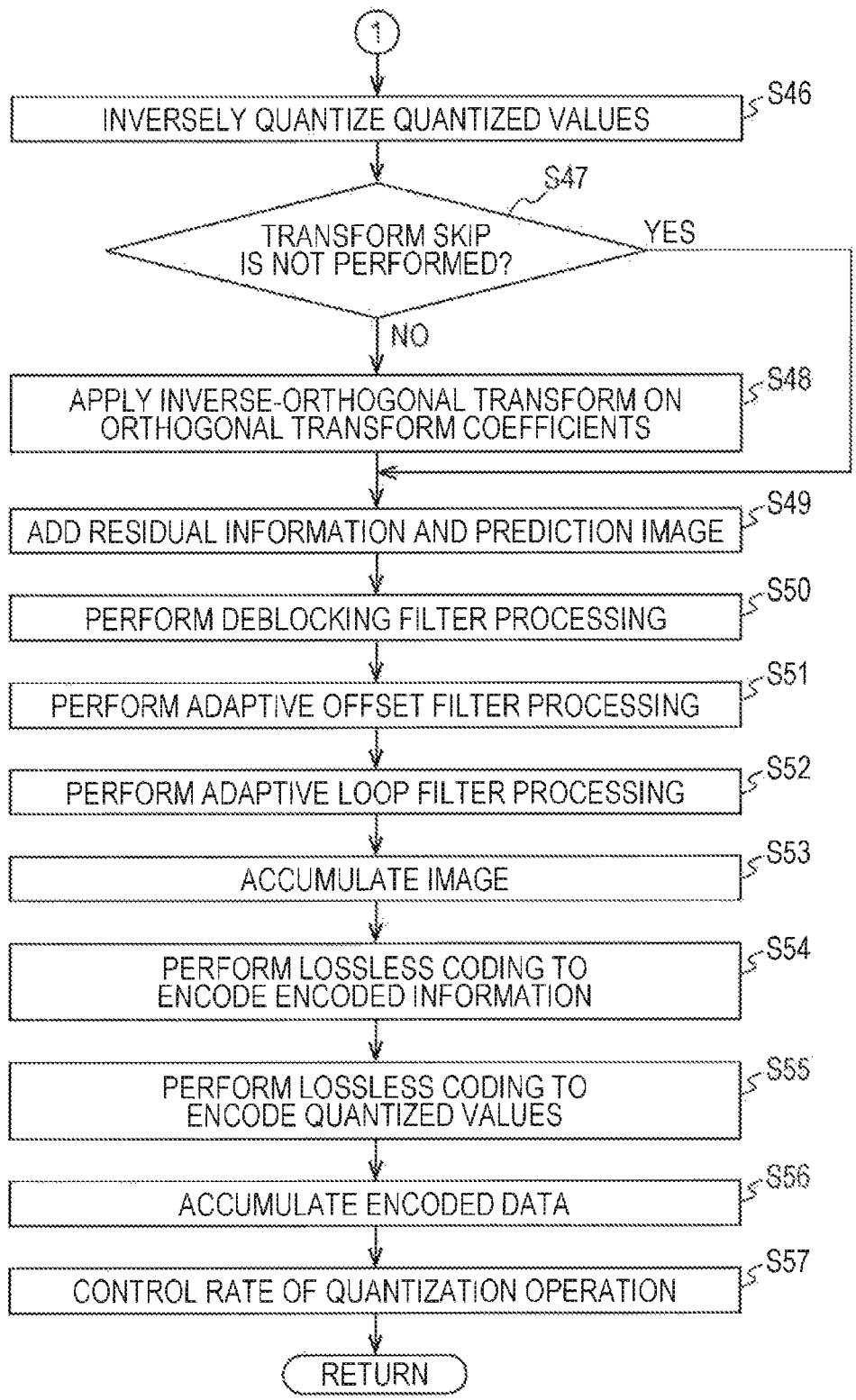
FIG. 12 is a flowchart for explaining the details of encoding processing of FIG. 10.

FIGS. 11 and 12 are flowcharts for explaining the details of encoding processing of step S12 of FIG. 10.

In step S30 of FIG. 11, the encoding unit 12 (FIG. 7) performs scaling list determination processing for determining the scaling list for each of the sizes of the TUs. The details of the scaling list determination processing will be explained with reference to FIG. 13 explained later.

In step S31, the A/D conversion unit 31 performs A/D conversion to convert images in units of frames which are received as encoding target. The A/D conversion unit 31 outputs the image which is converted digital signal to the screen sorting buffer 32 to store the image therein.

In step S32, the screen sorting buffer 32 sorts images of frames in the stored display order into the order of frames for coding in accordance with GOP structure. The screen sorting buffer 32 provides the images of which frame order has been sorted to the calculation unit 33, the intra-prediction unit 46, and the motion prediction/compensation unit 47.

In step S33, the intra-prediction unit 46 performs, in units of PUs, intra-prediction processing in all the candidate intra-prediction modes. The intra-prediction unit 46 calculates the cost function values for all the candidate intra-prediction modes on the basis of the image which has been read from the screen sorting buffer 32 and the prediction image generated as the result of the intra-prediction processing. Then, intra-prediction unit 46 determines that the intra-prediction mode of which cost function value is the minimum is the optimum intra-prediction mode. The intra-prediction unit 46 provides the prediction image generated in the optimum intra-prediction mode and the corresponding cost function value to the prediction image selection unit 48.

The motion prediction/compensation unit 47 performs, in units of PUs, motion prediction/compensation processing in all the inter-prediction modes serving as candidates. The motion prediction/compensation unit 47 calculates the cost function values for all the inter-prediction modes serving as candidates on the basis of the prediction image and the image provided by the screen sorting buffer 32, and determines that the inter-prediction mode of which cost function value is the minimum is the optimum inter-prediction mode. Then, the motion prediction/compensation unit 47 provides the cost function value of the optimum inter-prediction mode and the corresponding prediction image to the prediction image selection unit 48.

In step S34, the prediction image selection unit 48 determines that one of the optimum intra-prediction mode and the optimum inter-prediction mode of which cost function value is the minimum is the optimum prediction mode, on the basis of the cost function values provided from the motion prediction/compensation unit 47 and the intra-prediction unit 46 by the processing in step S33. Then, the prediction image selection unit 48 provides the prediction image in the optimum prediction mode to the calculation unit 33 and the adding unit 40.

In step S35, the prediction image selection unit 48 determines whether the optimum prediction mode is the optimum inter-prediction mode or not. When the optimum prediction mode is determined to be the optimum inter-prediction mode in step 335, the prediction image selection unit 48 notifies the selection of the prediction image generated in the optimum inter-prediction mode to the motion prediction/compensation unit 47.

Then, in step S36, the motion prediction/compensation unit 47 provides the inter-prediction mode information, the motion vectors, and the information for identifying the reference image to the lossless coding unit 36, and processing in step S38 is subsequently performed.

On the other hand, when the optimum prediction mode is determined not to be the optimum inter-prediction mode in step S35, and more specifically, when the optimum prediction triode is determined to be the optimum intra-prediction mode, then the prediction image selection unit 48 notifies the selection of the prediction image generated in the optimum intra-prediction mode to the intra-prediction unit 46. Then, in step S37, the intra-prediction unit 46 provides the intra-prediction mode information to the lossless coding unit 36, and the processing in step S38 is subsequently performed.

In step S38, the calculation unit 33 performs encoding by subtracting the prediction image provided by the prediction image selection unit 48 from the image provided by the screen sorting buffer 32. The calculation unit 33 outputs the image obtained as the result to the orthogonal transformation unit 34 as the residual information.

In step S39, the orthogonal transformation unit 34 performs, in units of TUs, orthogonal transform on the residual information provided by the calculation unit 33.

In step S40, the orthogonal transformation unit 34 determines whether the minimum TU size information is provided from the skip setting unit 50 in the scaling list determination processing of step S30.

When the minimum TU size information is determined to be provided from the skip setting unit 50 in step S40, and more specifically, when the skip permission information is one, the processing in step S41 is subsequently performed. In step S41, the orthogonal transformation unit 34 determines, in units of TUs, whether the transform skip can be applied or not, on the basis of the minimum TU size information.

More specifically, when the size of the TU is determined to be the minimum size indicated by the minimum TV size information, the orthogonal transformation unit 34 determines, in units of TUs, that the transform skip can be applied. On the other hand, when the size of the TU is determined not to be the minimum size indicated by the minimum TU size information, the orthogonal transformation unit 34 determines that the transform skip cannot be applied.

When the transform skip is determined to be able to be applied in step S41, the orthogonal transformation unit 34 calculates, in units of TUs, the cost function value where the orthogonal transform is performed and the cost function value where the orthogonal transform is not performed on the basis of the orthogonal transform coefficients obtained as the result of the orthogonal transform. Then, in step S42, the orthogonal transformation unit 34 determines, in units of TUs, whether the transform skip is performed or not.

More specifically, in a case where the cost function value where the orthogonal transform is not performed is less than the cost function value where the orthogonal transform is performed, then the orthogonal transformation unit 34 determines that the transform skip is to be performed. On the other hand, in a case where the cost function value where the orthogonal transform is performed is less than the cost function value where the orthogonal transform is not performed, the orthogonal transformation unit 34 determines that the transform skip is not performed.

When the transform skip is determined to be performed in step S42, the orthogonal transformation unit 34 outputs, in units of TUs, the residual information provided by the calculation unit 33 to the quantization unit 35 in step S43. The orthogonal transformation unit 34 also provides, in units of TUs, the transform skip flag indicating presence of the transform skip to the lossless coding unit 36 and the inverse-orthogonal transformation unit 39. Then, the processing in step S45 is subsequently performed.

On the other hand, when the minimum TU size information is determined not to be provided from the skip setting unit 50 in step S40, and more specifically, when the skip permission information is zero, then the processing in step S44 is subsequently performed. When the transform skip is determined not to be able to be applied in step S41, the processing in step S44 is subsequently performed. Further, when the transform skip is determined not to be performed in step S42, the processing in step S44 is subsequently performed.

In step S44, the orthogonal transformation unit 34 outputs, in units of TUs, the orthogonal transform coefficient to the quantization unit 35. The orthogonal transformation unit 34 provides, in units of TUs, the transform skip flag indicating absence of the transform skip to the lossless coding unit 36 and the inverse-orthogonal transformation unit 39. Then, the processing in step S45 is subsequently performed.

In step S45, the quantization unit 35 quantize; the residual information or the orthogonal transform coefficients provided by the orthogonal transformation unit 34 in units of TUs, using the scaling list for each of the sizes of the TUs provided from the list setting unit 51. The quantization unit 35 provides the quantized value obtained as the result of the quantization to the lossless coding unit 36 and the inverse-quantization unit 38.

In step S46 of FIG. 12, the inverse-quantization unit 38 inversely quantizes, in units of TUs, the quantized values provided by the quantization unit 35 using the scaling list for each of the sizes of the TUs provided by the list setting unit 51. The inverse-quantization unit 38 provides the residual information or the orthogonal transform coefficient obtained as the result of the inverse-quantization to the inverse-orthogonal transformation unit 39.

In step S47, the inverse-orthogonal transformation unit 39 determines, in units of TUs, whether to perform transform skip or not on the basis of the transform skip flag provided from the orthogonal transformation unit 34.

When the transform skip flag indicates absence of the transform skip or the transform skip flag is not provided by the orthogonal transformation unit 34, the transform skip is determined not to be performed in step S47. Then, the processing in step S48 is subsequently performed.

In step S48, the inverse-orthogonal transformation unit 39 performs, in units of TUs, the inverse-orthogonal transform on the orthogonal transform coefficients provided by the inverse-quantization unit 38. The inverse-orthogonal transformation unit 39 provides the residual information obtained as the result to the adding unit 40, and the processing in step S49 is subsequently performed.

On the other hand, when the transform skip flag indicates presence of the transform skip, the transform skip is determined to be performed in step S47. Then, the inverse-orthogonal transformation unit 39 provides the residual information provided by the inverse-quantization unit 38 to the adding unit 40, and the processing in step S49 is subsequently performed.

In step S49, the adding unit 40 performs decoding by adding the residual information provided by the inverse-orthogonal transformation unit 39 and the prediction image provided by the prediction image selection unit 48. The adding unit 40 provides the decoded image to the deblock filter 41 and the frame memory 44.

In step S50, the deblock filter 41 performs deblocking filter processing on the decoded image provided from the adding unit 40. The deblock filter 41 provides the image obtained as the result to the adaptive offset filter 42.

In step S51, the adaptive offset filter 42 performs, for each LCU, adaptive offset filter processing on the image provided from the deblock filter 41. The adaptive offset filter 42 provides the image obtained as the result to the adaptive loop filter 43. The adaptive offset filter 42 provides, for each LCU, the offset filter information to the lossless coding unit 36.

In step S52, the adaptive loop filter 43 performs, for each LCU, the adaptive loop filter processing on the image provided from the adaptive offset filter 42. The adaptive loop filter 43 provides the image Obtained as the result to the frame memory 44. The adaptive loop filter 43 provides the filter coefficients used in the adaptive loop filter processing to the lossless coding unit 36.

In step S53, the frame memory 44 accumulates the image provided by the adaptive loop filter 43 and the image provided by the adding unit 40. Images which have not yet been subjected to the filter processing accumulated in the frame memory 44 and which are adjacent to the PU are provided as peripheral images to the intra-prediction unit 46 via the switch 45. On the other hand, the image which has been subjected to the filter processing accumulated in the frame memory 44 is output as the reference image to the motion prediction/compensation unit 47 via the switch 45.

In step S54, the lossless coding unit 36 performs lossless coding to encode, as encoded information, the intra-prediction mode information or the inter-prediction mode information, the motion vectors, and the information for identifying the reference image, the transform skip flag, the offset filter information, and the filter coefficients.

In step S55, the lossless coding unit 36 performs lossless coding to encode the quantized values provided by the quantization unit 35. Then, the lossless coding unit 36 generates the encoded data from the lossless coded quantized values and the lossless coded encoded information in the processing of step S54, and provides the encoded data to the accumulation buffer 37.

In step S56, the accumulation buffer 37 temporarily accumulates the encoded data provided by the lossless coding unit 36.

In step S57, the rate control unit 49 controls the rate of the quantization operation of the quantization unit 35 so as not to cause overflow and underflow, on the basis of the encoded data accumulated in the accumulation buffer 37. Then, the processing in step S12 of FIG. 10 is subsequently performed, and then the processing in step S13 is performed.

In the encoding processing of FIGS. 11 and 12, for the sake of simplifying the explanation, the intra-prediction processing and the motion prediction/compensation processing are performed at all times, but in reality, depending on the picture type and the like, only any one of the intra-prediction processing and the motion prediction/compensation processing may be performed.

Figure 13:
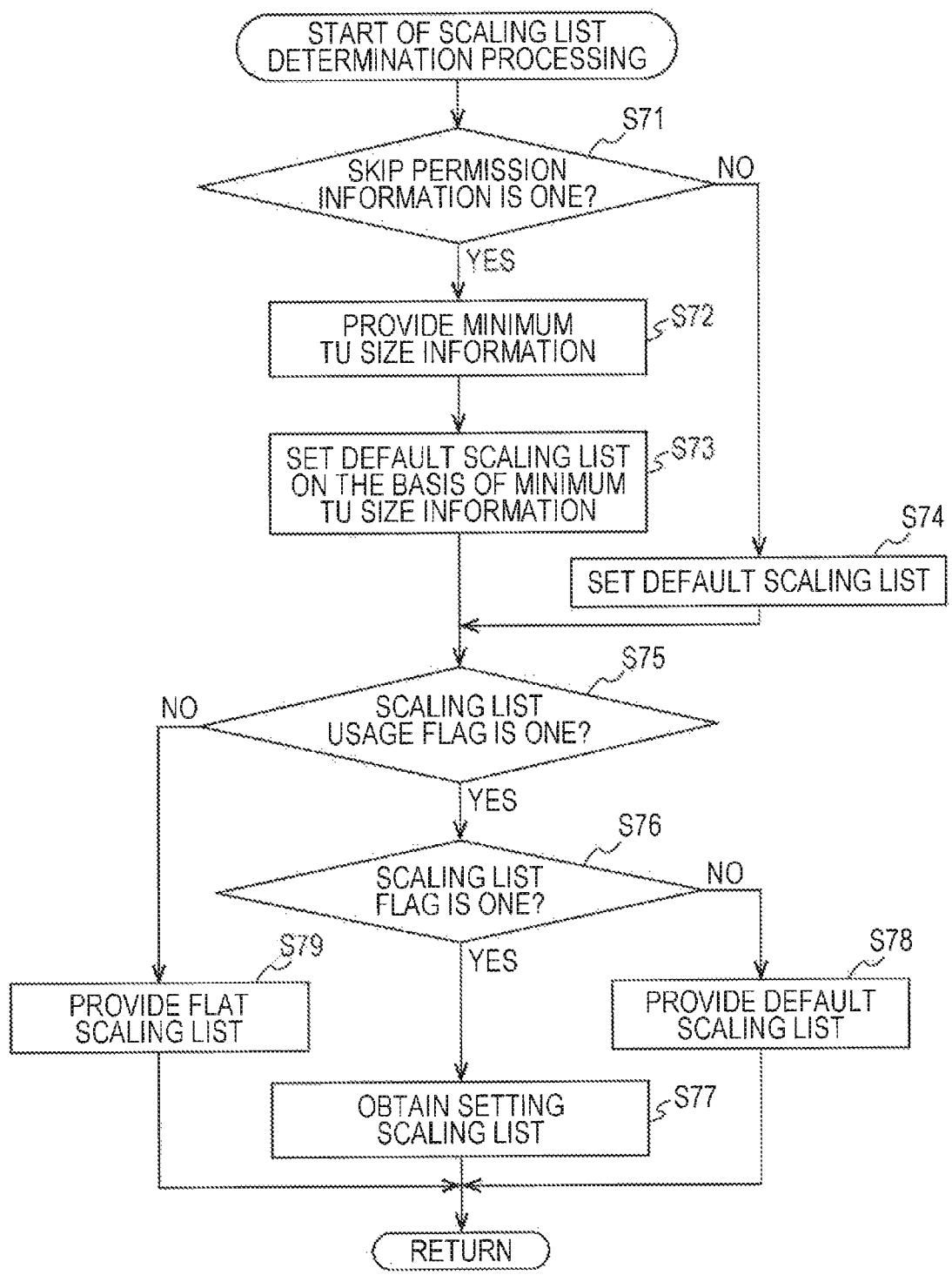
FIG. 13 is a flowchart for explaining the details of scaling list determination processing of FIG. 11.

FIG. 13 is a flowchart for explaining the details of scaling list determination processing in step S30 of FIG. 11.

In step S71 of FIG. 13, the skip setting unit 50 (FIG. 9) determines whether the skip permission information included in the PPS provided from the setting unit 11 of FIG. 1 is one or not. When the skip permission information is determined to be one in step S71, the skip setting unit 50 provides the minimum TU size information included in the SPS provided from the setting unit 11 to the orthogonal transformation unit 34 and the list setting unit 51 in step S72.

In step S73, the default setting unit 71 of the list setting unit 51 sets the default scaling list for each of the sizes of the TUs on the basis of the minimum TU size information provided from the skip setting unit 50. Then, the processing in step S75 is subsequently performed.

On the other hand, when the skip permission information is determined to be zero in step S71, the default setting unit 71 sets the default scaling list for each of the sizes of the TUs in step S74.

More specifically, the default setting unit 71 sets the flat matrix as the default scaling list for the TU having 4 by 4 pixels. The default setting unit 71 sets a matrix other than the flat matrix as the default scaling list of a TU of a size larger than the 4 by 4 pixels. Then, the processing in step S75 is subsequently performed.

In step S75, the list obtaining unit 73 determines whether the scaling list usage flag included in the SPS provided from the setting unit 11 is one or not. When the scaling list usage flag is determined to be one in step S75, the processing in step S76 is subsequently performed.

In step S76, the list obtaining unit 73 determines whether the SPS scaling list flag included in the SPS provided from the setting unit 11 or the PPS scaling list flag included in the PPS is one or not.

When the SPS scaling list flag or the PPS scaling list flag is determined to be one in step S76, the processing in step S77 is subsequently performed. In step S77, the list obtaining unit 73 obtains the setting scaling list, for each of the sizes of the TUs, included in the SPS or the PPS.

The first obtaining unit 73 provides the setting scaling list where the size of the TU is 4 by 4 pixels or 8 by 8 pixels, as it is, to the quantization unit 35 and the inverse-quantization unit 38. The list obtaining unit 73 upsamples the setting scaling list of 8 by 8 pixels where the size of the TU is 16 by 16 pixels or 32 by 32 pixels, generates a scaling list for 16 by 16 pixels or 32 by 32 pixels, and provides the scaling list to the quantization unit 35 and the inverse-quantization unit 38. Then, the processing in step S30 of FIG. 11 is subsequently performed, and then the processing in step S31 is performed.

On the other hand, when the SPS scaling list flag and the PPS scaling list flag is determined not to be one in step S76, the processing in step S78 is subsequently performed. In step S78, the default setting unit 71 provides, for each of the sizes of the TUs, the default scaling list to the quantization unit 35 and the inverse-quantization unit 38. Then, the processing in step S30 of FIG. 11 is subsequently performed, and then the processing in step S31 is performed.

When the scaling list usage flag is determined not to be one in step S75, the processing in step S79 is subsequently performed. In step S79, the flat setting unit 72 provides the stored flat scaling list for each of the sizes of the TUs to the quantization unit 35 and the inverse-quantization unit 38. Then, the processing in step S30 of FIG. 11 is subsequently performed, and then the processing in step S31 is performed.

As described above, the encoding device 10 sets the flat matrix as the default scaling list for the minimum size of the TU which is a size other than 4 by 4 pixels where the transform skip can be performed. Therefore, even when the transform skip is performed on a TU having a size other than 4 by 4 pixels, this can prevent the scaling list in the frequency domain other than the flat matrix from being used during the quantization of the TU in the pixel domain where the transform skip is performed. As a result, the encoding efficiency can be improved.

Example of Configuration of Embodiment of Decoding Device

Figure 14:
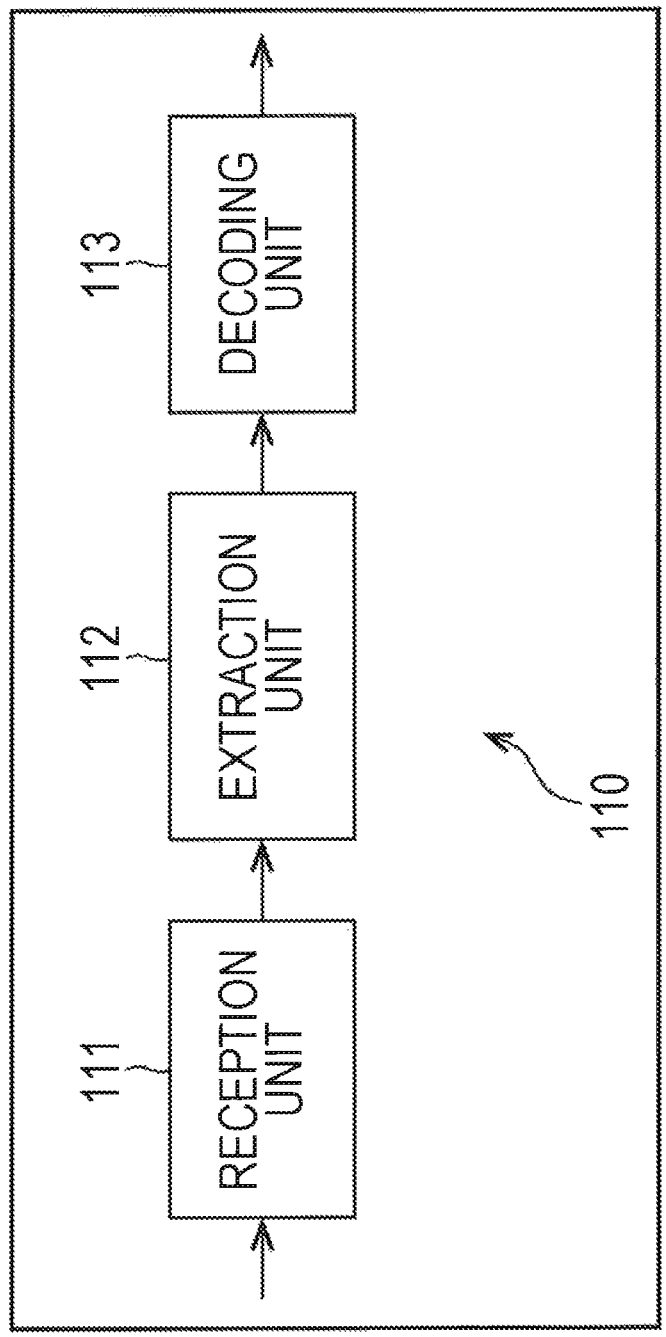
FIG. 14 is a block diagram illustrating an example of configuration of an embodiment of a decoding device to which the present disclosure is applied.

FIG. 14 is a block diagram illustrating an example of configuration of an embodiment of a decoding device to which the present disclosure is applied, wherein the decoding device is configured to decode an encoded stream transmitted from the encoding device 10 of FIG. 1.

The decoding device 110 of FIG. 14 includes a reception unit 111, an extraction unit 112, and a decoding unit 113.

The reception unit 111 of the decoding device 110 receives the encoded stream transmitted from the encoding device 10 of FIG. 1, and provides the encoded stream to the extraction unit 112.

The extraction unit 112 extracts the parameter set and the encoded data from the encoded stream provided from the reception unit 111, and provides the parameter set and the encoded data to the decoding unit 113.

The decoding unit 113 decodes the encoded data, which are provided from the extraction unit 112, in accordance with the method based on the HEVC method. At this occasion, as necessary, the decoding unit 113 also refers to the parameter set provided from the extraction unit 112. The decoding unit 113 outputs an image obtained as a result of decoding.

(Example of Configuration of Decoding Unit)

Figure 15:
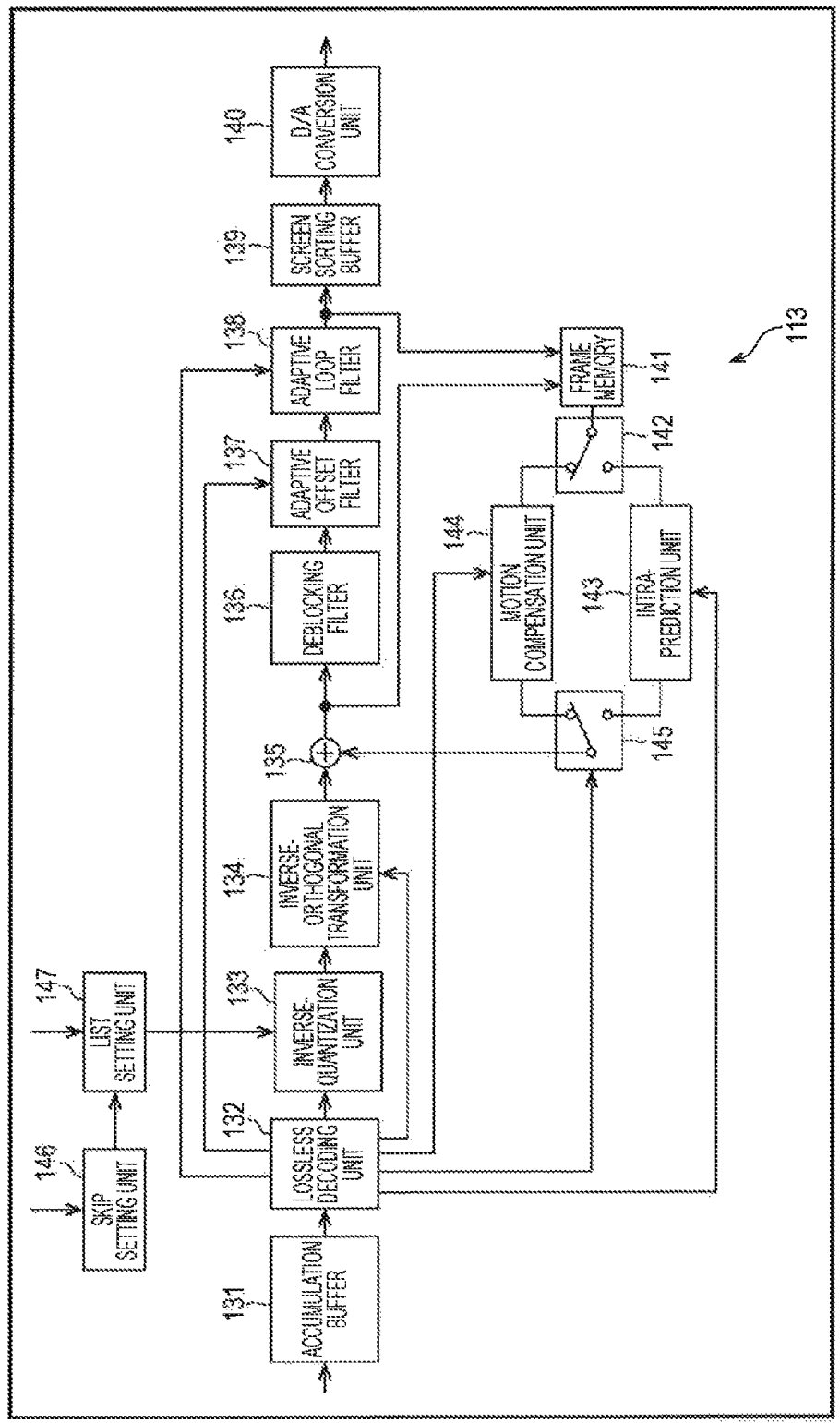
FIG. 15 is a block diagram illustrating an example of configuration of a decoding unit of FIG. 14.

FIG. 15 is a block diagram illustrating an example of configuration of the decoding unit 113 of FIG. 14.

The decoding unit 113 of FIG. 15 includes an accumulation buffer 131, a lossless decoding unit 132, art inverse-quantization unit 133, an inverse-orthogonal transformation unit 134, an adding unit 135, a deblock filter 136, an adaptive offset filter 137, an adaptive loop filter 138, and a screen sorting buffer 139. The decoding unit 113 also includes a D/A conversion unit 140, a frame memory 141, a switch 142, an intra-prediction unit 143, a motion compensation unit 144, a switch 145, a skip setting unit 146, and a list setting unit 147.

The accumulation buffer 131 of the decoding unit 113 receives the encoded data from the extraction unit 112 of FIG. 14, and accumulates the encoded data. The accumulation buffer 131 provides the accumulated encoded data to the lossless decoding unit 132.

The lossless decoding unit 132 performs lossless decoding such as variable-length decoding and arithmetic decoding on the encoded data from the accumulation buffer 131, thus obtaining the quantized value and the encoded information. The lossless decoding unit 132 provides the quantized value to the inverse-quantization unit 133. The lossless decoding unit 132 provides the intra-prediction mode information and the like which is the encoded information to the intra-prediction unit 143. The lossless decoding unit 132 provides the motion vectors, the inter-prediction mode information, the information for identifying the reference image, and the like to the motion compensation unit 144.

Further, the lossless decoding unit 132 provides the intra-prediction mode information or the inter-prediction mode information which is the encoded information to the switch 145. The lossless decoding unit 132 provides the offset filter information which is the encoded information to the adaptive offset filter 137. The lossless decoding unit 132 provides the filter coefficients which are the encoded information to the adaptive loop filter 138.

The lossless decoding unit 132 provides the transform skip flag which is the encoded information to the inverse-orthogonal transformation unit 134.

The inverse-quantization unit 133, the inverse-orthogonal transformation unit 134, the adding unit 135, the deblock filter 136, the adaptive offset filter 137, the adaptive loop filter 138, the frame memory 141, switch 142, the intra-prediction unit 143, the motion compensation unit 144, the skip setting unit 146, and the list setting unit 147 perform the same processing as the inverse-quantization unit 38, the inverse-orthogonal transformation unit 39, the adding unit 40, the deblock filter 41, the adaptive offset filter 42, the adaptive loop filter 43, the frame memory 41, the switch 45, the intra-prediction unit 46, the motion prediction/compensation unit 47, the skip setting unit 50, and the list setting unit 51, respectively, in FIG. 7, thus decoding the image.

More specifically, the inverse-quantization unit 133 uses the scaling list provided from the list setting unit 147 to perform inverse-quantization on the quantized values provided from the lossless decoding unit 132 in accordance with the method corresponding to the quantization method of the quantization unit 35 of FIG. 7. The inverse-quantization unit 133 provides the residual information or the orthogonal transform coefficients obtained as a result of the inverse-quantization to the inverse-orthogonal transformation unit 134.

The inverse-orthogonal transformation unit 134 performs, in units of TUs, inverse-orthogonal transform on the orthogonal transform coefficients provided from the inverse-quantization unit 133 on the basis of the transform skip flag provided from the lossless decoding unit 132. The inverse-orthogonal transformation unit 134 provides the residual information obtained as the result of the inverse-orthogonal transform or the residual information provided from the inverse-quantization unit 133 to the adding unit 135.

The adding unit 135 performs decoding by adding the residual information provided by the inverse-orthogonal transformation unit 134 and the prediction image provided by the switch 145. The adding unit 135 provides the decoded image to the deblock filter 136 and the frame memory 141.

The deblock filter 136 performs adaptive deblock filter processing on the image provided by the adding unit 135, and provides the image obtained as the result to the adaptive offset filter 137.

The adaptive offset filter 137 uses the offset indicated by the offset filter information given by the lossless decoding unit 132 to perform, for each LCU, the adaptive offset filter processing of the type indicated by the offset filter information to filter the image, which has been subjected to the adaptive deblock filter processing. The adaptive offset filter 137 provides the image that has been subjected to the adaptive offset filter processing to the adaptive loop filter 138.

The adaptive loop filter 138 uses the filter coefficients provided by the lossless decoding unit 132 to perform, for each LCU, the adaptive loop filter processing on the image provided by the adaptive offset filter 137. The adaptive loop filter 138 provides the image obtained as the result to the frame memory 141 and the screen sorting buffer 139.

The screen sorting buffer 139 stores, in units of frames, the images provided from the adaptive loop filter 138. The screen sorting buffer 139 sorts images in units of frames in the stored encoding order into the original display order, and provides the sorted images to the D/A conversion unit 140.

The D/A conversion unit 140 converts, from digital into analog, the images in units of frames provided from the screen sorting buffer 139, and outputs the converted image.

The frame memory 141 accumulates the image provided by the adaptive loop filter 138 and the image provided by the adding unit 135. Among the images which are accumulated in the frame memory 141 and which have not yet been subjected to the filter processing, images adjacent to the PU (Prediction Unit) are provided as peripheral images to the intra-prediction unit 143 via the switch 142. On the other hand, the images which have been subjected to the filter processing and accumulated in the frame memory 141 are output as reference image to the motion compensation unit 144 via the switch 142.

The intra-prediction unit 143 uses the peripheral images which have been read from the frame memory 141 via the switch 142 to perform the intra-prediction processing in the optimum intra-prediction mode indicated by the intra-prediction mode information provided from the lossless decoding unit 132. The intra-prediction unit 143 provides the prediction image generated as the result to the switch 145.

The motion compensation unit 144 reads, from the frame memory 141 via the switch 142, the reference image identified by the information for identifying the reference image provided from the lossless decoding unit 132. The motion compensation unit 144 uses the reference image and the motion vectors provided from the lossless decoding unit 132 to perform the motion compensation processing in the optimum inter-prediction mode indicated by the inter-prediction mode information provided from the lossless decoding unit 132. The motion compensation unit 144 provides the prediction image generated as the result to the switch 145.

When the intra-prediction mode information is provided from the lossless decoding unit 132, the switch 145 provides the prediction image provided from the intra-prediction unit 143 to the adding unit 135. On the other hand, when the inter-prediction mode information is provided from the lossless decoding unit 132, the switch 145 provides the prediction image provided from the motion compensation unit 144 to the adding unit 135.

The skip setting unit 146 provides the minimum TU size information included in the SPS provided from the extraction unit 112 to the list setting unit 147 on the basis of the skip permission information included in the PPS provided from the extraction unit 112 of FIG. 14.

The list setting unit 147 is configured in the same manner as the list setting unit 51 of FIG. 9. The list setting unit 147 sets the flat matrix as the default scaling list of the TU having 4 by 4 pixels and the minimum size indicated by the minimum TU size information on the basis of the minimum TU size information provided from the skip setting unit 146.

The list setting unit 147 sets a matrix other than the flat matrix as the default scaling list of a TU of a size larger than the minimum size indicated by the minimum TU size information.

The list setting unit 147 obtains the setting scaling list, each of the sizes of the TUs included in the SPS and the PPS, provided from the extraction unit 112. The list setting unit 147 provides, for each of the sizes of the TUs, the default scaling list, the setting scaling list, and the flat scaling list to the inverse-quantization unit 133 on the basis of the SPS.

(Explanation About Processing of Decoding Device)

Figure 16:
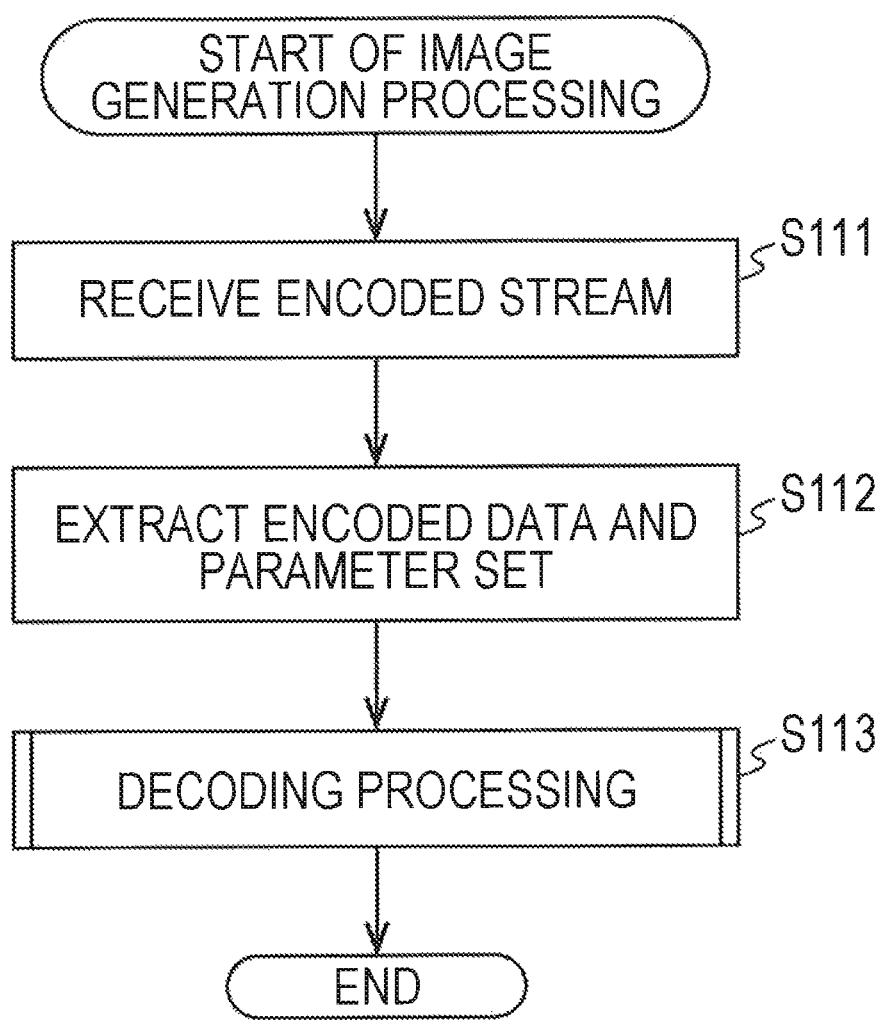
FIG. 16 is a flowchart for explaining image generation processing performed by the decoding device of FIG. 14.

FIG. 16 is a flowchart for explaining image generation processing performed by the decoding device 110 of FIG. 14.

In step S111 of FIG. 16, the reception unit 111 of the decoding device 110 receives the encoded stream transmitted from the encoding device 10 of FIG. 1, and provides the encoded stream to the extraction unit 112.

In step S112, the extraction unit 112 extracts the encoded data and the parameter set from the encoded stream provided from the reception unit 111, and provides the encoded data and the parameter set to the decoding unit 113.

In step S113, as necessary, the decoding unit 113 uses the parameter set provided from the extraction unit 112 to perform the decoding processing for decoding the encoded data provided from the extraction unit 112 in accordance with the method based on the HEVC method. The details of this decoding processing will be explained with reference to FIG. 17 explained later. Then, the processing is terminated.

Figure 17:
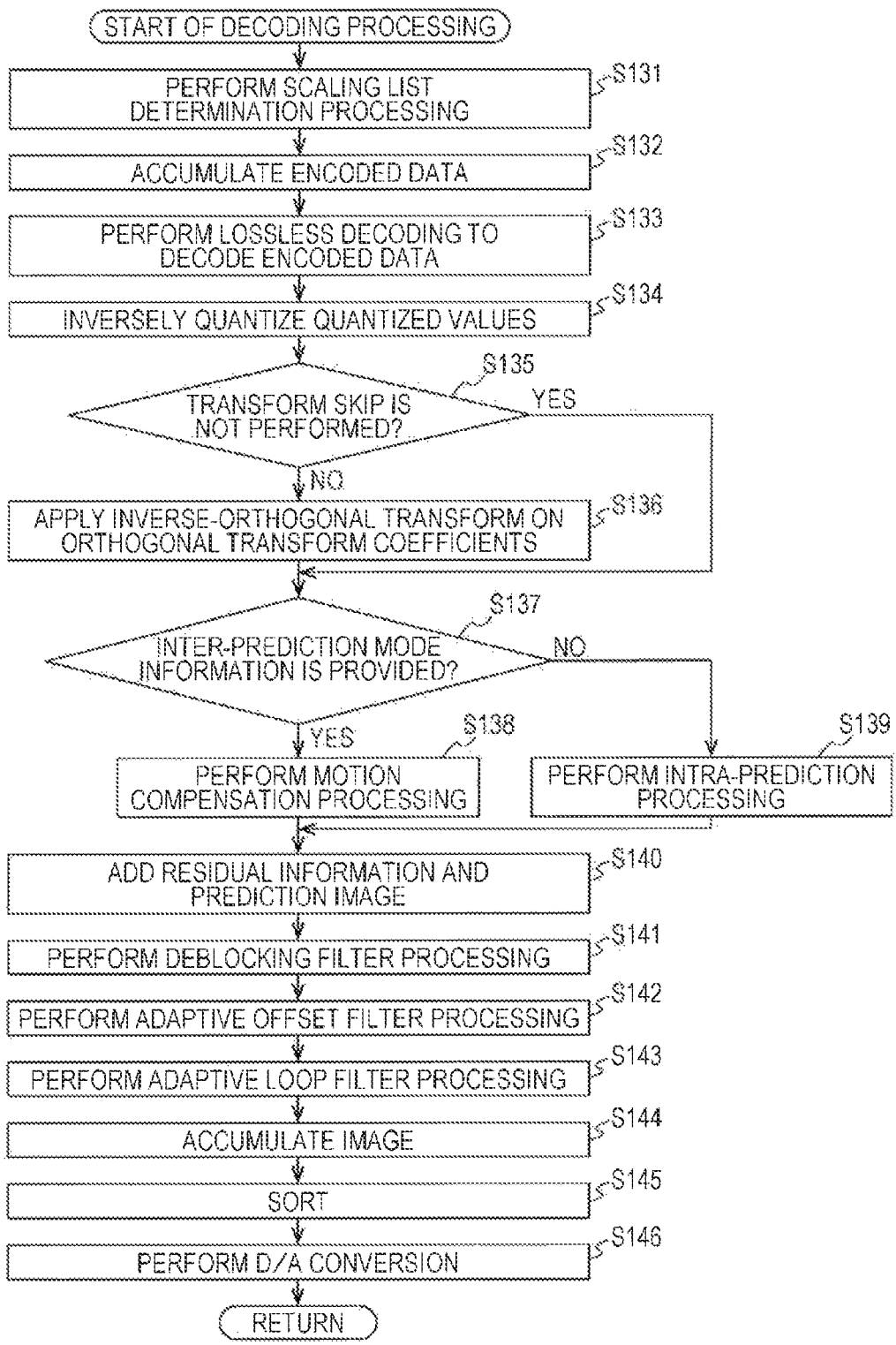
FIG. 17 is a flowchart for explaining the details of the decoding processing of FIG. 16.

FIG. 17 is a flowchart for explaining the details of the decoding processing in step S113 of FIG. 16.

In step S131 of FIG. 17, the decoding unit 113 (FIG. 15) performs the same scaling list determination processing as that of FIG. 13. However, the scaling list is provided only to the inverse-quantization unit 133.

In step S132, the accumulation buffer 131 receives the encoded data in units of frames from the extraction unit 112 of FIG. 14, and accumulates the encoded data. The accumulation buffer 131 provides the accumulated encoded data to the lossless decoding unit 132.

In step S133, the lossless decoding unit 132 performs lossless decoding to decode the encoded data given by the accumulation buffer 131, and obtains the quantized values and the encoded information. The lossless decoding unit 132 provides the quantized values to the inverse-quantization unit 133. The lossless decoding unit 132 provides the transform skip flag which is the encoded information to the inverse-orthogonal transformation unit 134.

The lossless decoding unit 132 provides the intra-prediction mode information and the like which are the encoded information to the intra-prediction unit 143. The lossless decoding unit 132 provides the motion vectors, the inter-prediction mode information, the information for identifying the reference image, and the like to the motion compensation unit 144.

Further, the lossless decoding unit 132 provides the intra-prediction mode information or the inter-prediction mode information which is the encoded information to the switch 145. The lossless decoding unit 132 provides the offset filter information which is the encoded information to the adaptive offset filter 137. The lossless decoding unit 132 provides the filter coefficients to the adaptive loop filter 138.

In step S134, the inverse-quantization unit 133 uses the scaling list for each of the sizes of the TUs provided from the list setting unit 147 to inversely quantize, in units of TUs, the quantized values given by the lossless decoding unit 132. The inverse-quantization unit 133 provides the residual information or the orthogonal transform coefficients obtained as the result to the inverse-orthogonal transformation unit 134.

In step S135, the inverse-orthogonal transformation unit 134 determines, in units of TUs, whether the transform skip is performed or not on the basis of the transform skip flag provided from the lossless decoding unit 132.

When the transform skip flag indicates absence of the transform skip or the transform skip flag is not provided by the lossless decoding unit 132, the transform skip is determined not to be performed in step S135. Then, the processing in step S136 is subsequently performed.

In step S136, the inverse-orthogonal transformation unit 134 performs, in units of TUs, the inverse-orthogonal transform on the orthogonal transform coefficients provided by the inverse-quantization unit 133. The inverse-orthogonal transformation unit 134 provides the residual information obtained as the result to the adding unit 135, and the processing in step S137 is subsequently performed.

On the other hand, when the transform skip flag indicates presence of the transform skip, the transform skip is determined to be performed in step S135. Then, the inverse-orthogonal transformation unit 134 provides the residual information provided by the inverse-quantization unit 133 to the adding unit 135, and the processing in step S137 is subsequently performed.

In step S137, the motion compensation unit 144 determines whether the inter-prediction mode information is provided from the lossless decoding unit 132 or not. When the inter-prediction mode information is determined to be provided in step S137, the processing in step S138 is subsequently performed.

In step S138, the motion compensation unit 144 reads the reference image on the basis of the reference image identification information provided from the lossless decoding unit 132, and uses the motion vectors and the reference image to perform the motion compensation processing in the optimum inter-prediction mode indicated by the inter-prediction mode information. The motion compensation unit 144 provides the prediction image generated as the result to the adding unit 135 via the switch 145, and the processing in step S140 is subsequently performed.

On the other hand, when the inter-prediction mode information is determined not to be provided in step S137, and more specifically, when the intra-prediction mode information is provided to the intra-prediction unit 143, the processing in step S139 is subsequently performed.

In step S139, the intra-prediction unit 143 uses the peripheral images that are read from the frame memory 141 via the switch 142 to perform the intra-prediction processing in the intra-prediction mode indicated by the intra-prediction mode information. The intra-prediction unit 143 provides the prediction image generated as the result of the intra-prediction processing to the adding unit 135 via the switch 145, and the processing in step S140 is subsequently performed.

In step S140, the adding unit 135 performs decoding by adding the residual information provided by the inverse-orthogonal transformation unit 134 and the prediction image provided by the switch 145. The adding unit 135 provides the decoded image to the deblock filter 136 and the frame memory 141.

In step S141, the deblock filter 136 performs the deblocking filter processing on the image provided by the adding unit 135, thus removing block noise. The deblock filter 136 provides the image obtained as the result to the adaptive offset filter 137.

In step S142, the adaptive offset filter 137 performs, for each LCU, the adaptive offset filter processing on the image which has been subjected to the deblock filter processing by the deblock filter 136 on the basis of the offset filter information provided from the lossless decoding unit 132, and the adaptive offset filter 137 provides the image that has been subjected to the adaptive offset filter processing to the adaptive loop filter 138.

In step S143, the adaptive loop filter 138 uses the filter coefficients provided by the lossless decoding unit 132 to perform, for each LCU, the adaptive loop filter processing on the image provided by the adaptive offset filter 137. The adaptive loop filter 138 provides the image obtained as the result to frame memory 141 and the screen sorting buffer 139.

In step S144, the frame memory 141 accumulates the image provided by the adding unit 135 and the image provided by the adaptive loop filter 138. Among the images which are accumulated in the frame memory 141 and which have not yet been subjected to the filter processing, images adjacent to the PU (Prediction Unit) are provided as peripheral images to the intra-prediction unit 143 via the switch 142. On the other hand, the images which have been subjected to the filter processing and accumulated in the frame memory 141 are provided as reference image to the motion compensation unit 144 via the switch 142.

In step S145, the screen sorting buffer 139 stores, in units of frames, the images provided from the adaptive loop filter 138, and sorts images in units of frames in the stored encoding order into the original display order, and provides the sorted images to the D/A conversion unit 140.

In step S146, the D/A conversion unit 140 converts, from digital into analog, the images in units of frames provided from the screen sorting buffer 139, and output the converted image. Then, the processing in step S113 of FIG. 16 is subsequently performed, and the processing is terminated.

As described above, like the encoding device 10, the decoding device 110 sets the flat matrix as the default scaling list of the minimum size of the TU which is a size other than 4 by 4 pixels where the transform skip can be performed. Therefore, this can decode the encoded stream encoded so as to improve the encoding efficiency in a case where the encoding device 10 performs the transform skip of a TU having a size other than 4 by 4 pixels.

In the first embodiment, the transform skip can be performed on the TV of the minimum size as described in NPL 4. Alternatively, as described in NPL 3, the transform skip may be performed on the TUs of all the sizes. In this case, the default scaling lists of all the sizes are the flat matrix.

Still alternatively, the transform skip may be performed on a TU of a size equal to or less than a predetermined size. In this case, for example, the encoding device 10 sets, in the PPS and the like, skip TU information representing the maximum size of the TU where the transform skip can be performed, and transmits the skip TU information to the decoding device 110. The encoding device 10 and the decoding device 110 set the flat matrix as the default scaling list of a size equal to or less than a size indicated by the skip TU information where the transform skip can be performed on the basis of the skip TU information For example, when the skip TU information indicates 16 by 16 pixels, the default scaling lists of the TUs of 4 by 4 pixels, 8 by 8 pixels, and 16 by 16 pixels are configured to be the flat matrix.

It should be noted that the size indicated by the skip TU information needs to be equal to or more than the minimum size of the TU indicated by the minimum TU size information and needs to be equal to or less than the maximum size of the TU. The maximum size of the TU can be derived from the minimum TU size information and difference information (log 2_diff_max_min_transform_blocksize) representing difference between the minimum size of the TU and the maximum size thereof.

The skip TU information may be separately set for each of the TV that is intra-encoded and the TU that is inter-encoded. The skip TV information may be separately set for each of the TU of the Y signal, the TU of the Cb signal, and the TU of the Cr signal.

It should be noted that presence/absence of usage of the scaling list during the quantization may be controlled in units of slices. In this case, when the scaling list usage flag included in the SPS is one, a flag (scaling_list_enabled_flag) indicating whether the scaling list is used or not during the quantization of the corresponding slice is set in the slice header. Therefore, even when whether a slice is suitable for the quantization using the scaling list or not is different depending on each slice, the quantization can be done in an optimum manner.

Likewise, presence/absence of usage of the scaling list during the quantization may be controlled in units of CUs and in units of TUs.

Second Embodiment (Explanation About Computer to which the Present Disclosure is Applied)

The above series of processing may be executed by hardware, or may be executed by software. When the series of processing is executed by software, programs constituting the software are installed to the computer. Here, the computer includes a computer incorporated into dedicated hardware and, for example, a general-purpose personal computer capable of executing various kinds of functions by installing various kinds of programs.

Figure 18:
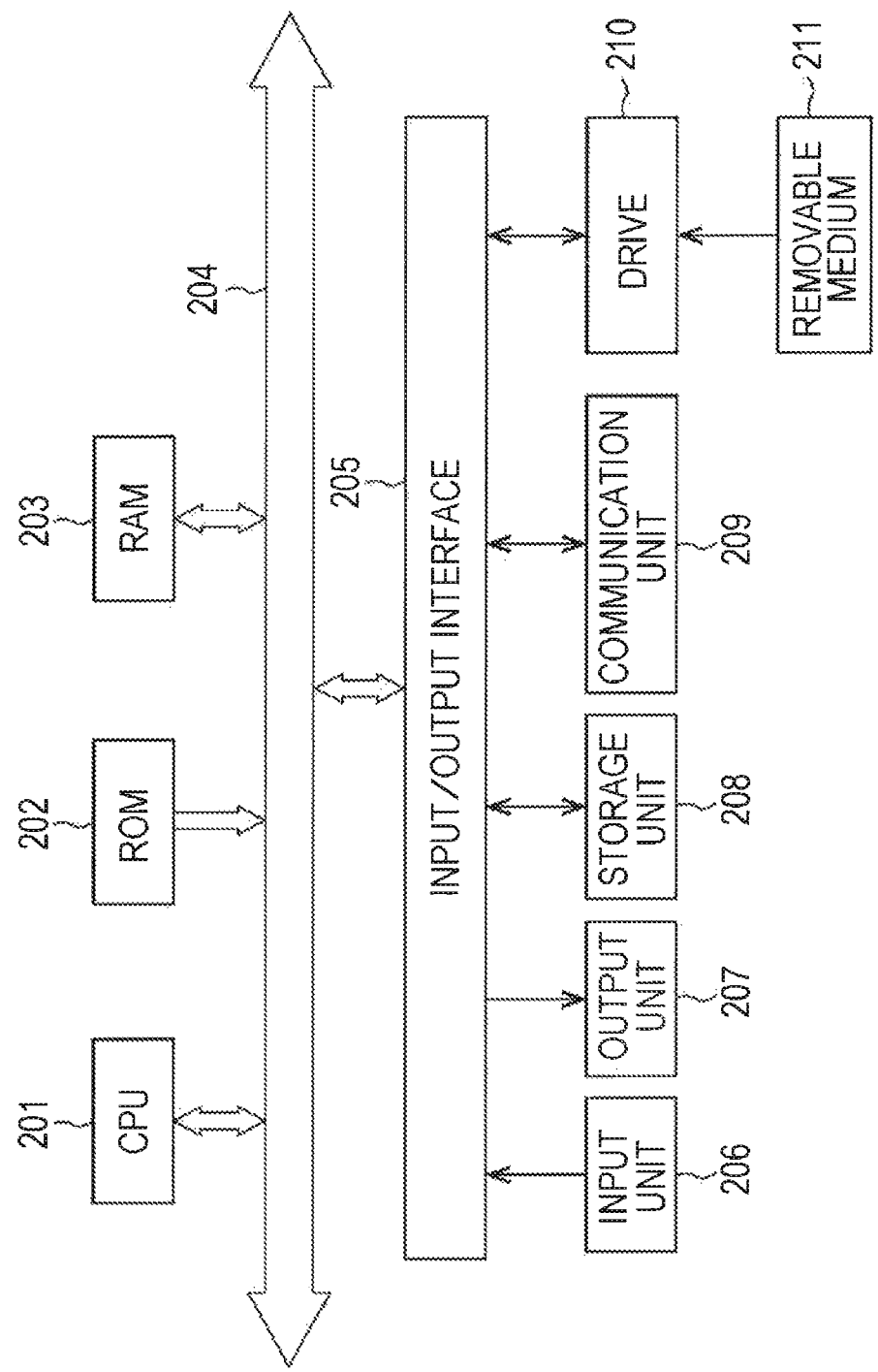
FIG. 18 is a block diagram illustrating an example of configuration of hardware of a computer.

FIG. 18 is a block diagram illustrating an example of configuration of hardware of a computer which executes the above series of processing by using programs.

In a computer, a CPU (Central Processing Unit) 201, a ROM (Read Only Memory) 202, a RAM (Random Access Memory) 203 are connected with each other via a bus 204.

The bus 204 is further connected with an input/output interface 205. The input/output interface 205 is connected with an input unit 206, an output unit 207, a storage unit 208, a communication unit 209, and a drive 210.

The input unit 206 is constituted by a keyboard, a mouse, a microphone, and the like. The output unit 207 is constituted by a display, a speaker, and the like. The storage unit 208 is constituted by a hard disk, a nonvolatile memory, and the like. The communication unit 209 is constituted by a network interface and the like. The drive 210 drives a removable medium 211 such as a magnetic disk, an optical disk, a magneto-optical disk, and a semiconductor memory.

In the computer configured as described above, the CPU 201 performs the above series of processing by, for example, executing the program stored in the storage unit 208 by loading the program to the RAM 203 via the input/output interface 205 and the bus 204.

The program executed by the computer (CPU 201) may be provided as being recorded to the removable medium 211 serving as, for example, a package medium. Further, the program can be provided via wired or wireless transmission media such as local area network, the Internet, and digital satellite broadcasting.

In the computer, the program can be installed to the storage unit 208 via the input/output interface 205 by loading the removable medium 211 to the drive 210. Further, the program can be installed to the storage unit 208 by receiving the program with the communication unit 209 via wired or wireless transmission media. Further, the program can be installed to the ROM 202 and the storage unit 208 beforehand.

It should be noted that the program executed by the computer may be a program with which processing is performed in sequence according to the order explained in this specification, or may be a program with which processing is performed in parallel or with necessary timing, for example, upon call.

Third Embodiment (Application to Multi-Viewpoint Image Coding/Multi-Viewpoint Image Decoding)

Figure 19:
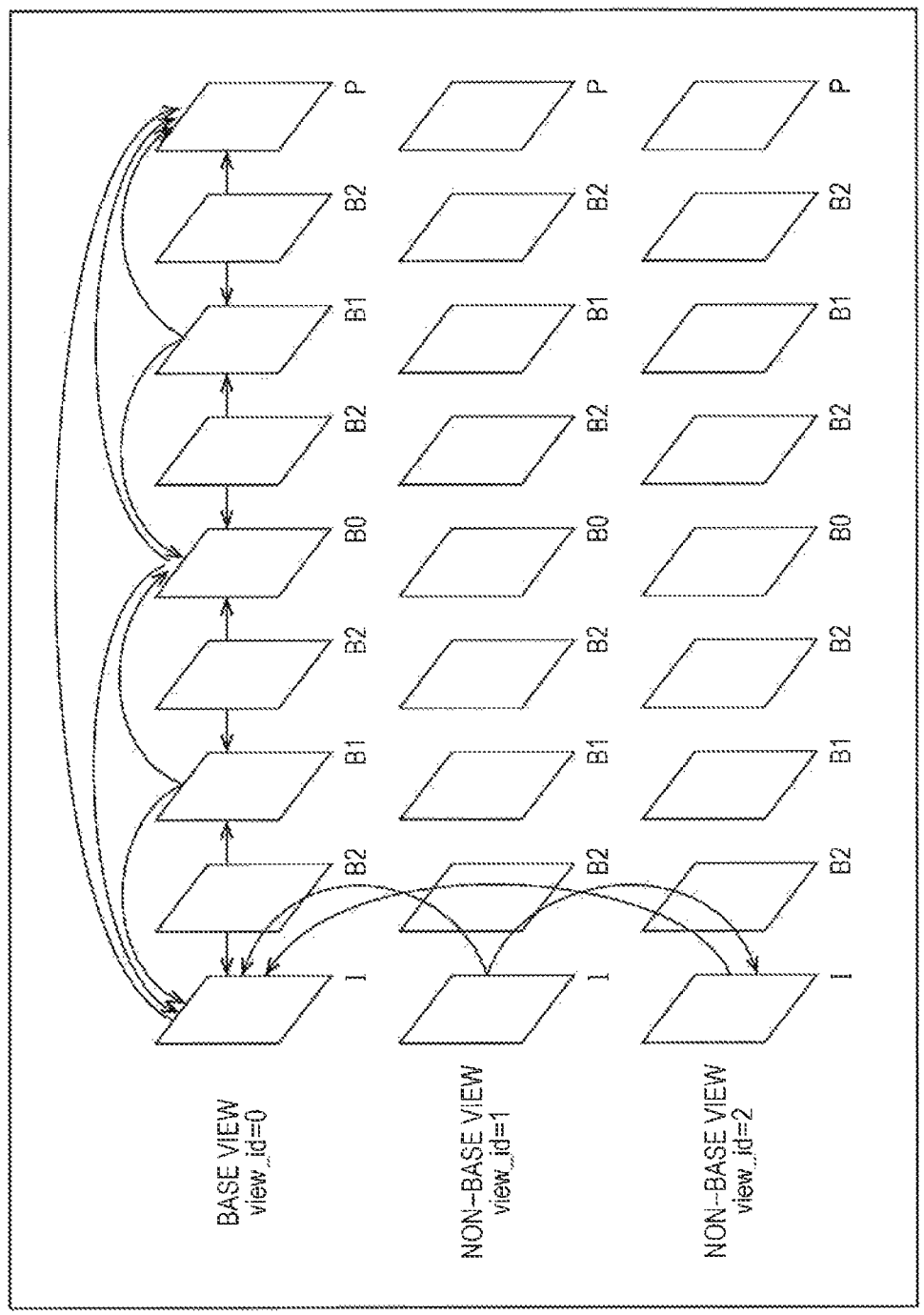
FIG. 19 is a figure illustrating an example of a multi-viewpoint image coding method.

The above series of processing can be applied to multi-viewpoint image coding/multi-viewpoint image decoding. FIG. 19 illustrates an example of multi-viewpoint image coding method.

As illustrated in FIG. 19, a multi-viewpoint image includes images for multiple view points (views). Multiple views of this multi-viewpoint image include a base view encoded/decoded using only the image of the view in question without using any image of another view, a non-base view encoded/decoded using any image of another view. The non-base view may use the image of the base view, or may use the image of another non-base view.

When the multi-viewpoint image as shown in FIG. 19 is encoded/decoded, the image of each view is encoded/decoded, but the method of the first embodiment may be applied to the encoding/decoding of each view. By doing so, the encoding efficiency where the transform skip is applied to a block of a size other than 4 by 4 pixels can be improved.

Further, in encoding/decoding of each view, a flag and a parameter used in the method of the first embodiment may be shared. More specifically, for example, SPS, PPS, syntax element of residual_coding, and the like may be shared in encoding/decoding of each view. It is to be understood that the required information other than that may also be shared in encoding/decoding of each view.

By doing so, this can suppress transmission of redundant information, and can reduce the amount of information transmitted the amount of codes) (i.e., this can suppress reduction in the encoding efficiency).

(Multi-Viewpoint Image Coding Device)

Figure 20:
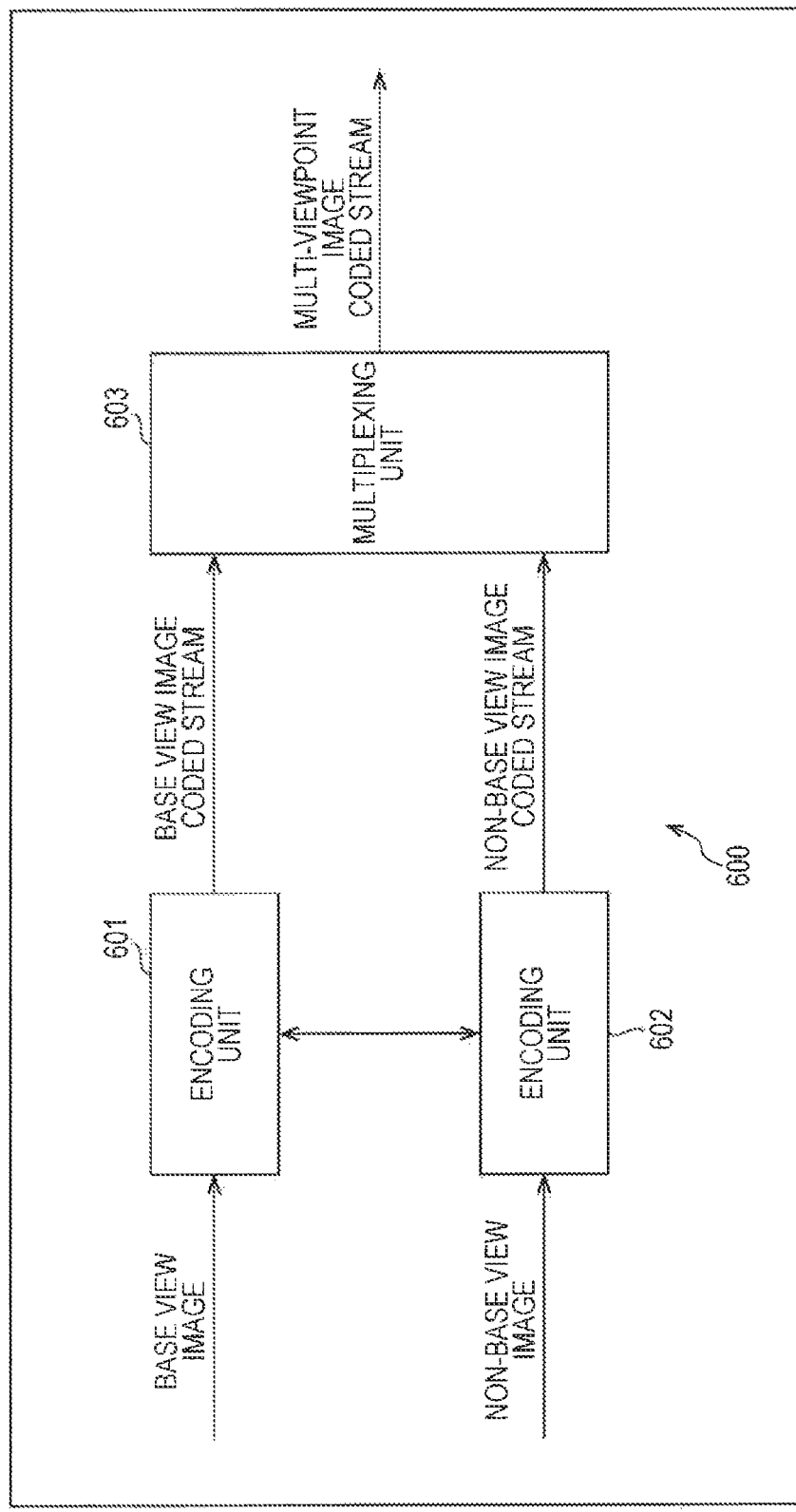
FIG. 20 is a figure illustrating an example of a configuration of a multi-viewpoint image coding device to which the present disclosure is applied.

FIG. 20 is a figure illustrating a multi-viewpoint image coding device performing the multi-viewpoint image coding. As shown in FIG. 20, a multi-viewpoint image coding device 600 includes an encoding unit 601, an encoding unit 602, and a multiplexing unit 603.

The encoding unit 601 encodes base view images, and generates a base view image coded stream. The encoding unit 602 encodes non-base view images, and generates a non-base view image coded stream. The multiplexing unit 603 multiplexes the base view image coded stream generated by the encoding unit 601 and the non-base view image coded stream generated by the encoding unit 602, and generates a multi-viewpoint image coded stream.

The encoding device 10 (FIG. 1) can be applied to the encoding unit 601 and encoding unit 602 of the multi-viewpoint image coding device 600. In this case, the encoding efficiency where the transform skip is applied to a block of a size other than 4 by 4 pixels can be improved in the encoding of each view. The encoding unit 601 and the encoding unit 602 can perform encoding using the same flag and parameter as each other (for example, syntax element of processing between images and the like) (more specifically, the flag and the parameter can be shared), and therefore, this can suppress reduction of the encoding efficiency.

(Multi-Viewpoint Image Decoding Device)

Figure 21:
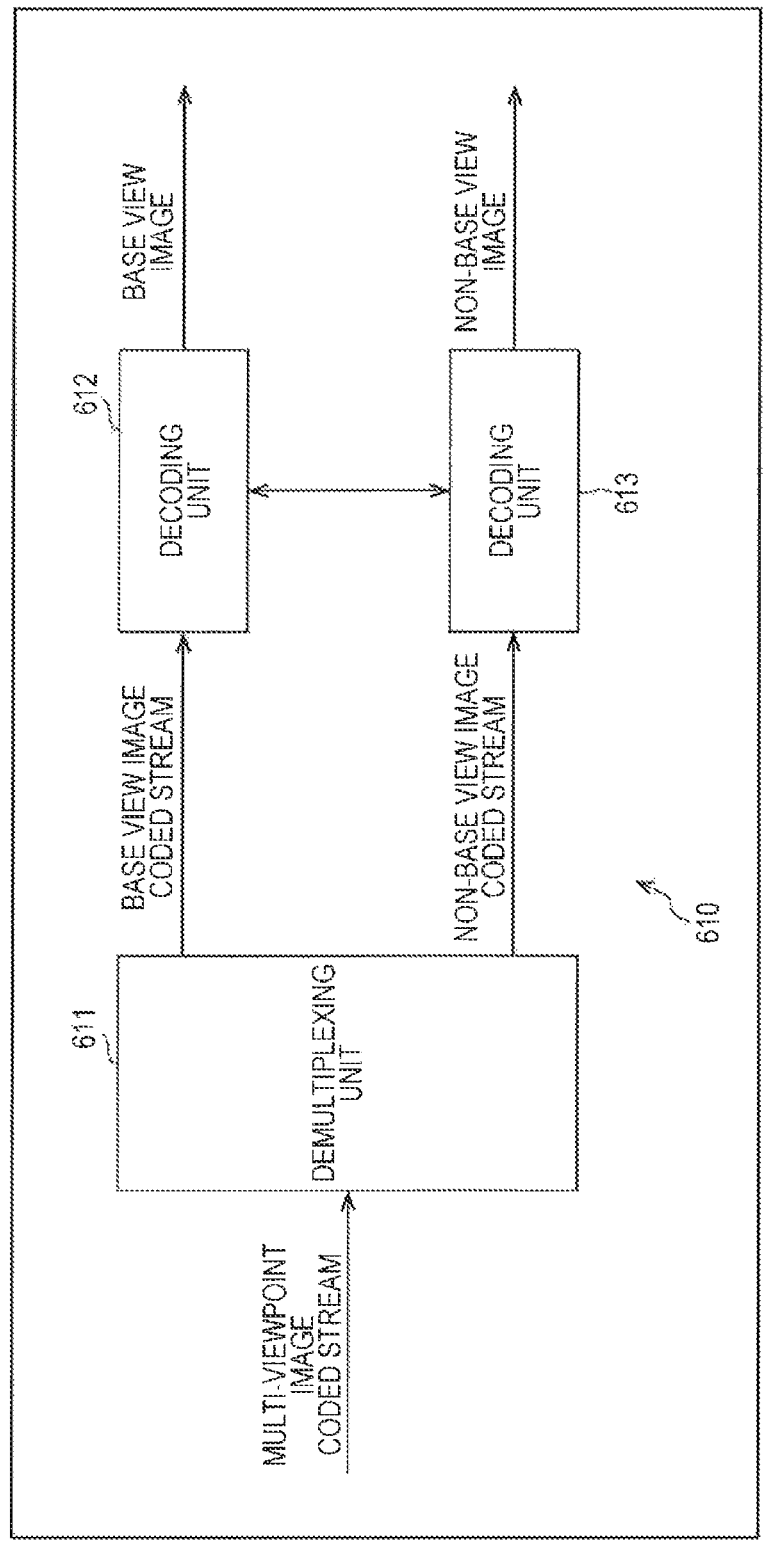
FIG. 21 is a figure illustrating an example of a configuration of a multi-viewpoint image decoding device to which the present disclosure is applied.

FIG. 21 is a figure illustrating a multi-viewpoint image decoding device performing the multi-viewpoint image decoding. As shown in FIG. 21, the multi-viewpoint image decoding device 610 includes a demultiplexing unit 611, a decoding unit 612, and a decoding unit 613.

The demultiplexing unit 611 demultiplexes the multi-viewpoint image coded stream obtained by multiplexing the base view image coded stream and the non-base view image coded stream, and extracts the base view image coded stream and the non-base view image coded stream. The decoding unit 612 decodes (he base view image coded stream extracted by the demultiplexing unit 611, and obtains the base view image. The decoding unit 613 decodes the non-base view image coded stream extracted by the demultiplexing unit 611, and obtains the non-base view image.

The decoding device 110 (FIG. 14) can be applied to the decoding unit 612 and the decoding unit 613 of this multi-viewpoint image decoding device 610. More specifically, in decoding of each view, the encoded stream can be decoded, of which encoding efficiency where the transform skip is applied to a block of a size other than 4 by 4 pixels has been improved. The decoding unit 612 and the decoding unit 613 can perform decoding using the same flag and parameter as each other (for example, syntax element of processing between images and the like) (more specifically, the flag and the parameter can be shared), and therefore, this can suppress reduction of the encoding efficiency.

Fourth Embodiment (Application to Hierarchical Image Coding/Hierarchical Image Decoding)

Figure 22:
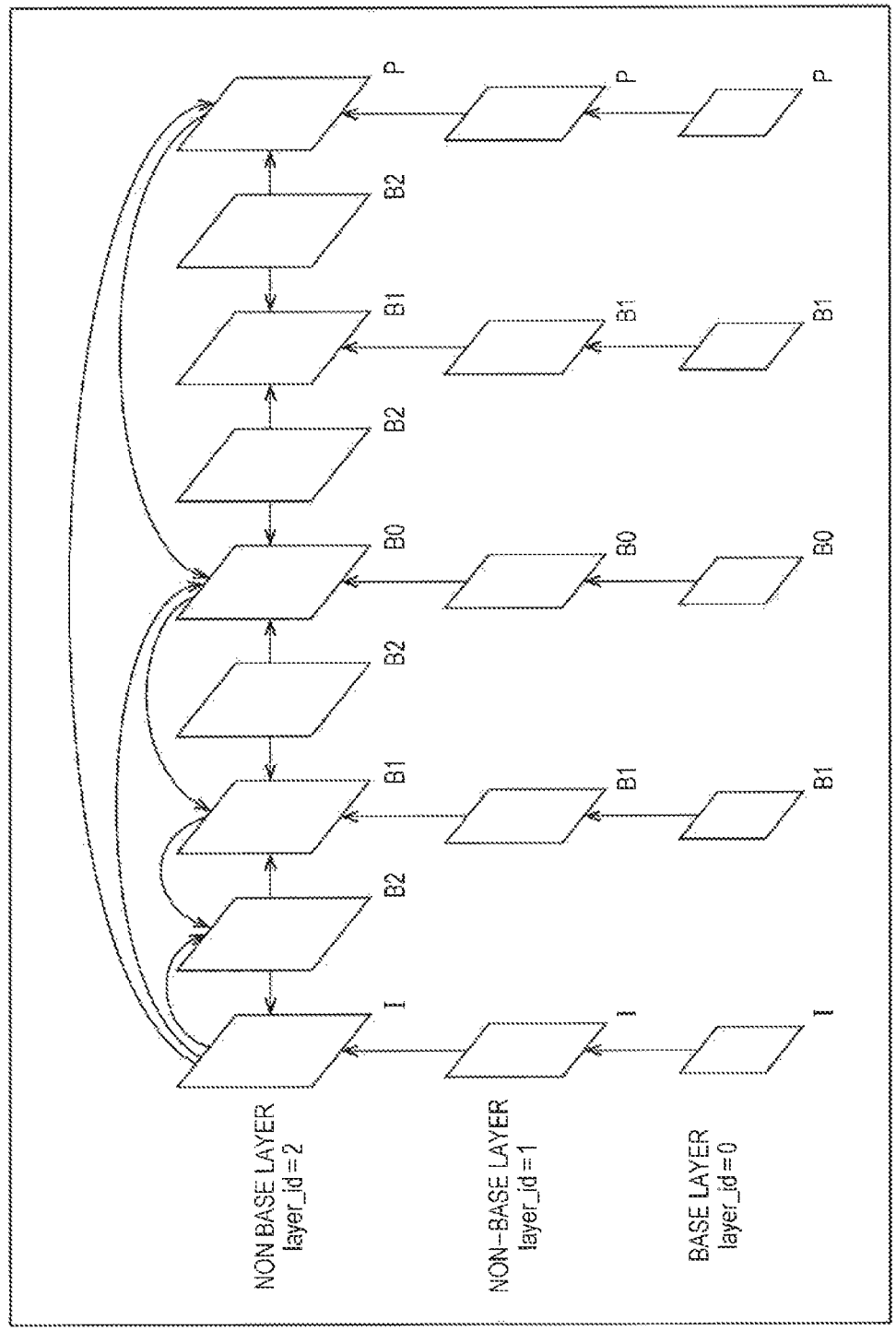
FIG. 22 is a figure illustrating an example of a hierarchical image coding method.

The above series of processing can be applied to hierarchical image coding/hierarchical image decoding (scalable encoding/scalable decoding). FIG. 22 illustrates an example of a hierarchical image coding method.

The hierarchical image coding (scalable encoding) is to make an image into multiple layers (into hierarchy) and encode image data for each layer so that a scalable function is provided for a predetermined parameter. The hierarchical image decoding (scalable decoding) is decoding which corresponds to the hierarchical image coding.

As shown in FIG. 22, when the image is made into hierarchy, a single image is divided into multiple images (layers) while the predetermined parameter having the scalable function is adopted as the reference. The image made into the hierarchy (hierarchical image) includes multiple levels (layers) of images in the hierarchy of which values of the predetermined parameters are different from each other. Multiple layers of the hierarchical images include a base layer encoded/decoded using only the image in the layer in question without using any image in another layer and a non-base layer (also referred to as an enhancement layer) encoded/decoded using an image in another layer. The non-base layer may be configured to use the image in the base layer or may be configured to use an image in another non-base layer.

In general, the non-base layer is structured by data of a difference image (difference data) between the image in question and the image in another layer so as to reduce redundancy. For example, when a single image is made into two levels of hierarchy, which are the base layer and the non-base layer (also referred to as enhancement layer), an image of which quality is lower than the original image can be obtained from the data of the base layer, and the original image (which is high quality image) can be obtained by combining the data in the base layer and the data in the non-base layer.

As described above, by making the image into hierarchy, images of various levels of qualities can be easily obtained depending on the circumstances. For example, image compression information in only the base layer is transmitted to a terminal of which performance is low such as a cellular phone, which reproduces a motion picture with a low space-time resolution or a low image quality, and not only the image compression information in the base layer but also the image compression information in the enhancement layer are transmitted to a terminal of which processing performance is high such as a television and a personal computer, which reproduces a motion picture with a high space-time resolution or a high image quality. In this manner, without performing transcode processing, the image compression information can be transmitted from the server in accordance with the performance of the terminal or the network.

When the hierarchical image as shown in the example of FIG. 22 is encoded/decoded, the image in each layer is encoded/decoded, but the method of the first embodiment explained above may be applied to the encoding/decoding in each layer. By doing so, the encoding efficiency where the transform skip is applied to a block of a size other than 4 by 4 pixels can be improved.

Further, in encoding/decoding of each year, the flag and the parameter used in the method of the first embodiment may be sharede. More specifically, for example, SPS, PPS, syntax element of residual_coding, and the like may be shared in encoding/decoding of each layer. It is to be understood that the required information other than that may also be shared in encoding/decoding of each layer.

By doing so, this can suppress transmission of redundant information, and can reduce the amount of information transmitted (the amount of codes) (i.e., this can suppress reduction in the encoding efficiency).

(Scalable Parameter)

Figure 23:
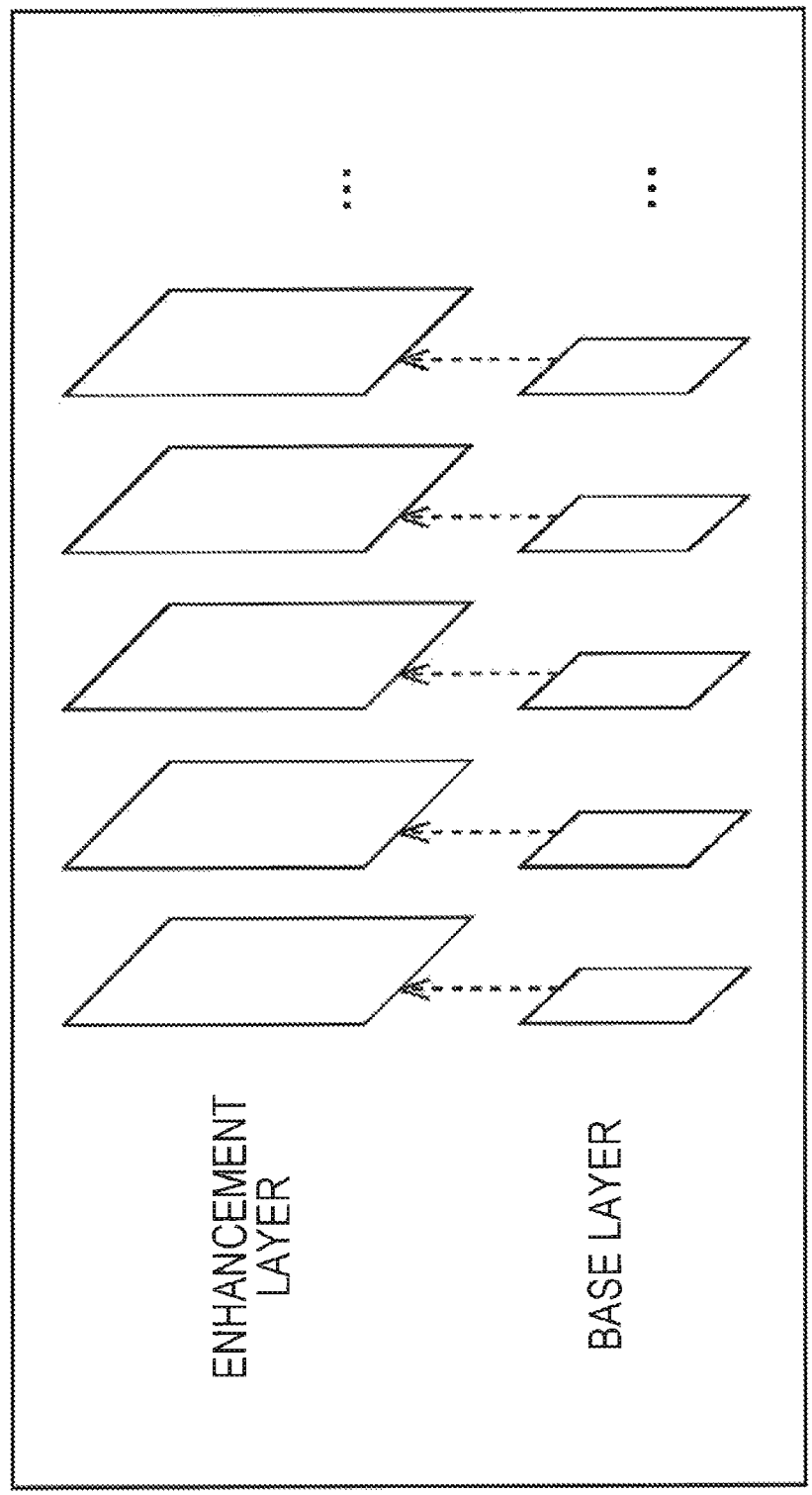
FIG. 23 is a figure for explaining an example of a spatial scalable encoding.

In such hierarchical image coding/hierarchical image decoding (scalable encoding/scalable decoding), a parameter having a scalable function may be any given parameter. For example, the space resolution as shown in FIG. 23 may be adopted as the parameter (spatial scalability). In the case of this spatial scalability, the resolution of the image is different for each layer. More specifically, the resolution of the image is different for each layer. In this case, as shown in FIG. 23, each picture is classified into two levels of hierarchy, which includes a base layer which is a lower resolution in terms of space than the original image and an enhancement layer which provides the original space resolution when the enhancement layer is combined with the base layer. It is to be understood that the number of levels in the hierarchy is merely an example. It can be made into any given number of levels of hierarchy.

Figure 24:
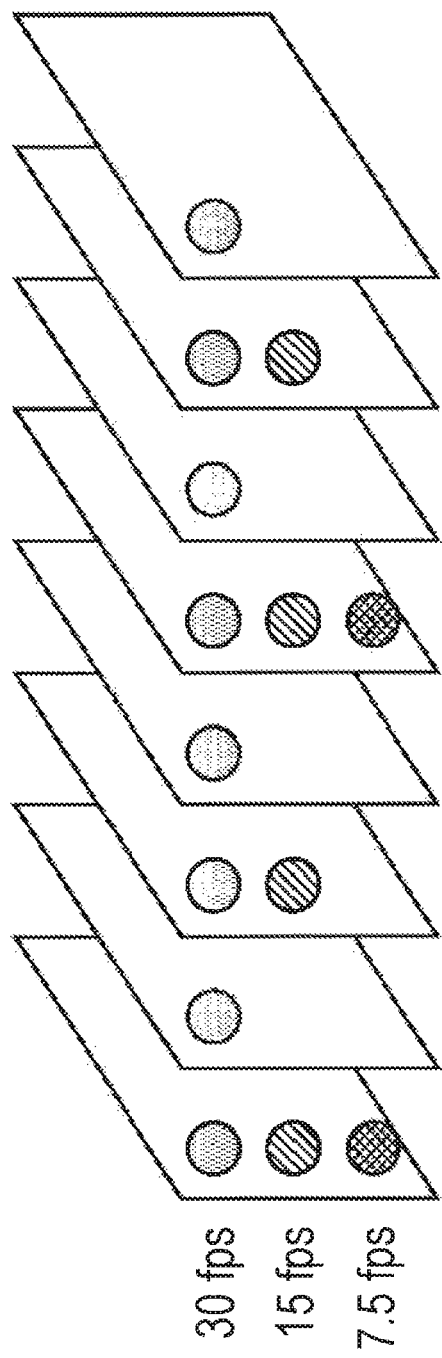
FIG. 24 is a figure for explaining an example of temporal scalable encoding.

Alternatively, for example, a time resolution as shown in FIG. 24 may be applied as a parameter for giving such scalability (temporal scalability). In the case of the temporal scalability, the frame rate is different for each layer. More specifically, in this case, as shown in FIG. 24, each picture is classified into two levels of hierarchy, which includes a base layer which is of a lower frame rate than the original motion picture and an enhancement layer which provides the original frame rate when the enhancement layer is combined with the base layer. It is to be understood that the number of levels in the hierarchy is merely an example. It can be made into any given number of levels of hierarchy.

Figure 25:
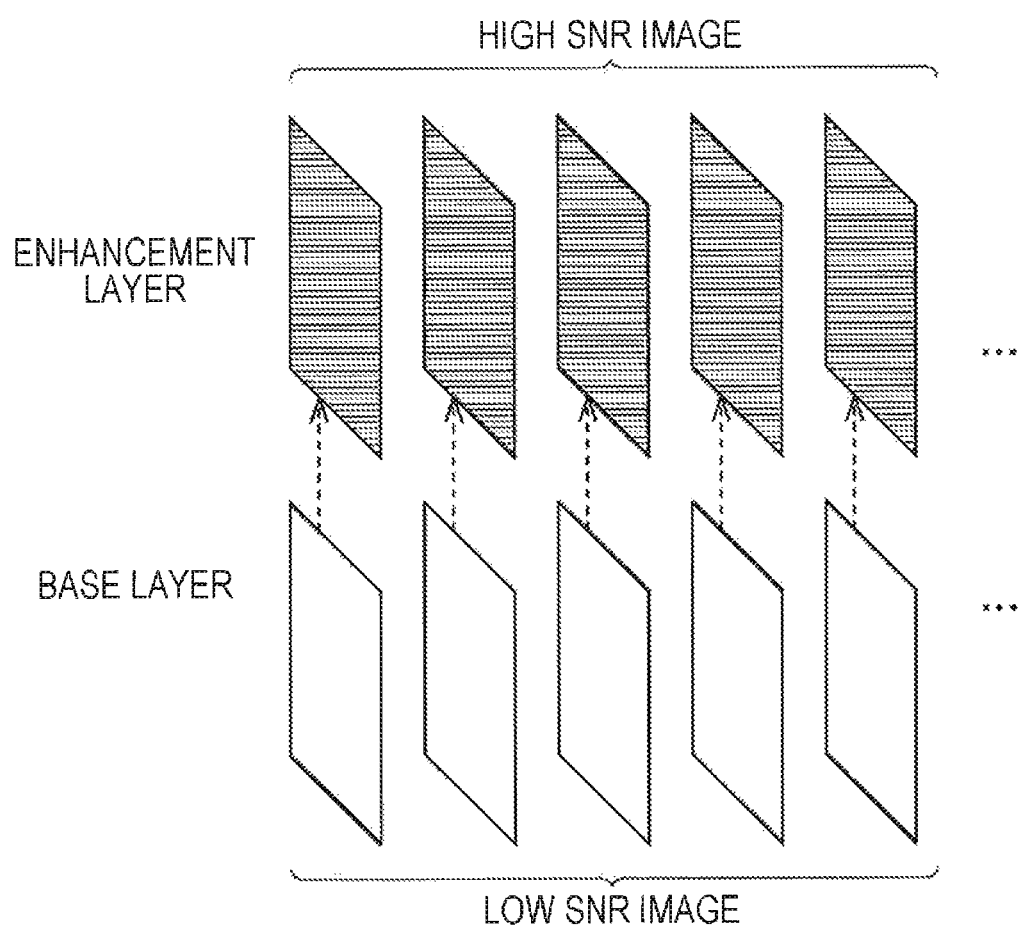
FIG. 25 is a figure for explaining an example of scalable encoding of a signal noise ratio.

Further, for example, a Signal to Noise ratio (SNR) may be applied as a parameter for giving such scalability (SNR scalability). In the base of this SNR scalability, the SN ratio is different for each layer. More specifically, in this case, as shown in FIG. 25, each picture is classified into two levels of hierarchy, which includes a base layer of which SN is lower than the original image and an enhancement layer which provides the original SNR when the enhancement layer is combined with the base layer. It is to be understood that the number of levels in the hierarchy is merely an example. It can be made into any given number of levels of hierarchy.

It is to be understood that the parameter for giving such scalability may be other than the example explained above. For example, the parameter for giving such scalability may be a bit depth (bit-depth scalability). In the case of this bit depth scalability, the bit depth is different for each layer. In this case, for example, the base layer is made of eight-bit image, and when the enhancement layer is added thereto, ten-bit image can be obtained.

Alternatively, the parameter for giving such scalability may be chroma format (chroma scalability). In the case of this chroma scalability, the chroma format is different for each layer. In this case, for example, the base layer is made of a component image in 4:2:0 format, and when the enhancement layer is added thereto, a component image in 4:2:2 format can be obtained.

(Hierarchical Image Coding Device)

Figure 26:
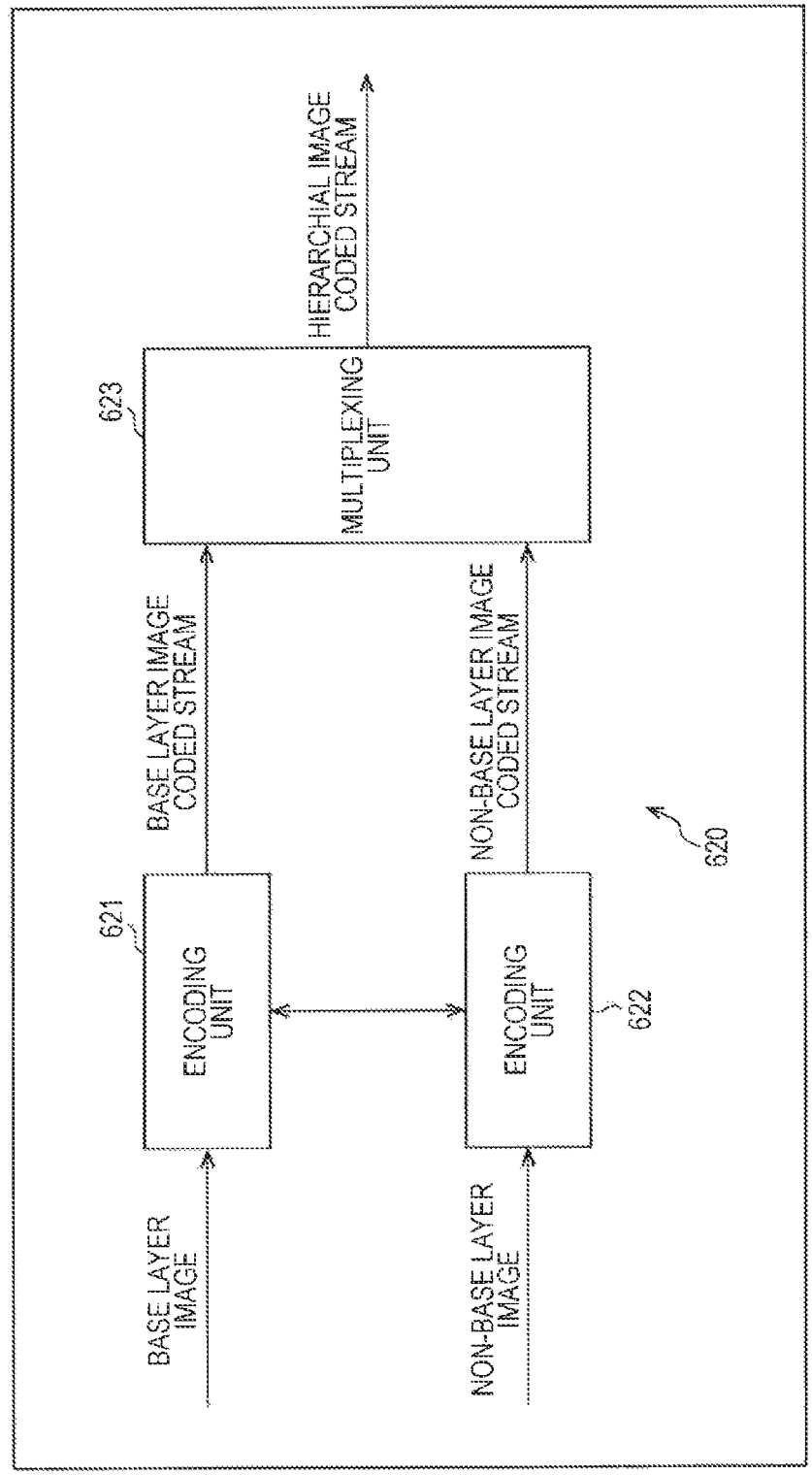
FIG. 26 is a figure illustrating an example of a configuration of hierarchical image coding device to which the present disclosure is applied.

FIG. 26 is a figure illustrating a hierarchical image coding device that performs the hierarchical image coding explained above. As shown in FIG. 26, the hierarchical image coding device 620 includes an encoding unit 621, an encoding unit 622, and a multiplexing unit 623.

The encoding unit 621 encodes base layer images, and generates abuse layer image coded stream. The encoding unit 622 encodes non-base layer images, and generates a non-base layer image coded stream. The multiplexing unit 623 multiplexes the base layer image coded stream generated by the encoding unit 621 and the non-base layer image coded stream generated by the encoding unit 622, and generates a hierarchical image coded stream.

This encoding device 10 (FIG. 1) can be applied to the encoding unit 621 and the encoding unit 622 of this hierarchical image coding device 620. More specifically, in encoding of each layer, the encoding efficiency where the transform skip is applied to a block of a size other than 4 by 4 pixels can be improved. The encoding unit 621 and the encoding unit 622 can, for example, control of the filter processing of the intra-prediction using the same flag and parameter as each other (for example, syntax element of processing between images and the like) (more specifically, the flag and the parameter can be shared), and therefore, this can suppress reduction of the encoding efficiency.

(Hierarchical Image Decoding Device)

Figure 27:
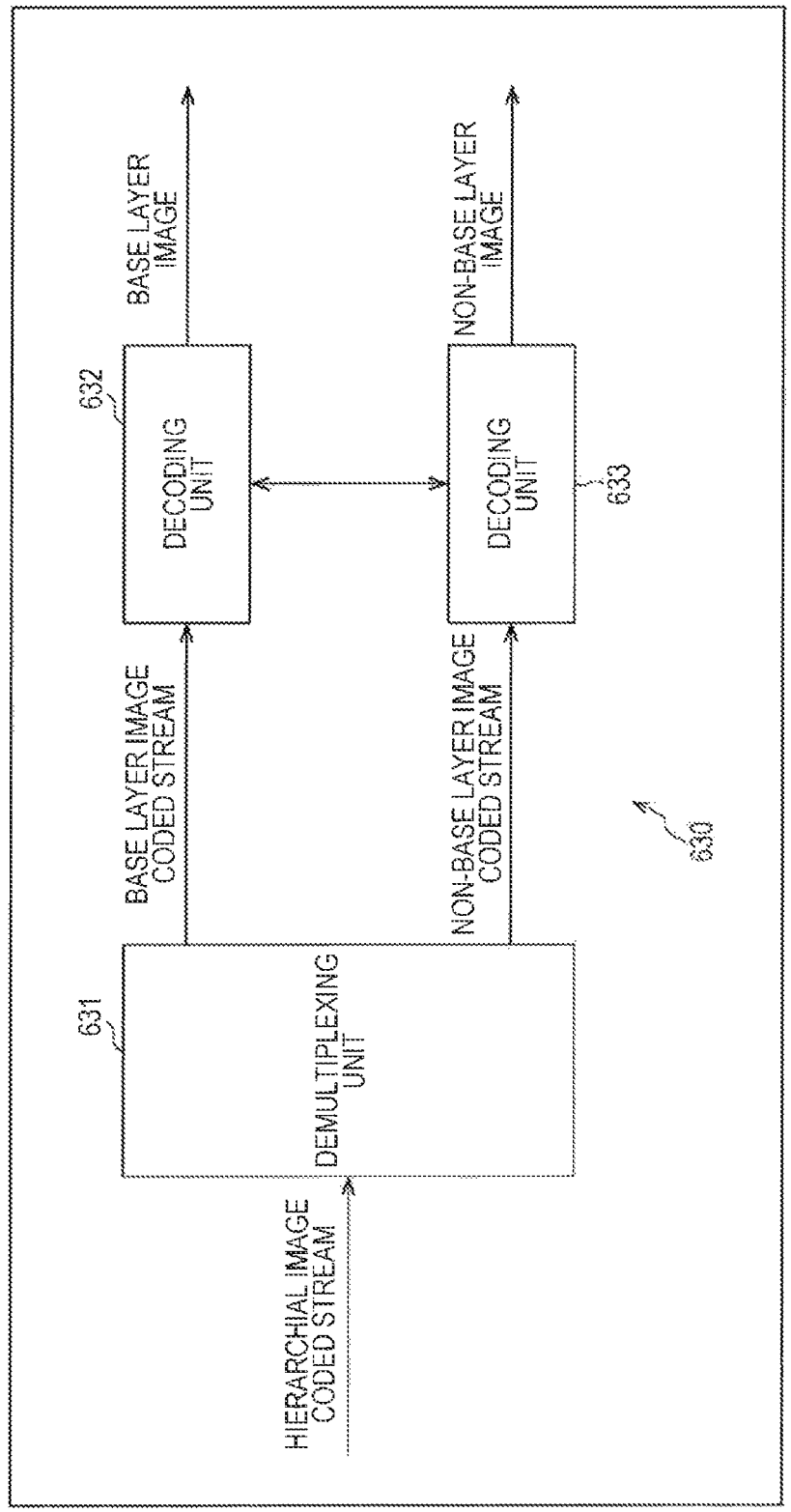
FIG. 27 is a figure illustrating an example of a configuration of a hierarchical image decoding device to which the present disclosure is applied.

FIG. 27 is a figure illustrating a hierarchical image decoding device for performing the hierarchical image decoding explained above. As shown in FIG. 27, the hierarchical image decoding device 630 includes a demultiplexing unit 631, a decoding unit 632, and a decoding unit 633.

The demultiplexing unit 631 demultiplexes the hierarchical image coded stream obtained by multiplexing the base view layer coded stream and the non-base layer image coded stream, and extracts the base layer image coded stream and the non-base layer image coded stream. The decoding unit 632 decodes the base layer image coded stream extracted by the demultiplexing unit 631, and obtains the base layer image. The decoding unit 633 decodes the non-base layer image coded stream extracted by the demultiplexing unit 631, and obtains the non-base layer image.

The decoding device 110 (FIG. 14) can be applied to the decoding unit 632 and the decoding unit 633 of this hierarchical image decoding device 630. More specifically, in decoding of each layer, the encoded stream can be decoded, of which encoding efficiency where the transform skip is applied to a block of a size other than 4 by 4 pixels has been improved. The decoding unit 612 and the decoding unit 613 can perform decoding using the same flag and parameter as each other (for example, syntax element of processing between images and the like) (more specifically, the flag and the parameter can be shared), and therefore, this can suppress reduction of the encoding efficiency.

Fifth Embodiment (Example of Configuration of Television Reception Device)

Figure 28:
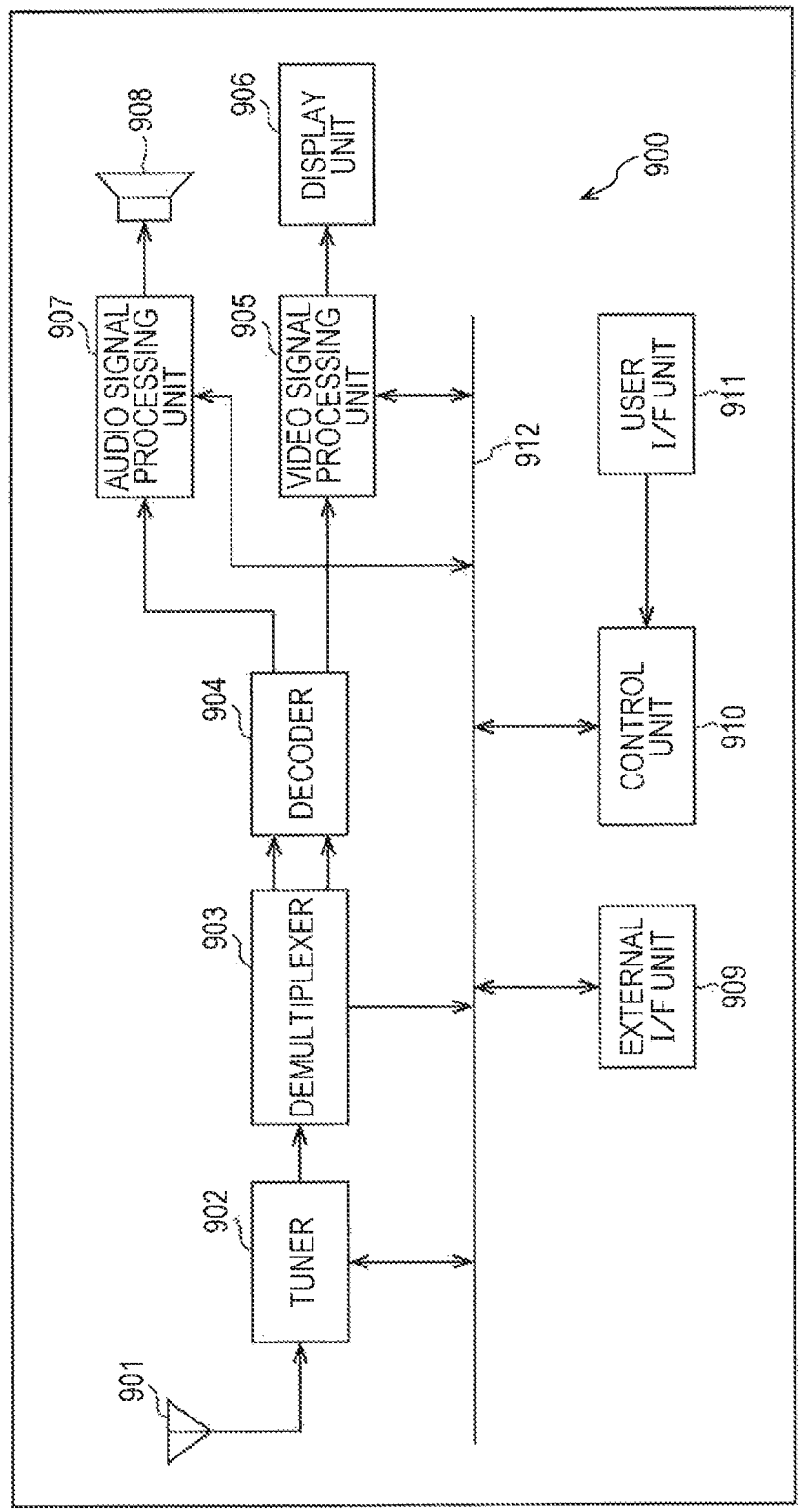
FIG. 28 is a figure illustrating an example of a schematic configuration of a television reception device to which the present disclosure is applied.

FIG. 28 illustrates an example of a schematic configuration of a television reception device to which the present disclosure is applied. A television reception device 900 includes an antenna 901, a tuner 902, a &multiplexer 903, a decoder 904, a video signal processing unit 905, a display unit 906, an audio signal processing unit 907, a speaker 908, and an external interface unit 909. Further, the television reception device 900 includes a control unit 910, a user interface unit 911, and the like.

The tuner 902 extracts a signal of a desired channel from a broadcasting signal received via the antenna 901, and demodulates the extracted signal. Then, the tuner 902 outputs the encoded bit stream obtained from the demodulation to the demultiplexer 903.

The demultiplexer 903 separates packets of video and audio of a program of viewing target from the encoded bit stream, and outputs the extracted packet data to the decoder 904. In addition, the demultiplexer 903 provides packets of data such as EPG (Electronic Program Guide) to the control unit 910. It should be noted that the demultiplexer 903 may perform descrambling with the demultiplexer and the like in a case where the encoded bit stream is scrambled.

The decoder 904 performs decoding processing to decode the packets. The decoder 904 outputs the video data generated from the decoding processing to the video signal processing unit 905. The decoder 904 outputs the audio data generated from the decoding processing to the audio signal processing unit 907.

The video signal processing unit 905 performs noise reduction and video processing according to user's settings to process the video data. The video signal processing unit 905 generates image data and the like using processing based on applications provided via the network, and generates video data of a program which is to be displayed on the display unit 906. The video signal processing unit 905 generates video data for displaying a menu screen and the like for selection of an item, and superimposes the video data of the menu screen onto the video data of the program. The video signal processing unit 905 generates a driving signal on the basis of the video data thus generated, and drives the display unit 906.

The display unit 906 drives a display device (for example, a liquid crystal display element and the like) on the basis of a driving signal given by the video signal processing unit 905, and causes the display device to display the video of the program.

The audio signal processing unit 907 performs predetermined processing such as noise reduction on the audio data, performs D/A conversion processing and amplification processing on the audio data which have been processed, and provides the data to the speaker 908, so that the audio are output.

The external interface unit 909 is an interface for connection with an external device and the network, and transmits and receives data such as video data and audio data.

The control unit 910 is connected to the user interface unit 911. The user interface unit 911 is constituted by an operation switch, a remote control signal reception unit, and the like. The user interface unit 911 provides an operation signal in response to user's operation to the control unit 910.

The control unit 910 is constituted by a CPU (Central Processing Unit), a memory, and the like. The memory stores, for example, programs executed by the CPU, various kinds of data required when the CPU performs processing, EPG data, data obtained via the network, and the like. The programs stored in the memory are read and executed by the CPU with predetermined timing when the television reception device 900 is activated. The CPU executes the program, thus controlling each unit so that the television reception device 900 performs operation in accordance to user's operation.

It should be noted that the television reception device 900 is provided with a bus 912 for connection between the control unit 910 and the tuner 902, the demultiplexer 903, the video signal processing unit 905, the audio signal processing unit 907, the external interface unit 909, and the like.

In the television reception device configured as described above, the decoder 904 is provided with the function of the decoding device (the decoding method) according to the present application. Therefore, the encoded stream can be decoded, of which encoding efficiency where the transform skip is applied to a block of a size other than 4 by 4 pixels has been improved.

Sixth Embodiment (Example of Configuration of Cellular Phone)

Figure 29:
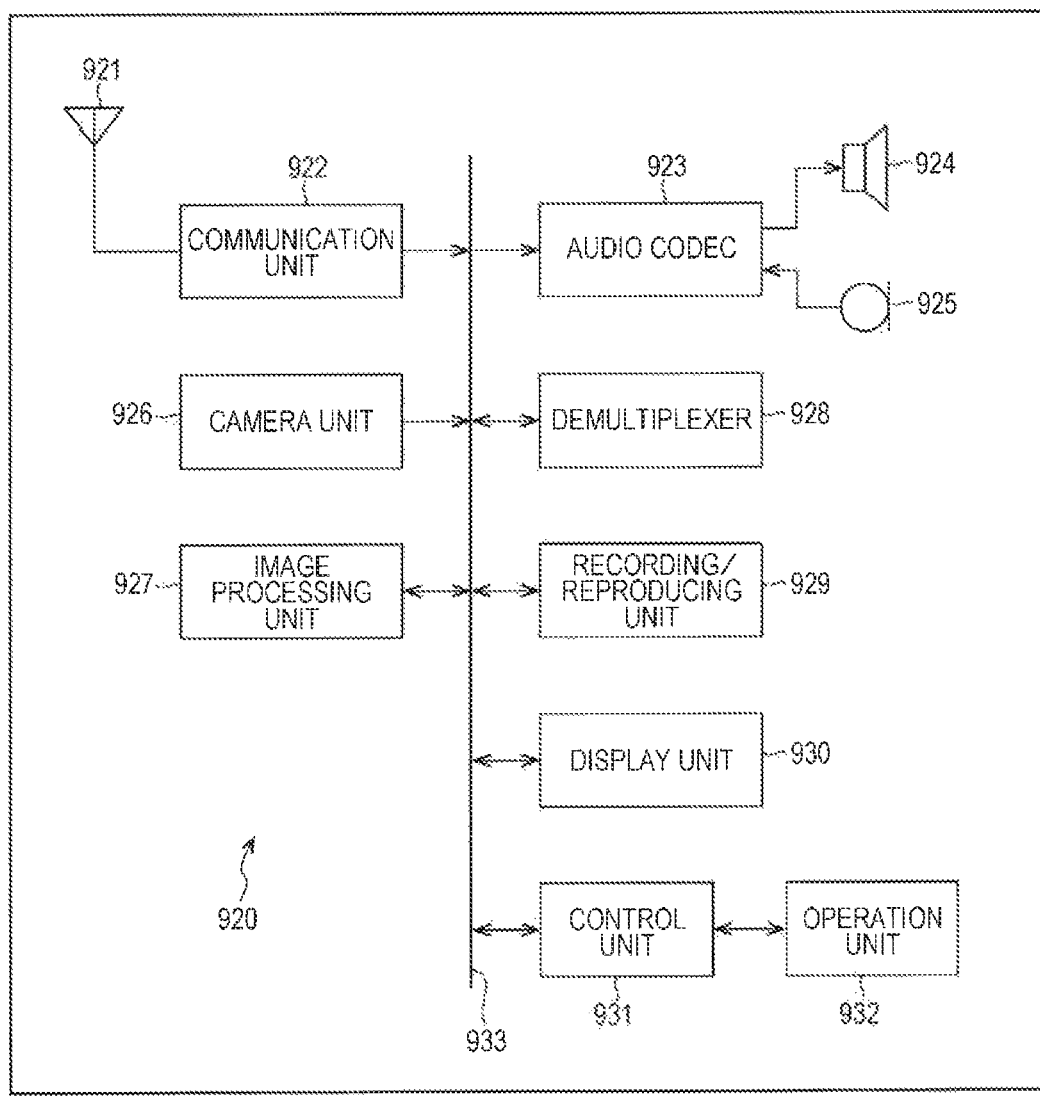
FIG. 29 is a figure illustrating an example of a schematic configuration of a cellular phone to which the present disclosure is applied.

FIG. 29 illustrates an example of a schematic configuration of a cellular phone to which the present disclosure is applied. The cellular phone 920 includes a communication unit 922, an audio codec 923, a camera unit 926, an image processing unit 927, a demultiplexer unit 928, a recording/reproducing unit 929, a display unit 930, and a control unit 931. The communication unit 922, an audio codec 923, the camera unit 926, an image processing unit 927, the demultiplexer unit 928, the recording/reproducing unit 929, the display unit 930, and the control unit 931 are connected with each other via a bus 933.

The antenna 921 is connected to the communication unit 922. The speaker 924 and the microphone 925 are connected to the audio codec 923. The operation unit 932 is connected to the control unit 931.

The cellular phone 920 performs various kinds of operations such as transmission/reception of audio signals, transmission/reception of e-mails or image data, capturing images, and recording data in various kinds of modes including voice phone call mode, data communication mode, and the like.

In the voice phone call mode, an audio signal generated by the microphone 925 is converted into analog data by the audio codec 923, and the data are compressed and provided to the communication unit 922. The communication unit 922 performs audio data modulation processing, frequency conversion processing, and the like, and generates a transmission signal. The communication unit 922 provides the transmission signal to the antenna 921 to transmit the transmission signal to a cell site, not shown. The communication unit 922 amplifies a radio signal received via the antenna 921, performs the frequency conversion processing, demodulation processing, and the like, and provides the obtained audio data to the audio codec 923. The audio codec 923 extracts the audio data, and converts the data into an analog audio signal, and outputs the analog audio signal to the speaker 924.

When a mail is transmitted in the data communication mode, for example, the control unit 931 receives text data which are input in accordance with operation performed with operation unit 932, and displays the input text on the display unit 930. The control unit 931 generates mail data on the basis of user command given by the operation unit 932, and provides the mail data to the communication unit 922. The communication unit 922 performs modulation processing, frequency conversion processing, and the like of mail data, and transmits the obtained transmission signal from the antenna 921. The communication unit 922 amplifies the reception signal received by the antenna 921, and performs frequency conversion processing, demodulation processing, and the like, thus restoring the mail data. The mail data are provided to the display unit 930, so that the contents of the mail are displayed.

It should be noted that the cellular phone 920 can cause the received mail data to be recorded to a recording medium using the record/reproducing unit 929. The recording medium is any given rewritable recording medium. For example, the recording medium may be a semiconductor memory such as a RAM or an internal flash memory, and may be a removable recording medium such as a hard disk, a magnetic disk, a magneto-optical disk, an optical disk, a USB (Universal Serial Bus) memory, or a memory card.

When the image data are transmitted in the data communication mode, the image data generated by the camera unit 926 to the image processing unit 927. The image processing unit 927 performs the encoding processing of the image data, and generates the encoded data.

The demultiplexer unit 928 multiplexes the encoded data generated by the image processing unit 927 and the audio data provided by the audio codec 923 in accordance with a predetermined method, and provides the data to the communication unit 922. The communication unit 922 performs modulation processing, frequency conversion processing, and the like of multiplexed data, and transmits the obtained transmission signal from the antenna 921. The communication unit 922 amplifies a radio signal received via the antenna 921, performs the frequency conversion processing, demodulation processing, and the like, and restores the multiplexed data. The multiplexed data are provided to the demultiplexer unit 928. The demultiplexer unit 928 separates the multiplexed data, and provides the encoded data to the image processing unit 927 and provides the audio data to the audio codec 923. The image processing unit 927 performs decoding processing of the encoded data, and generates image data. The image data are provided to the display unit 930, and the received image is displayed. The audio codec 923 converts the audio data into an analog audio signal, and provides the signal to the speaker 924, so that the received audio is output.

In the cellular phone device configured as described above, the image processing unit 927 is provided with the functions of the encoding device and the decoding device (the encoding method and the decoding method) according to the present application. Therefore, the encoding efficiency where the transform skip is applied to a block of a size other than 4 by 4 pixels can be improved. In addition, the encoded stream can be decoded, of which encoding efficiency where the transform skip is applied to a block of a size other than 4 by 4 pixels has been improved.

Seventh Embodiment (Example of Configuration of Recording/Reproducing Device)

Figure 30:
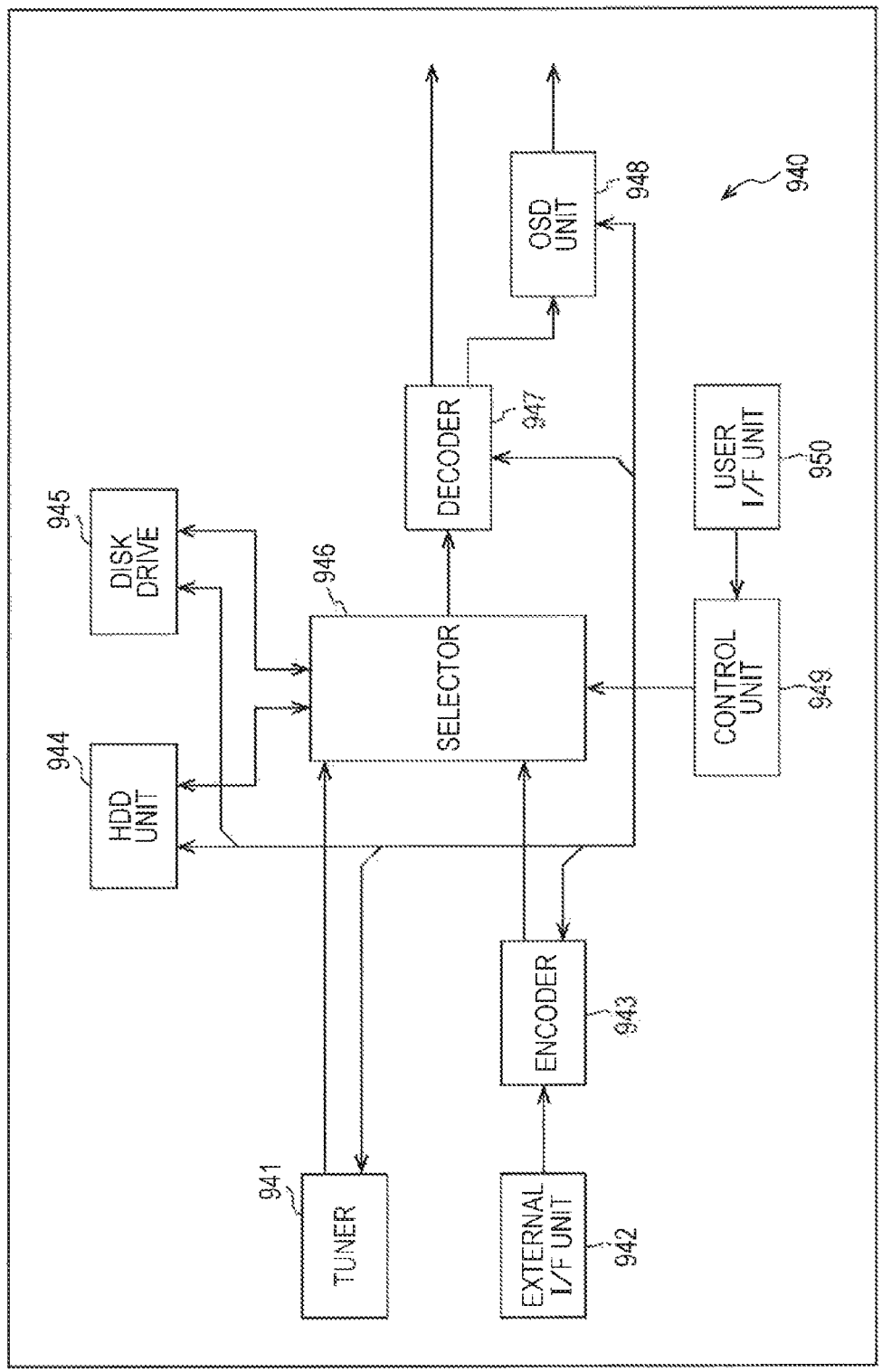
FIG. 30 is a figure illustrating an example of a schematic configuration of a recording/reproducing device to which the present disclosure is applied.

FIG. 30 illustrates an example of a schematic configuration of a recording/reproducing device to which the present disclosure is applied. For example, a recording/reproducing device 940 records the audio data and the video data of received broadcasting program to the recording medium, and provides the recorded data to the user with timing according to a users command. For example, the recording/reproducing device 940 can obtain the audio data and the video data from another device, and can record them to the recording medium. For example, the recording/reproducing device 940 decodes and outputs the audio data and the video data recorded on the recording medium, so that the image can be displayed on a monitor device and the like, and the audio can be output.

The recording/reproducing device 940 includes a tuner 941, an external interface unit 942, an encoder 943, a HDD (Hard Disk Drive) unit 944, a disk drive 945, a selector 946, a decoder 947, an OSD (On-Screen Display) unit 948, a control unit 949, and a user interface unit 950.

The tuner 941 tunes in to a signal of a desired channel from a broadcasting signal received via an antenna (not shown). The tuner 941 outputs an encoding bit stream, which is obtained by demodulating the reception signal of the desired channel, to the selector 946.

The external interface unit 942 is constituted by at least one of IEEE1394 interface, a network interface unit, a USB interface, a flash memory interface, and the like. The external interface unit 942 is an interface for connection with an external device, a network, a memory card, and the like. The external interface unit 942 receives data such as video data and audio data which are to be recorded.

The encoder 943 performs encoding according to a predetermined method when the video data and the audio data provided from the external interface unit 942 are not encoded, and outputs the encoded bit stream to the selector 946.

The HDD unit 944 records content data such as video and audio, various kinds of programs, other data, and the like to an internal hard disk, and reads them from the hard disk during reproduction.

The disk drive 945 records and reproduces a signal to/from an optical disk loaded. Examples of optical disks include DVD disks (DVD-Video, DVD-RAM, DVD-R, DVD-RW, DVD+R, DVD+RW, and the like) and Blu-ray (registered trademark) disk, and the like.

During recording of video and audio, the selector 946 selects the encoded bit stream from any one of the tuner 941 and the encoder 943, and provides the encoded bit stream to any one of the HDD unit 944 and the disk drive 945. During reproduction of video and audio, the selector 946 provides the encoded bit stream, which is output from the HDD unit 944 or disk drive 945, to the decoder 947.

The decoder 947 performs decoding processing to decode the encoded bit stream. The decoder 947 provides video data, which are generated from the decoding processing, to the OSD unit 948. The decoder 947 outputs the audio data generated from the decoding processing.

The OSD unit 948 generates video data for displaying a menu screen and the like for selection of an item, and superimposes and outputs the video data of the menu screen onto the video data which are output from the decoder 947.

The control unit 949 is connected with the user interface unit 950. The user interface unit 950 is constituted by an operation switch, a remote control signal reception unit, and the like, and provides an operation signal in response to user's operation to the control unit 949.

The control unit 949 is constituted by a CPU, a memory, and the like. The memory stores, for example, programs executed by the CPU and various kinds of data required when the CPU performs processing. The programs stored in the memory are read and executed by the CPU with predetermined timing when the recording/reproducing device 940 is activated. The CPU executes the program, thus controlling each unit so that the recording/reproducing device 940 performs operation in accordance to user's operation.

In the recording/reproducing device configured as described above, the decoder 947 is provided with the function of the decoding device (the decoding method) according to the present application. Therefore, the encoded stream can be decoded, of which encoding efficiency where the transform skip is applied to a block of a size other than 4 by 4 pixels has been improved.

Eighth Embodiment (Example of Configuration of Image-Capturing Device)

Figure 31:
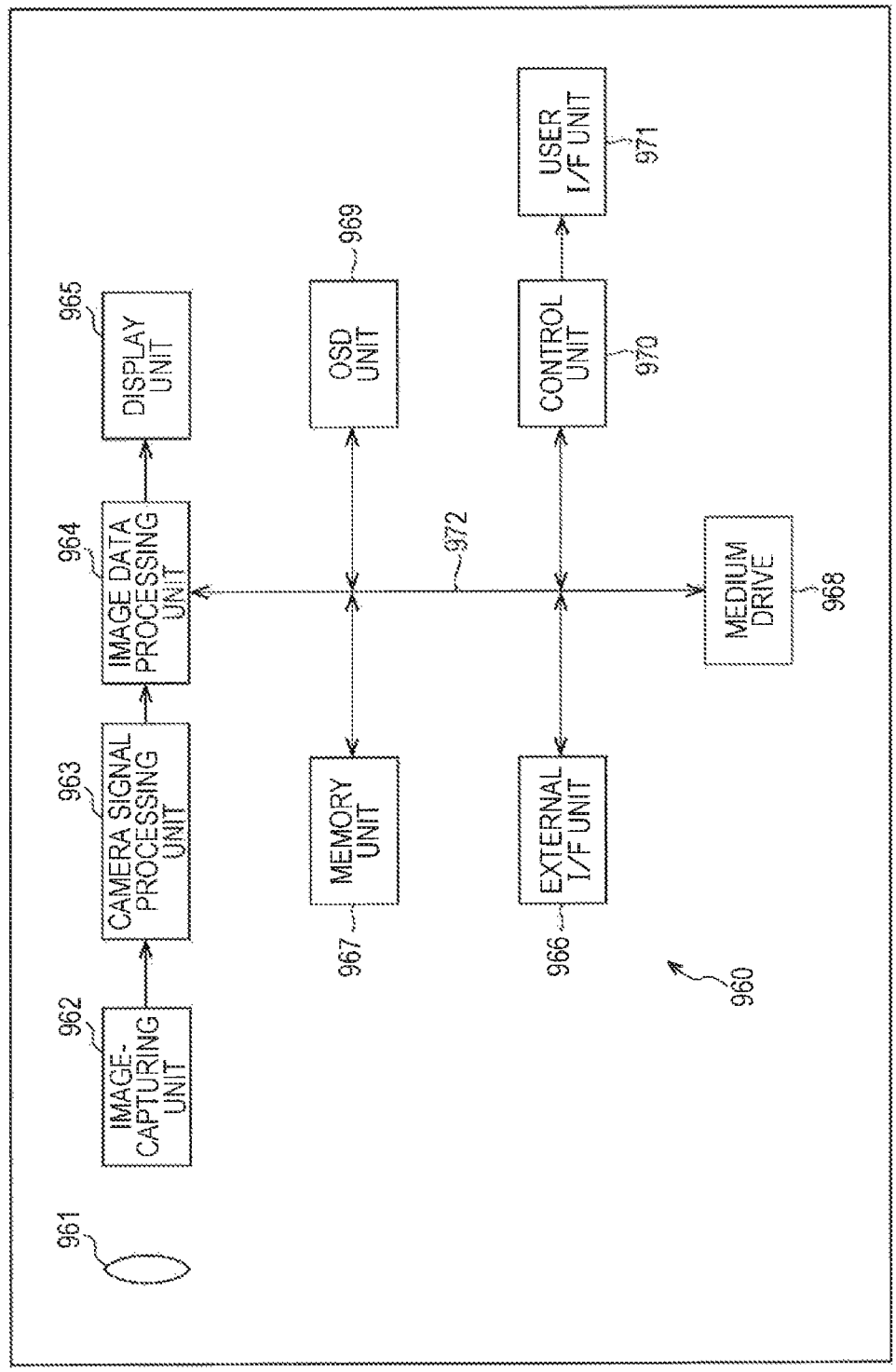
FIG. 31 is a figure illustrating an example of a schematic configuration of an image-capturing device to which the present disclosure is applied.

FIG. 31 illustrates an image-capturing device to which the present disclosure is applied. An image-capturing device 960 captures an image of a subject, and causes the image of the subject to be displayed on a display unit and causes the image to be recorded in a recording medium as image data.

The image-capturing device 960 includes an optical block 961, an image-capturing unit 962, a camera signal processing unit 963, an image data processing unit 964, a display unit 965, an external interface unit 966, a memory unit 967, a medium drive 968, an OSD unit 969, and a control unit 970. The control unit 970 is connected with a user interface unit 971. Further, the image data processing unit 964, the external interface unit 966, the memory unit 967, the medium drive 968, the OSD unit 969, the control unit 970, and the like are connected via a bus 972.

The optical block 961 includes a focus lens and a diaphragm mechanism. The optical block 961 causes an optical image of a subject to be formed on an image-capturing surface of the image-capturing unit 962. The image-capturing unit 962 includes an image sensor such as a CCD or a CMOS, and generates an electric signal according to an optical image using photoelectric conversion, and provides the electric signal to the camera signal processing unit 963.

The camera signal processing unit 963 performs various kinds of camera signal processing such as knee correction, gamma correction, and color correction on the electric signal provided by the image-capturing unit 962. The camera signal processing unit 963 outputs the image data which have been subjected to the camera signal processing to the image data processing unit 964.

The image data processing unit 964 performs encoding processing to encode the image data received from the camera signal processing unit 963. The image data processing unit 964 provides the encoded data generated by performing the encoding processing to the external interface unit 966 and the medium drive 968. The image data processing unit 964 performs decoding processing to decode the encoded data provided from the external interface unit 966 and the medium drive 968. The image data processing unit 964 provides the image data generated by performing the decoding processing to the display unit 965. The image data processing unit 964 performs processing to provide the image data provided from the camera signal processing unit 963 to the display unit 965, and superimposes the display data obtained from the OSD unit 969 on the image data, and provides the data to the display unit 965.

The OSD unit 969 generates display data such as menu screen and icons including symbols, characters, or figures, and outputs the display data to the image data processing unit 964.

The external interface unit 966 is constituted by, for example, a USB input/output terminal, and when image is printed, it is connected to a printer. The external interface unit 966 is also connected to a drive as necessary, and a removable medium such as a magnetic disk, an optical disk, or the like is loaded as necessary, and a computer program read therefrom is installed as necessary. Further, the external interface unit 966 includes a network interface connected to a predetermined network such as a LAN or the Internet. For example, the control unit 970 reads the encoded data from the medium drive 968 in accordance with a command given by the user interface unit 971, and can provide the data to another device connected via the network from the external interface unit 966. The control unit 970 obtains, via external interface unit 966, the encoded data and the image data provided from another device via the network, and can provide the data to the image data processing unit 964.

The recording medium driven by the medium drive 968 may be any given removable medium which can be read and written, such as a magnetic disk, a magneto-optical disk, an optical disk, or a semiconductor memory. The recording medium may be of any type as a removable medium, and may be a tape device, or a disk, or a memory card. It is to be understood that it may be a non-contact IC (Integrated Circuit) card and the like.

The medium drive 968 and the recording medium may be integrated, and, for example, like an internal hard disk drive and an SSD (Solid State Drive), the medium drive 968 and the recording medium may be configured by a non-movable storage medium.

The control unit 970 is constituted by a CPU. The memory unit 967 stores, for example, programs executed by the control unit 970, various kinds of data required when processing is performed with the control unit 970. The programs stored in the memory unit 967 is read and executed by the control unit 970 with predetermined timing such as during activation of the image-capturing device 960. The control unit 970 executes the program, thus controlling each unit so as to cause the image-capturing device 960 to operate in accordance with user operation.

In the image-capturing device configured as described above, the image data processing unit 964 is provided with the functions of the encoding device and the decoding device (the encoding method and the decoding me(hod) according to the present application. Therefore, the encoding efficiency where the transform skip is applied to a block of a size other than 4 by 4 pixels can be improved. In addition, the encoded stream can be decoded, of which encoding efficiency where the transform skip is applied to a block of a size other than 4 by 4 pixels has been improved.

<Example of Application of Scalable Encoding>

(First System)

Subsequently, more specific example of usage of scalable encoded data which are encoded with salable encoding (hierarchical encoding) will be explained. The scalable encoding is used to select data which are to be transmitted, as shown in the example in FIG. 32, for example.

Figure 32:
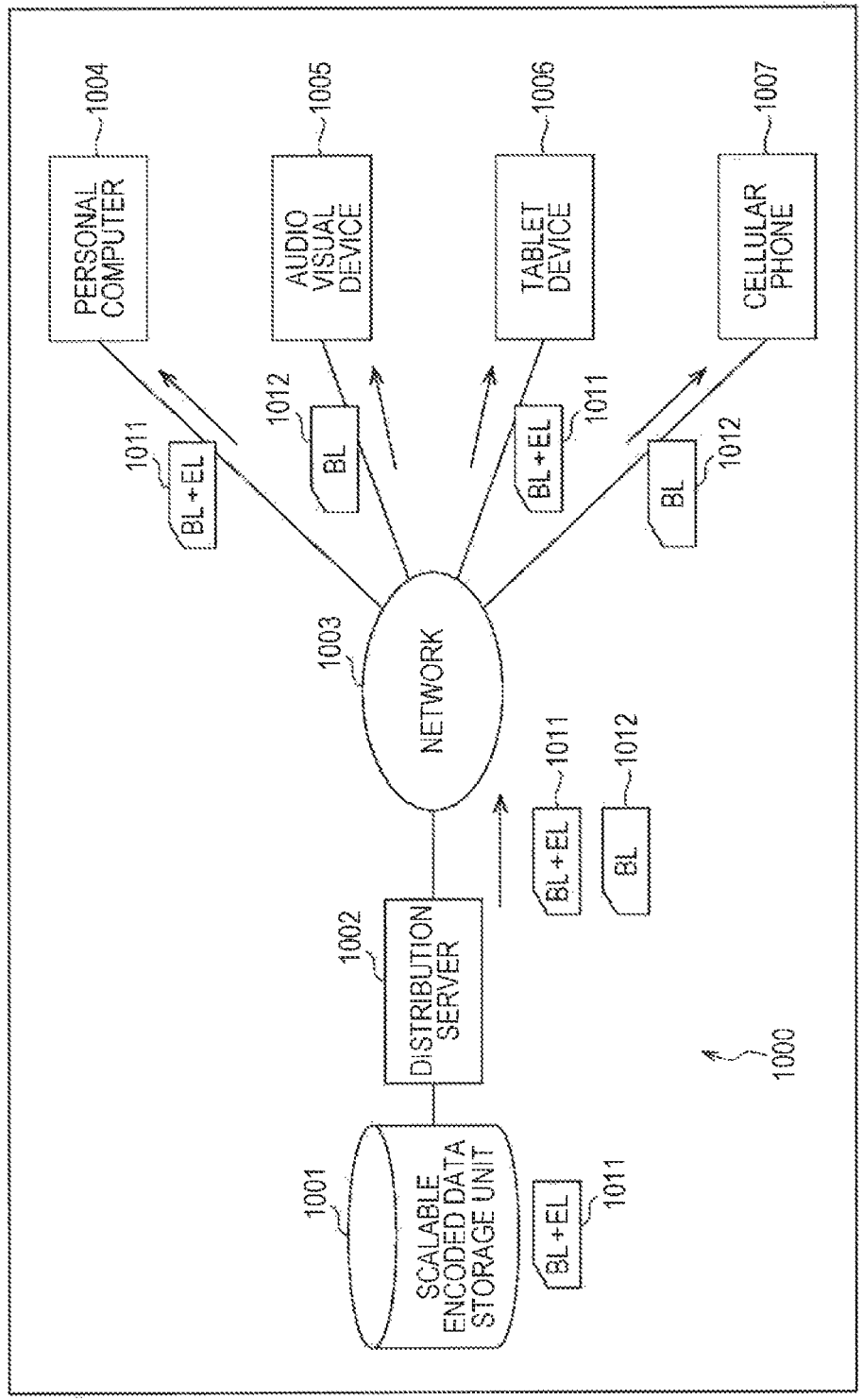
FIG. 32 is a block diagram illustrating an example of scalable encoding usage.

In a data transmission system 1000 as shown in FIG. 32, a distribution server 1002 reads scalable encoded data stored in a scalable encoded data storage unit 1001, and distributes the sealable encoded data via a network 1003 to a terminal device such as a personal computer 1004, an audio visual device 1005, a tablet device 1006, a cellular phone 1007, and the like.

At this occasion, the distribution server 1002 selects encoded data of appropriate quality according to, for example, the communication environment and the performance of the terminal device, and transmits the encoded data. Even when the distribution server 1002 unnecessarily transmits high quality data, the terminal device does not necessarily obtain a high quality image, which may cause delay and overflow. The communication band width may be unnecessarily occupied, and the load of the terminal device may be unnecessarily increased. On the contrary, even when the distribution server 1002 unnecessarily transmits low quality data, the terminal device may not be able to obtain an image of a sufficient quality. For this reason, the distribution server 1002 reads, as necessary, the scalable encoded data stored in the scalable encoded data storage unit 1001 as encoded data of appropriate quality according to, for example, the communication environment and the performance of the terminal device, and transmits the scalable encoded data.

For example, the scalable encoded data storage unit 1001 stores scalable encoded data (BL+EL) 1011 encoded in a scalable manner. The scalable encoded data (BL+EL) 10 are encoded data including both of the base layer and the enhancement layer, and are data that can provide both of the image in the base layer and the image in the enhancement layer by decoding the data.

The distribution server 1002 selects an optimum layer according to, for example, the communication environment and the performance of the terminal device to which the data are transmitted, and reads the data in that layer. For example, for the personal computer 1004 and the tablet device 1006 of which processing performance is high, the distribution server 1002 reads the high quality scalable encoded data (BL+EL) 1011 from the scalable encoded data storage unit 1001, and transmits the high quality scalable encoded data (BL+EL) 1011 as it is. In contrast, for example, for the audio visual device 1005 and the cellular phone 1007 of which processing performance is low, the distribution server 1002 extracts the data in the base layer from the scalable encoded data (BL+EL) 1011, and transmits scalable encoded data (BL) 1012 which are the data of the same content as the scalable encoded data (BL+EL) 1011 but which is of a lower quality than the scalable encoded data (BL+EL) 1011.

As described above, by using the scalable encoded data, the amount of data can be easily adjusted, and therefore, this can suppress occurrence of delay and overflow, and this can suppress unnecessary increase of the load of the communication medium and the terminal device. The scalable encoded data (BL+EL) 1011 has less redundancy between layers, and therefore, as compared with making the encoded data in each layer into separate data, the amount of data can be reduced. Therefore, the storage region of the scalable encoded data storage unit 1001 can be more efficiently used.

It should be noted that the terminal device may be various kinds of devices such as the personal computer 1004 to the cellular phone 1007, and therefore, the performance of the hardware of the terminal device is different depending on the device. In addition, the terminal device executes various kinds of applications, and accordingly, the performances of the software vary greatly. Further, the network 1003 serving as the communication medium may also be, for example, all kinds of communication networks including wired network, wireless network, or a network including both of the wired network and the wireless network, such as the Internet and LAN (Local Area Network), and accordingly, the data transmission performance thereof greatly varies. Further, the data transmission performance thereof may change due to other communications and the like.

Accordingly, the distribution server 1002 may communicate with a terminal device which is transmission destination of data before the data transmission starts, and the distribution server 1002 may obtain information about the performance of the terminal device such as the hardware performance of the terminal device, the performance of the applications (software) executed by the terminal device, and the like, and information about communication environment such as usable band width and the like of the network 1003. Then, the distribution server 1002 may select an appropriate layer on the basis of the information obtained here.

It should be noted that the layer may be extracted by the terminal device. For example, the personal computer 1004 decodes the transmitted scalable encoded data (BL+EL) 1011, and may display the image in the base layer or may display the image in the enhancement layer. For example, the personal computer 1004 may extract the scalable encoded data (EL) 1012 in the base layer from the transmitted scalable encoded data (BL+EL) 1011, may store the scalable encoded data (EL) 1012, may transfer the scalable encoded data (EL) 1012 to another device, may perform decoding and may display the image in the base layer.

It is to be understood that any number of scalable any number of encoded data storage units 1001, any number of distribution servers 1002, any number of networks 1003, any number of and terminal devices may be provided. In the above explanation, for example, the distribution server 1002 transmits data to the terminal device, but the example of usage is not limited thereto. As long as the data transmission system 1000 is a system that transmits encoded data to the terminal device upon selecting an appropriate layer in accordance with the communication environment and the performance of the terminal device when the data transmission system 1000 transmits the encoded data which have been encoded in a scalable manner to the terminal device, this can be applied to any given system.

(Second System)

Figure 33:
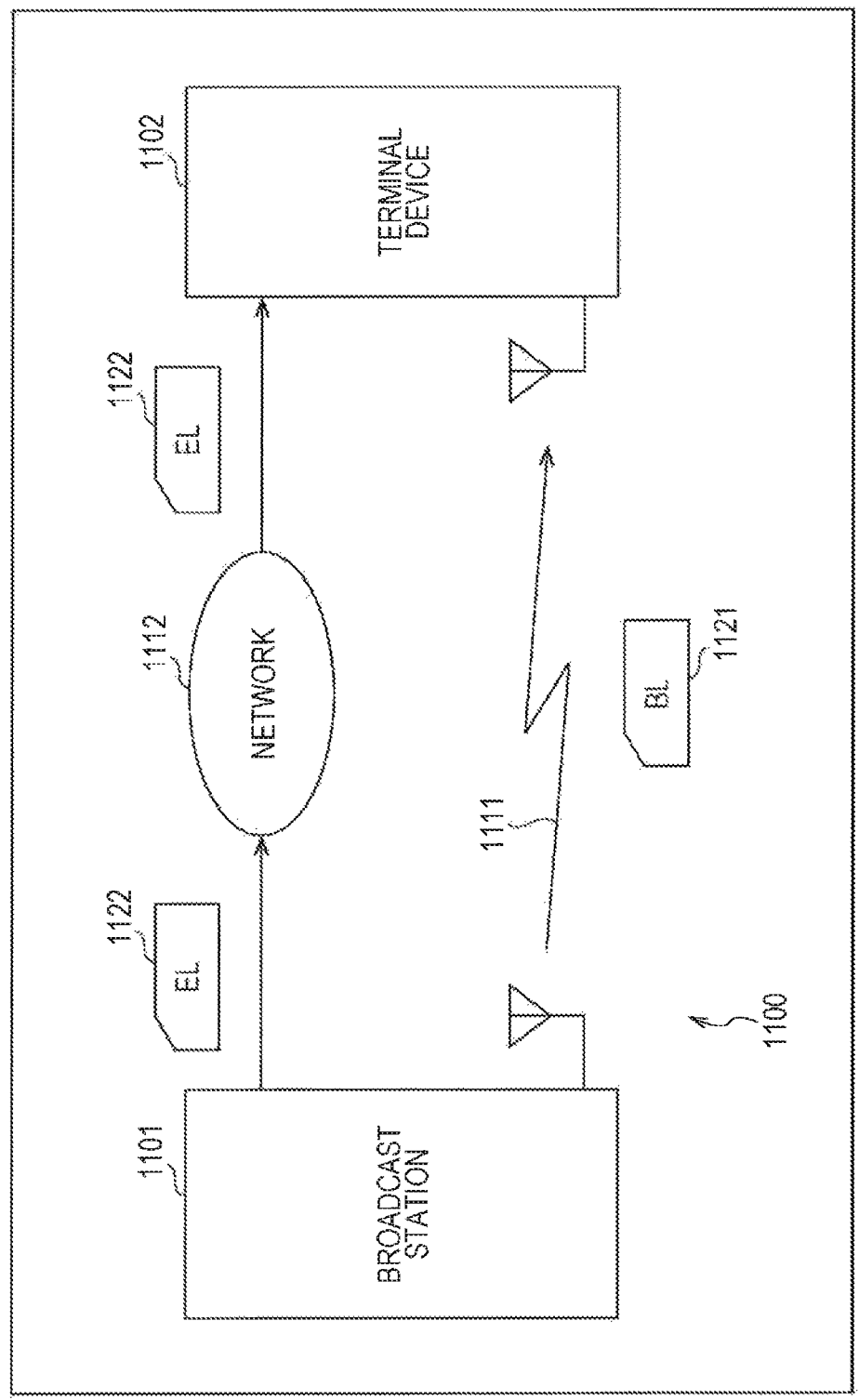
FIG. 33 is a block diagram illustrating another example of scalable encoding usage.

For example, as in the example shown in FIG. 33, the scalable encoding is used for transmission via multiple communication media.

In a data transmission system 1100 as shown in FIG. 33, a broadcast station 1101 transmits scalable encoded data (BL) 1121 in base layer via terrestrial broadcast 1111. The broadcast station 1101 transmits scalable encoded data (EL) 1122 in enhancement layer via any given network 1112 made of a communication network including wired network, wireless network, or a communication network including both of the wired network and the wireless network (for example, the scalable encoded data (EL) 1122 in the enhancement layer are made into packets, and the packets are transmitted).

The terminal device 1102 has a reception function of the terrestrial broadcast 1111 which is transmitted from the broadcast station 1101, and receives the scalable encoded data (BL) 1121 in the base layer transmitted via the terrestrial broadcast 1111. In addition, the terminal device 1102 further includes a communication function for communication via the network 1112, and receives the scalable encoded data (EL) 1122 in the enhancement layer transmitted via the network 1112.

For example, the terminal device 1102 decodes the scalable encoded data (BL) 1121 in the base layer obtained via the terrestrial broadcast 1111 and obtains the image in the base layer in response to the user command and the like, stores the scalable encoded data (BL) 1121 in the base layer, or transmits the scalable encoded data (BL) 1121 in the base layer to another device.

The terminal device 1102 combines the scalable encoded data (BL) 1121 in the base layer obtained via the terrestrial broadcast 1111 and the scalable encoded data (EL) 1122 in the enhancement layer obtained via the network 1112 in response to, for example, the user command and the like, so that the terminal device 1102 obtains the scalable encoded data (BL+EL), decodes the scalable encoded data (BL+EL) to obtain the image in the enhancement layer, stores the scalable encoded data (BL+EL), or transmits the scalable encoded data (BL+EL) to another device.

As described above, the scalable encoded data can be transmitted via a different communication medium for each layer, for example. Therefore, the load can be distributed, and this can suppress occurrence of delay and overflow.

Depending on circumstances, the communication medium used for transmission may be configured to be selectable for each layer. For example, the scalable encoded data (BL) 1121 in the base layer including relatively much data may be transmitted via a communication medium having a wide band width, and the scalable encoded data (EL) 1122 in the enhancement layer including relatively less data may be transmitted via a communication medium having a narrow band width. Alternatively, for example, whether the communication medium through which the scalable encoded data (EL) 1122 in the enhancement layer is transmitted is configured to be a network 1112 or a terrestrial broadcast 1111 may be determined in accordance with the usable band width of the network 1112, it is to be understood that this is also applicable to data in any given layer.

By performing such control, the increase in the load due to the data transmission can be suppressed more greatly.

It is to be understood that the number of layers is not particularly limited, and the number of communication media used for transmission is not particularly limited either. The number of terminal devices 1102, which are the destination of data transmission, is not particularly limited. Further, in the above example, the broadcast from the broadcast station 1101 is used as an example, but the example of usage is not limited thereto. As long as the data transmission system 1100 is a system that divides encoded data which are encoded in a scalable manner into multiple pieces of data in units of layers and transmits the data via multiple communication circuits, this can be applied to any given system.

(Third System)

Figure 34:
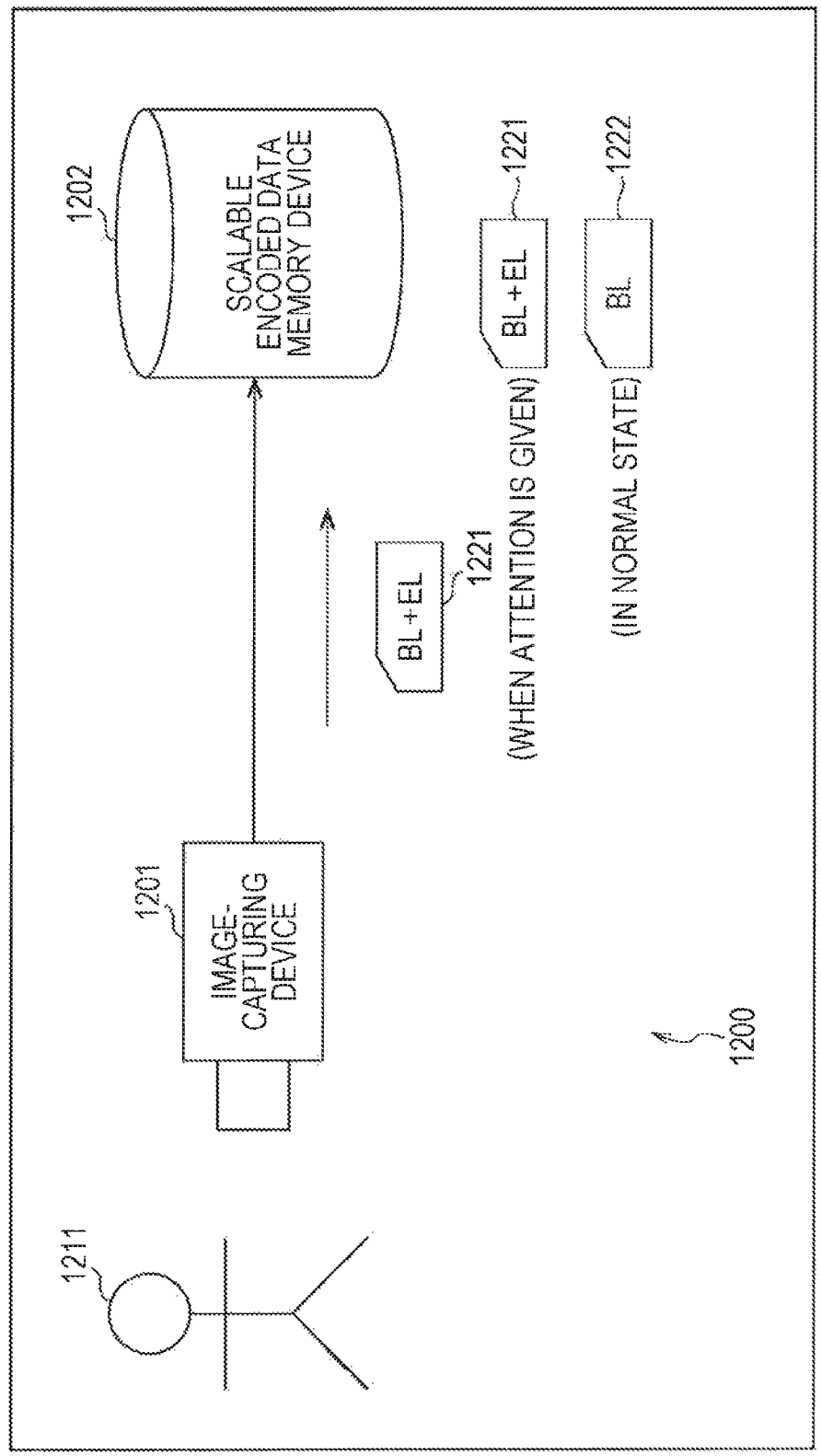
FIG. 34 is a block diagram illustrating still another example of scalable encoding usage.

For example, as in the example shown in FIG. 34, the scalable encoding is used for storage of encoded data.

In an image-capturing system 1200 as shown in FIG. 34, an image-capturing device 1201 encodes image data, which are obtained by image-capturing a subject 1211, in a scalable manner, and provides the image data to the scalable encoded data memory device 1202 as the scalable encoded data (BL+EL) 1221.

The scalable encoded data memory device 1202 stores, at the quality suitable for the circumstances, the scalable encoded data (BL+EL) 1221 provided by the image-capturing device 1201. For example, in normal state, the scalable encoded data memory device 1202 extracts the data in the base layer from the scalable encoded data (BL+EL) 1221, and stores the data as the scalable encoded data (BL) 1222 in the base layer which are low quality and have less amount of data. In contrast, for example, when attention is given, the scalable encoded data memory device 1202 stores, as it is, the scalable encoded data (BL+EL) 1221 which are high quality and have much amount of data.

By doing so, the scalable encoded data memory device 1202 can save the image with high image quality only when necessary, and therefore, while suppressing reduction of the value of the image caused by the image quality degradation, the increase in the amount of data can be suppressed, and the usage efficiency in the memory area can be improved.

For example, suppose that the image-capturing device 1201 is a monitor camera. When a monitor target (for example, an intruder) does not appear in the captured image (in normal state), the contents of the captured image may not be important, and therefore, higher priority is given to reduction of the amount of data, and the image data (scalable encoded data) are stored with a lower quality. In contrast, when a monitor target appears in a captured image as a subject 1211 (when attention is given), the contents of the captured image may be important, and therefore, higher priority is given to the image quality, and the image data (scalable encoded data) are stored with a higher quality.

Whether the state is normal or attention is given thereto may be determined by, for example, causing the scalable encoded data memory device 1202 to analyze the image. The image-capturing device 1201 may make determination, and may transmit the determination result to the scalable encoded data memory device 1202.

The determination criteria for determining whether the state is normal or attention is given thereto is not particularly limited, and the content of the image adopted as determination criteria is not particularly limited. It is to be understood that the condition other than the content of the image may be adopted as determination criteria. For example, switching can be done in accordance with the magnitude, the waveform, and the like of the collected audio, switching can be done on every predetermined period of time, and switching can be done in response to a command given from the outside such as user's command.

In the above explanation, for example, two states which are the normal state and the attention-given state are switched, but the number of states may be any given number. For example, three or more states such as normal state, less great attention-given state, attention-given state, and great attention-given state may be switched. However, the upper limit number of the state being switched depends on the number of layers of scalable encoded data.

The image-capturing device 1201 may determine the number of layers of scalable encoding in accordance with the state. For example, in normal state, the image-capturing device 1201 may generate the scalable encoded data (BL) 1222 in the base layer which are low quality and have less amount of data, and may provide the scalable encoded data (EL) 1222 in the base layer to the scalable encoded data memory device 1202. For example, when attention is given, the image-capturing device 1201 may generate the scalable encoded data (BL+EL) 1221 in the base layer which are high quality and have much amount of data, and may provide the scalable encoded data (BL+EL) 1221 in the base layer to the scalable encoded data memory device 1202.

In the above explanation, the monitor camera has been explained as an example, but the purpose of the image-capturing system 1200 is not particularly limited, and is not limited to the monitor camera.

Ninth Embodiment

Other Examples of Embodiments

In the above explanation, examples of devices and systems to which the present disclosure is applied have been explained, but the present disclosure is not limited thereto. The present disclosure may also be carried out as any kind of configurations implemented on a device constituting such devices or systems, for example, a processor serving as a system LSI (Large Scale Integration), a module using multiple processors and the like, a unit using multiple modules and the like, and a set having other functions in addition to the unit (more specifically, a configuration of a portion of the device).

(Example of Configuration of Video Set)

Figure 35:
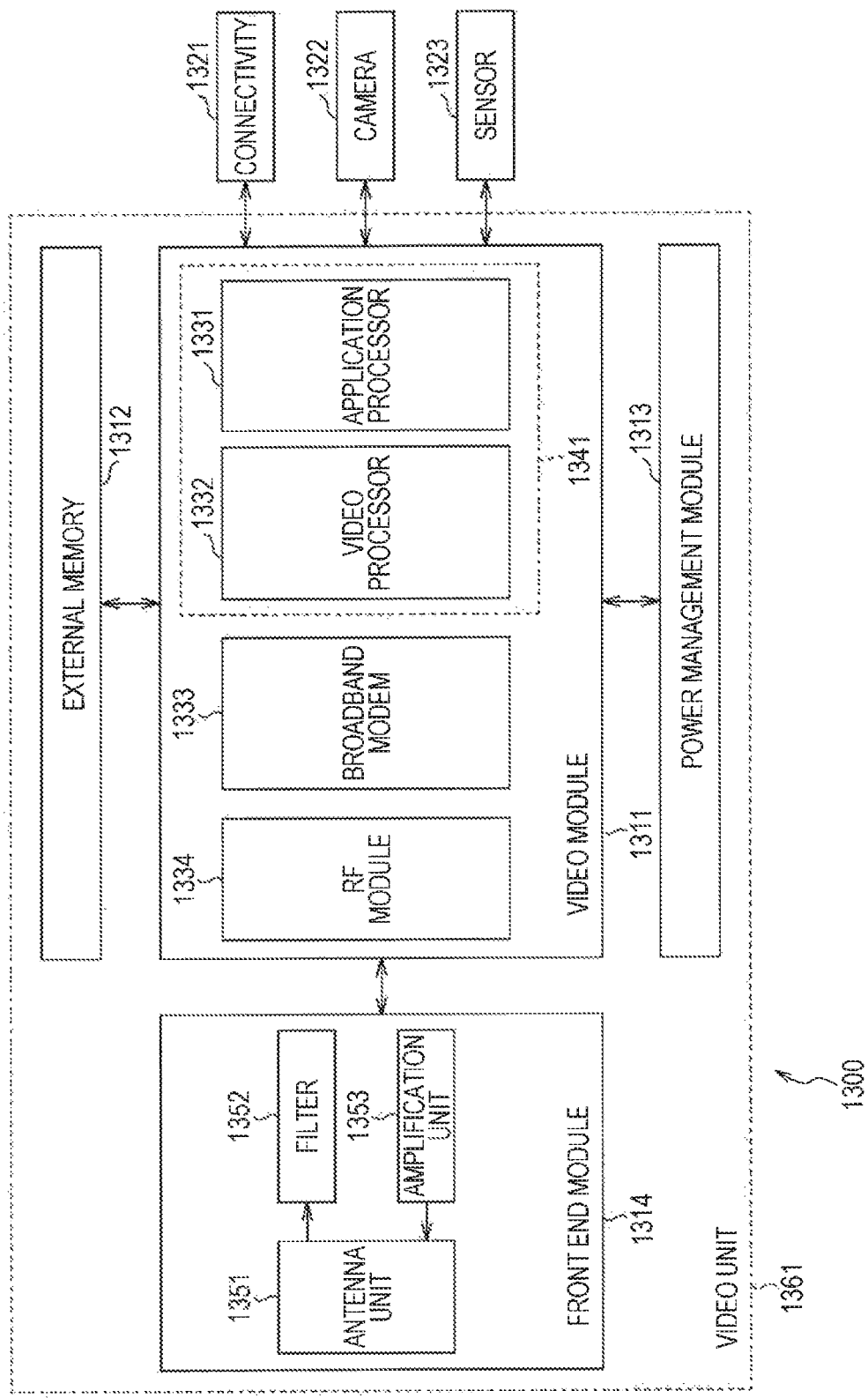
FIG. 35 illustrates an example of a schematic configuration of a video set to which the present disclosure is applied.

An example where the present disclosure is carried out as a set will be explained with reference to FIG. 35. FIG. 35 illustrates an example of a schematic configuration of a video set to which the present disclosure is applied.

In recent years, electronic devices have more and more functions, and when a part of the configuration is carried out as sales, supply, and the like during the development and manufacturing, the present disclosure is carried out in many cases not only as the configuration having a single function but also as a combination of multiple configurations having related functions and a single set having multiple functions.

The video set 1300 as shown in FIG. 35 is configured to have many functions as described above, and is a combination made of a device having a function related to encoding and decoding of images (a function may have any one of encoding and decoding functions, or a function may have both of encoding and decoding functions) and a device having another function related to the function.

As shown in FIG. 35, the video set 1300 includes a module group such as a video module 1311, an external memory 1312, a power management module 1313, a front end module 1314, and the like, and a device having functions related to a connectivity 1321, a camera 1322, a sensor 1323, and the like.

The module is made by combining several component-like functions related to each other and making a component having similar functions. Specific physical configuration is not particularly limited, but, for example, the module may be considered to be made by integrating and arranging, on a circuit board and the like, electronic circuit elements such as multiple processors, resistors, capacitors, and the like having the functions and other devices. A new module may be considered to be made by combining the module with another module, a processor, and the like.

In the example of FIG. 35, the video module 1311 is made by combining the configurations having the functions related to the image processing, and includes an application processor, a video processor, a broadband modem 1333, and an RF module 1334.

The processor is made by integrating a configuration having a predetermined function on a semiconductor chip by SoC (System On a Chip), and is, for example, referred to as a system LSI (Large Scale integration) and the like. The configuration having the predetermined function may be a logic circuit (hardware configuration), may be a CPU, a ROM, a RAM, and the like and a program executed using the CPU, the ROM, the RAM, and the like(software configuration), or may be a combination of them both. For example, the processor may have a logic circuit, a CPU, a ROM, a RAM, and the like, and some of the functions may be realized by a logic circuit (hardware configuration), and the other functions may be realized by a program executed by the CPU(software configuration).

The application processor 1331 of FIG. 35 is a processor for executing the application related to the image processing. In order to achieve the predetermined function, the application executed by the application processor 1331 performs the arithmetic processing, and in addition, the application executed by the application processor 1331 can control, as necessary, the configuration in and out of the video module 1311 such as the video processor 1332.

The video processor 1332 is a processor having the function related to encoding/decoding of the image (any one of encoding and decoding or both of encoding and decoding).

The broadband modem 1333 is a processor (or module) for performing processing related to broadband communication via wired circuit or wireless circuit (or both of them) which is performed via a broadband communication circuit such as the Internet and a public telephone network. For example, the broadband modem 1333 converts data to be transmitted (digital signal) into an analog signal by digitally modulating the data, and converts the received analog signal by demodulating the received analog signal to convert the received analog signal into data (a digital signal). For example, the broadband modem 1333 can digitally modulate or demodulate any given information such as image data which are to be processed by the video processor 1332, a stream obtained by encoding the image data, an application program, setting data, and the like.

The RF module 1334 is a module for performing, for example, frequency conversion, modulation/demodulation, amplification, filter processing on an RF (Radio Frequency) signal transmitted/received via an antenna. For example, the RF module 1334 generates an RF signal by performing frequency conversion and the like on the baseband signal generated by the broadband modem 1333. For example, the RF module 1334 performs frequency conversion and the like on the RF signal received via the front end module 1314, thus generating a baseband signal.

As indicated by a dotted line 1341 in FIG. 35, the application processor 1331 and the video processor 1332 may be integrated to be configured as a single processor.

The external memory 1312 is a module provided outside of the video module 1311, and the external memory 1312 has a memory device used by the video module 1311. The memory device a the external memory 1312 may be realized by any physical configuration, but in general, the memory device of the external memory 1312 is often used for storing a large amount of data such as image data in units of frames, and therefore, the memory device of the external memory 1312 is preferably realized with a relatively inexpensive large capacity semiconductor memory such as a DRAM (Dynamic Random Access Memory).

The power management module 1313 manages and controls electric power supply to the video module 1311 (each element in the video module 1311).

The front end module 1314 is a module for providing a front end function to the RF module 1334 (a circuit at transmission/reception end at the antenna side). As shown in FIG. 35, the front end module 1314 includes, for example, an antenna unit 1351, a filter 1352, and an amplification unit 1353.

The antenna unit 1351 has an antenna for transmitting and receiving a radio signal and a configuration thereof. The antenna unit 1351 transmits a signal, which is provided from the amplification unit 1353, as a radio signal, and provides a received radio signal to the filter 1352 as an electric signal (RF signal). The filter 1352 performs filter processing and the like on the RF signal received via the antenna unit 1351, and provides the processed RF signal to the RF module 1334. The amplification unit 1353 amplifies the RF signal provided from the RF module 1334, and provides the RF signal to the antenna unit 1351.

The connectivity 1321 is a module having a function related to connection with the outside. The physical configuration of the connectivity 1321 is not particularly limited. For example, the connectivity 1321 has a configuration having a communication function other than the communication specification supported by the broadband modem 1333, an external input/output terminal, and the like.

For example, the connectivity 1321 may have a module having a communication function based on a radio communication specification such as Bluetooth (registered trademark), IEEE 802.11 (for example, Wi-Fi (Wireless Fidelity, registered trademark)), NFC (Near Field Communication), IrDA (InfraRed Data Association), and the like, and an antenna for transmitting and receiving a signal based on the standard. For example, the connectivity 1321 may have a module having a communication function based on a wired communication specification such as USB (Universal Serial Bus), HDMI (registered trademark) (High-Definition Multimedia Interface), and the like, and a terminal based on the standard. Further, for example, the connectivity 1321 may have other data (signal) transmission functions such as analog input/output terminals and the like.

It should be noted that the connectivity 1321 may include a device at a transmission destination of data (signal). For example, the connectivity 1321 may have a drive for reading and writing data from/to a recording medium such as a magnetic disk, an optical disk, a magneto-optical disk, or a semiconductor memory (including not only a drive for a removable medium, but also a hard disk, an SSD (Solid State Drive), a NAS (Network Attached Storage), and the like). The connectivity 1321 may have an output device for images and audio (a monitor, a speaker, and the like).

The camera 1322 is a module for having a function of image-capturing a subject and obtaining image data of the subject. The image data captured by the camera 1322 is provided to, for example, the video processor 1332, and the image data are encoded.

The sensor 1323 is, for example, a module having any given sensor function such as an audio sensor, an ultrasonic sensor, an optical sensor, an illumination sensor, an infrared sensor, an image sensor, a rotation sensor, an angle sensor, an angular velocity sensor, a speed sensor, an acceleration sensor, a tilt sensor, a magnetic identification sensor, a shock sensor, a temperature sensor. The data detected by the sensor 1323 are, for example, provided to the application processor 1331, and the data are used by an application and the like.

A configuration explained as a module in the above explanation may be realized as a processor. On the contrary, a configuration explained as a processor in the above explanation may be realized as a module.

In the video set 1300 configured as described above, the present disclosure can be applied to the video processor 1332 as explained below. Therefore, the video set 1300 can be carried out as the set to which the present disclosure is applied.

(Example of Configuration of Video Processor)

Figure 36:
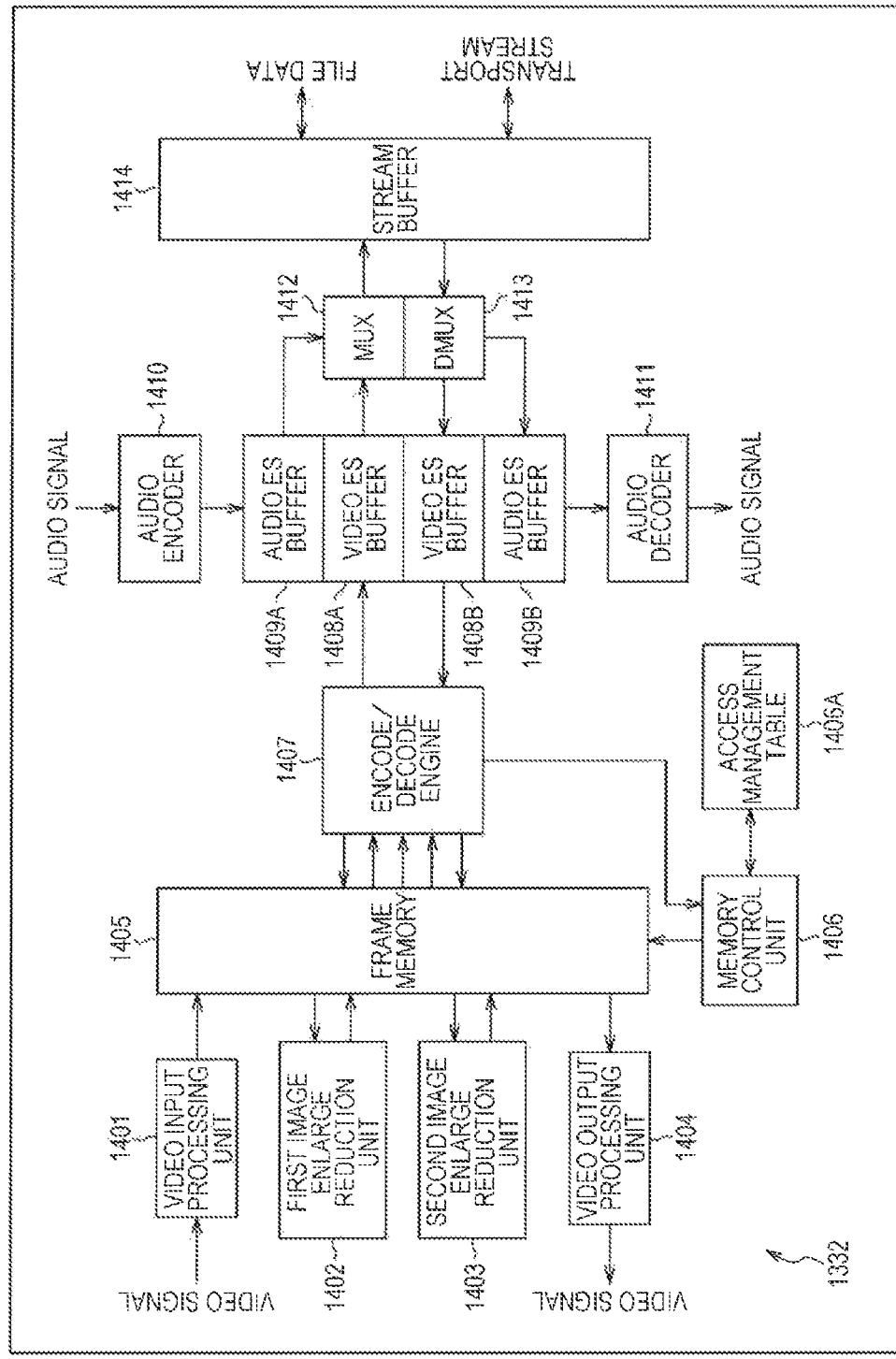
FIG. 36 illustrates an example of a schematic configuration of video processor to which the present disclosure is applied.

FIG. 36 illustrates an example of a schematic configuration of a video processor 1332 (FIG. 35) to which the present disclosure is applied.

In the example of FIG. 36, the video processor 1332 has a function of receiving input of the video signal and the audio signal, and encoding the signals according to a predetermined method, and a function of decoding the encoded video data and audio data and reproducing and outputting the video signal and the audio signal.

As shown in FIG. 36, the video processor 1332 includes a video input processing unit 1401, a first image enlarge reduction unit 1402, a second image enlarge reduction unit 1403, a video output processing unit 1404, a frame memory 1405, and a memory control unit 1406. The video processor 1332 includes an encode/decode engine 1407, video ES (Elementary Stream) buffers 1408A and 1408B, and audio ES buffers 1409A and 1409B. Further, the video processor 1332 includes an audio encoder 1410, audio decoder 1411, a multiplexing unit (MUX (Multiplexer)) 1412, a demultiplexing unit (DMUX (Demultiplexer)) 1413, and a stream buffer 1414.

The video input processing unit 1401 receives the video signal which is input from, for example, the connectivity 1321 (FIG. 35) and the like, and converts the video signal into digital image data. The first image enlarge reduction unit 1402 can perform, for example, format conversion of image data, enlarge reduction processing of images, and the like. For the image data, the second image enlarge reduction unit 1403 performs enlarge reduction processing of images in accordance with the format at the destination of output via the video output processing unit 1404, and performs enlarge reduction processing format conversion of image data, enlarge reduction processing of images, and the like, like the first image enlarge reduction unit 1402. The video output processing unit 1404 performs, for example, format conversion on the image data, conversion into an analog signal, and outputs the analog signal as reproduced video signal to, for example, the connectivity 1321 (FIG. 35) and the like.

The frame memory 1405 is a image data memory shared by the video input processing unit 1401, the first image enlarge reduction unit 1402, the second image enlarge reduction unit 1403, the video output processing unit 1404, and the encode/decode engine 1407. The frame memory 1405 is, for example, realized as a semiconductor memory such as a DRAM.

The memory control unit 1406 receives a synchronization signal from the encode/decode engine 1407, and controls write/read to/from the frame memory 1405 in accordance with access schedule for the frame memory written in the access management table 1406A. The access management table 1406A is updated by the memory control unit 1406 in accordance with processing executed by the encode/decode engine 1407, the first image enlarge reduction unit 1402, the second image enlarge reduction unit 1403, and the like.

The encode/decode engine 1407 performs encoding processing of image data and decoding processing of the video stream which is data obtained by encoding the image data.

For example, the encode/decode engine 1407 encodes the image data which are read from the frame memory 1405, and writes the image data, as a video stream, into the video ES buffer 1408A in order. For example, the video stream is read from the video ES buffer 1408B in order, and the video stream is decoded, and the video stream is written to the frame memory 1405 as image data in order. The encode/decode engine 1407 uses the frame memory 1405 as a work area in encoding and decoding thereof. The encode/decode engine 1407 outputs a synchronization signal to the memory control unit 1406 at a point in time when the processing is started for macro block, for example.

The video ES buffer 1408A buffers the video stream generated by the encode/decode engine 1407, and provides the video stream to the multiplexing unit (MUX) 1412. The video ES buffer 14089 buffers the video stream provided by the demultiplexing unit (DMUX) 1413, and provides the video stream to the encode/decode engine 1407.

The audio ES buffer 1409A buffers the audio stream generated by the audio encoder 1410, and provides the audio stream to the multiplexing unit (MUX) 1412. The audio ES buffer 14099 buffers the audio stream provided by the demultiplexing unit (DMUX) 1413, and provides the audio stream to the audio decoder 1411.

For example, the audio encoder 1410 digitally converts the audio signal which is input from, for example, the connectivity 1321 (FIG. 35) and the like, and encodes the audio signal in accordance with a predetermined method such as an MPEG audio method and AC3 (Audio Code number 3) method. The audio encoder 1410 writes the audio stream, which is the data obtained by encoding the audio signal, to the audio ES buffer 1409A in order. The audio decoder 1411 decodes the audio stream provided from the audio ES buffer 14099, and performs, for example, conversion into an analog signal, and provides it as the reproduced audio signal to, for example, the connectivity 1321 (FIG. 35) and the like.

The multiplexing unit (MUX) 1412 multiplexes the video stream and the audio stream. This multiplexing method (more specifically, the format of the bit stream generated by multiplexing) is not particularly limited. During this multiplexing, the multiplexing unit (MUX) 1412 may add predetermined header information and the like to the bit stream. Therefore, the multiplexing unit (MUX) 1412 can convert the format of the stream by multiplexing. For example, the multiplexing unit (MUX) 1412 multiplexes the video stream and the audio stream, thus converting it into the transport stream which is the bit stream in the format for transfer. For example, the multiplexing unit (MUX) 1412 multiplexes the video stream and the audio stream, thus converting them into data in a file format for recording (file data).

The demultiplexing unit (DMUX) 1413 demultiplexes the bit stream obtained by multiplexing the video stream and the audio stream in accordance with the method corresponding to the multiplexing by the multiplexing unit (MUX) 1412. More specifically, the demultiplexing unit (DMUX) 1413 extracts the video stream and the audio stream from the bit stream that is read out from the stream buffer 1414 (separates the video stream and the audio stream from each other). More specifically, the demultiplexing unit (DMUX) 1413 can convert the format of the stream by &multiplexing (inverse-conversion of conversion by the multiplexing unit (MUX) 1412). For example, the demultiplexing unit (DMUX) 1413 obtains the transport stream, which is provided from the connectivity 1321, the broadband modem 1333, and the like (both of which are shown in FIG. 35), via the stream buffer 1414, and demultiplexes the transport stream, thus capable of converting the transport stream into the video stream and the audio stream. For example, the demultiplexing unit (DMUX) 1413 obtains the file data, which are read from various kinds of recording media by, for example, the connectivity 1321 (FIG. 35), via the stream buffer 1414, and demultiplexes the file data, thus capable for converting the file data into the video stream and the audio stream.

The stream buffer 1414 buffers the bit stream. For example, the stream buffer 1414 buffers the transport stream provided by the multiplexing unit (MUX) 1412, and at a predetermined point in time or in response to a request and the like given from the outside, the stream buffer 1414 provides the transport stream to, for example, the connectivity 1321 and the broadband modem 1333 (both of which are shown in FIG. 35) and the like.

For example, the stream buffer 1414 buffers the file data provided from the multiplexing unit (MUX) 1412, and at a predetermined point in time or in response to a request and the like given from the outside, the stream buffer 1414 provides the file data to, for example, the connectivity 1321 (FIG. 35), and records the file data to various kinds of recording medium.

Further, the stream buffer 1414 buffers the transport stream obtained via, for example, the connectivity 1321 and the broadband modem 1333 (both of which are shown in FIG. 35), and at a predetermined point in time or in response to a request and the like given from the outside, the stream buffer 1414 provides the transport stream to the demultiplexing unit (DMUX) 1413.

The stream buffer 1414 buffers the file data which are read from various kinds of recording media by, for example, the connectivity 1321 (FIG. 35), and at a predetermined point in time or in response to a request and the like given from the outside, the stream buffer 1414 provides the file data to the demultiplexing unit (DMUX) 1413.

Subsequently, an example of operation of the video processor 1332 in such configuration will be explained. For example, the video signal which is input from the connectivity 1321 (FIG. 35) and the like into the video processor 1332 is converted by the video input processing unit 1401 into digital image data in a predetermined method such as 4:2:2 Y/Cb/Cr method and the like, and the digital image data are written to the frame memory 1405 in order. The digital image data are read by the first image enlarge reduction unit 1402 or the second image enlarge reduction unit 1403, which performs format conversion into a predetermined method such as 4:2:0 Y/Cb/Cr method and the like, and performs the enlarge reduction processing, and the digital image data are written back to the frame memory 1405 again. The image data are encoded by the encode/decode engine 1407, and written to the video ES buffer 1408A as the video stream.

The audio signal which is input from the connectivity 1321 (FIG. 35) and the like into the video processor 1332 is encoded by the audio encoder 1410, and is written as the audio stream into the audio ES buffer 1409A.

The video stream of the video ES buffer 1408A and the audio stream of the audio ES buffer 1409A are read by the multiplexing unit (MUX) 1412 and multiplexed to be converted into the transport stream, the file data, or the like. The transport stream generated by the multiplexing unit (MUX) 1412 is buffered to the stream buffer 1414, and thereafter, for example, the transport stream is output to the external network via the connectivity 1321, the broadband modem 1333, and the like (both of which are shown in FIG. 35). The file data generated by the multiplexing unit (MUX) 1412 are buffered to the stream buffer 1414, and thereafter, for example, the file data are output to the connectivity 1321 (FIG. 35) and the like, and the file data are recorded to various kinds of recording media.

For example, the transport stream which is input via the connectivity 1321, the broadband modem 1333 (both of which are shown in FIG. 35), and the like from the external network into the video processor 1332 is buffered in the stream buffer 1414, and thereafter, is demultiplexed by the demultiplexing unit (DMUX) 1413. The file data which are read from various kinds of recording media by, fix example, the connectivity 1321 (FIG. 35) and the like and input into the video processor 1332 are buffered in the stream buffer 1414, and thereafter, demultiplexed by the demultiplexing unit (DMUX) 1413. More specifically, the transport stream or the file data which are input into the video processor 1332 are separated by the demultiplexing unit (DMUX) 1413 into the video stream and the audio stream.

The audio stream is provided via the audio ES buffer 1409B to the audio decoder 1411, and the audio stream is decoded and the audio signal is reproduced. The video stream is written to the video ES buffer 1408B, and thereafter, the video stream is read and decoded in order by the encode/decode engine 1407, and written to the frame memory 1405. The decoded image data are subjected to enlarge reduction processing by the second image enlarge reduction unit 1403, and are written to the frame memory 1405. Then, the decoded image data are read by the video output processing unit 1404, and the format thereof is converted into a predetermined method such as 4:2:2 Y/Cb/Cr method, and further, converted into the analog signal, whereby the video signal is reproduced and output.

When the present disclosure is applied to the video processor 1332 configured as described above, the present disclosure according to each of the above embodiments may be applied to the encode/decode engine 1407. More specifically, for example, the encode/decode engine 1407 may have the functions of the encoding device and the decoding device according to the first embodiment. By doing so, the video processor 1332 can achieve the same effects as the affects explained above with reference to FIGS. 1 to 17.

In the encode/decode engine 1407, the present disclosure (more specifically, the functions of the image coding device and the image decoding device according to each of the above embodiment(s) may be achieved by hardware such as a logic circuit, may be achieved by software such as an incorporated program, or may be achieved by them both.

(Another Example of Configuration of Video Processor)

Figure 37:
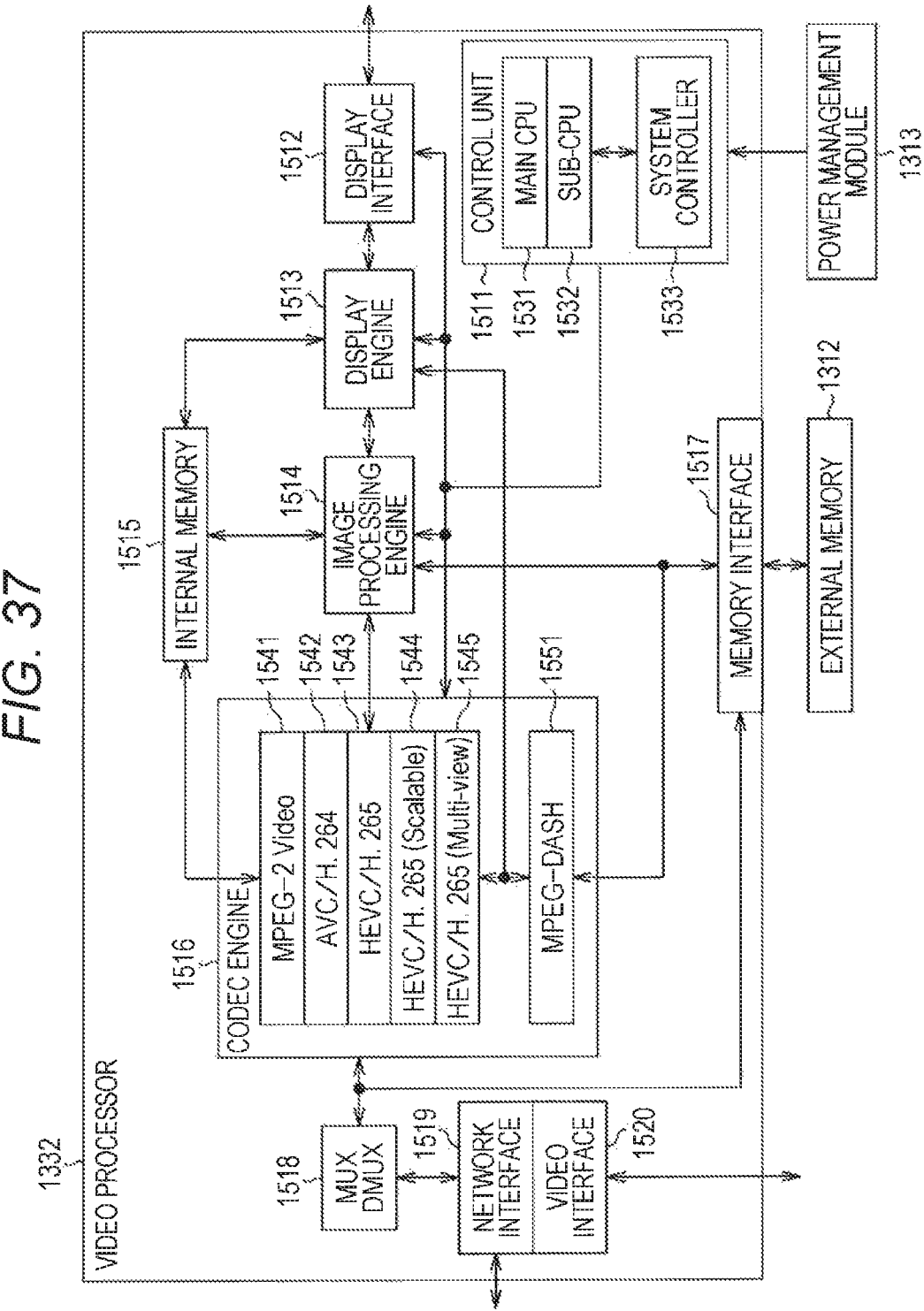
FIG. 37 illustrates another example of a schematic configuration of a video processor to which the present disclosure is applied.

FIG. 37 illustrates another example of a schematic configuration of the video processor 1332 to which the present disclosure is applied (FIG. 35). In the example of FIG. 37, the video processor 1332 has a function of encoding/decoding video data according to a predetermined method.

More specifically, as shown in FIG. 37, the video processor 1332 includes a control unit 1511, a display interface 1512, a display engine 1513, an image processing engine 1514, and an internal memory 1515. The video processor 1332 includes a codec engine 1516, a memory interface 1517, a multiplexing/demultiplexing unit (MUX DMUX) 1518, a network interface 1519, and a video interface 1520.

The control unit 1511 controls operation of each processing unit in the video processor 1332 such as the display interface 1512, the display engine 1513, the image processing engine 1514, and the codec engine 1516.

As shown in FIG. 37, the control unit 1511 includes, for example, a main CPU 1531, a sub-CPU 1532, and a system controller 1533. The main CPU 1531 executes programs and the like for controlling operation of each processing unit in the video processor 1332. The main CPU 1531 generates a control signal in accordance with the program and the like, and provides the control signal to each processing unit (more specifically, the main CPU 1531 controls operation of each processing unit). The sub-CPU 1532 plays an auxiliary role for the main CPU 1531. For example, the sub-CPU 1532 executes child process, sub-routine, and the like of the program and the like executed by the main CPU 1531. The system controller 1533 controls operation of the main CPU 1531 and the sub-CPU 1532 such as designating the program executed by the main CPU 1531 and the sub-CPU 1532.

The display interface 1512 outputs the image data to, for example, the connectivity 1321 (FIG. 35) and the like under the control of the control unit 1511. For example, the display interface 1512 converts the image data of the digital data into an analog signal, and outputs, as a reproduced video signal or still being the image data of the digital data, to a monitor device and the like of the connectivity 1321 (FIG. 35).

The display engine 1513 performs various kinds of transform processing such as format conversion, size conversion, color gamut conversion, and the like, under the control of the control unit 1511, on the image data, so as to be in conformity with hardware specification of the monitor device and the like which displays the image.

The image processing engine 1514 performs predetermined image processing, such as filter processing for image quality improvement, on the image data under the control of the control unit 1511.

The internal memory 1515 is a memory which is shared by the display engine 1513, the image processing engine 1514, and the codec engine 1516 and which is provided inside of the video processor 1332. The internal memory 1515 is used to exchange data between, for example, the display engine 1513, the image processing engine 1514, and the codec engine 1516. For example, the internal memory 1515 stores data provided from the display engine 1513, the image processing engine 1514, or the codec engine 1516, and as necessary (for example, in response to request), the data are provided to the display engine 1513, the image processing engine 1514, or the codec engine 1516. This internal memory 1515 may be realized by any memory device, but in general, the internal memory 1515 is often used to store a small amount of data such as parameters and image data in units of blocks, and therefore, the internal memory 1515 is preferably realized by a semiconductor memory of which capacity is relatively smaller but of which response speed is relatively faster (as compared with, for example, the external memory 1312) such as an SRAM (Static Random Access Memory).

The codec engine 1516 performs processing for encoding and decoding of image data. The method of encoding/decoding supported by the codec engine 1516 may be any method. The number of methods may be one, or may be two or more. For example, the codec engine 1516 may have a codec function for multiple encoding/decoding methods, and may encode image data or decode encoded data in accordance with one of the methods selected therefrom.

In the example as shown in FIG. 37, the codec engine 1516 includes, for example, MPEG-2 Video 1541, AVC/H.264 1542, HEVC/H.265 1543, HEVC/H.265 (Scalable) 1544, HEVC/H.265 (Multi-view) 1545, and, MPEG-DASH 1551 serving as function blocks of processing related to codec.

The MPEG-2 Video 1541 is a function block for encoding and decoding image data according to MPEG-2 method. The AVC/H.264 1542 is a function block for encoding and decoding image data according to the AVC method. The HEVC/14.265 1543 is a function block for encoding and decoding image data according to the HEVC method. The HEVC/H.265 (Scalable) 1544 is a function block for encoding and decoding image data in a scalable manner according to the HEVC method. The HEVC/H.265 (Multi-view) 1545 is a function block for multi-viewpoint encoding and multi-viewpoint decoding image data according to the HEVC method.

The MPEG-DASH 1551 is a function block for transmitting and receiving image data according to the MPEG-DASH (MPEG-Dynamic Adaptive Streaming over HTTP). The MPEG-DASH is a technique for streaming video using HTTP (HyperText Transfer Protocol), and is characterized in that an appropriate piece of multiple pieces of encoded data of which resolutions and the like prepared in advance are different from each other is selected in units of segments, and the piece of encoded data is transmitted. For example, the MPEG-DASH 1551 generates a stream based on a standard and perform transmission control of the stream, and the MPEG-2 Video 1541 to the HEVC/H.265 (Multi-view) 1545 explained above are used in encoding/decoding of image data.

The memory interface 1517 is an interface for the external memory 1312. The data provided from the image processing engine 1514 and the codec engine 1516 are provided via the memory interface 1517 to the external memory 1312. The data which are read from the external memory 1312 are provided via the memory interface 1517 to the video processor 1332 (the image processing engine 1514 or the codec engine 1516).

The multiplexing/demultiplexing unit (MUX DMUX) 1518 performs multiplexing and demultiplexing of various kinds of data of images such as bit streams, image data, and video signals of the encoded data. The method of the multiplexing/demultiplexing is not particularly limited. For example, during multiplexing, the multiplexing/demultiplexing unit (MUX DMUX) 1518 can combine multiple pieces of data into one piece, and in addition, the multiplexing/demultiplexing unit (MUX DMUX) 1518 can also add predetermined header information and the like to the data. During demultiplexing, the multiplexing/demultiplexing unit (MUX DMUX) 1518 can divide one piece of data into multiple pieces, and in addition, the multiplexing/demultiplexing unit (MUX DMUX) 1518 can also add predetermined header information and the like to each of the divided pieces of data. More specifically, the multiplexing/demultiplexing unit (MUX DMUX) 1518 can convert the format of data by multiplexing/demultiplexing. For example, the multiplexing/demultiplexing unit (MUX DMUX) 1518 multiplexes the bit stream, so that it can be converted into a transport stream which is a bit stream in a transfer format and data in a file format for recording (file data). It is to be understood that they can be inversely converted by demultiplexing.

The network interface 1519 is, for example, an interface for the broadband modem 1333, the connectivity 1321 (both of which are shown in FIG. 35), and the like. The video interface 1520 is, for example, an interface for the connectivity 1321, the camera 1322 (both of which are shown in FIG. 35), and the like.

Subsequently, an example of operation of the video processor 1332 will be explained. For example, when the video processor 1332 receives the transport stream from the external network via, for example, the connectivity 1321, the broadband modem 1333 (both of which are shown in FIG. 35), and the like, the transport stream is provided via the network interface 1519 to the multiplexing/demultiplexing unit (MUX DMUX) 1518 and demultiplexed, and decoded by the codec engine 1516. The image data obtained from decoding by the codec engine 1516 are subjected to, for example, predetermined image processing by the image processing engine 1514, and predetermined conversion by the display engine 1513, and the image data are provided via the display interface 1512 to, for example, the connectivity 1321 (FIG. 35) and the like, and the image is displayed on the monitor. For example, the image data obtained from decoding by the codec engine 1516 are encoded again by the codec engine 1516, and multiplexed by the multiplexing/demultiplexing unit (MUX DMUX) 1518 and converted into file data, and output via the video interface 1520 to, for example, the connectivity 1321 (FIG. 35) and the like, and recorded to various kinds of recording media.

Further, for example, the file data of encoded data obtained by encoding image data, which are read from a recording medium, not shown, by the connectivity 1321 (FIG. 35) and the like, are provided via the video interface 1520 to the multiplexing/demultiplexing unit (MUX DMUX) 1518 and demultiplexed, and are decoded by the codec engine 1516. The image data obtained from decoding by the codec engine 1516 are subjected to predetermined image processing by the image processing engine 1514, and predetermined conversion by the display engine 1513, and provided via the display interface 1512 to, for example, the connectivity 1321 (FIG. 35) and the like, and the image is displayed on the monitor. For example, the image data obtained from decoding by the codec engine 1516 are encoded again by the codec engine 1516, and multiplexed by the multiplexing/demultiplexing unit (MUX DMUX) 1518 to be converted into the transport stream, which is provided via the network interface 1519 to, for example, the connectivity 1321, the broadband modem 1333 (both of which are shown in FIG. 35), and the like, and transmitted to another device, not shown.

It should be noted that image data and other data between each processing unit in the video processor 1332 are exchanged using, for example, the internal memory 1515 and the external memory 1312. The power management module 1313 controls electric power supply to, for example, the control unit 1511.

When the present disclosure is applied to the video processor 1332 configured as described above, the present disclosure according to each of the above embodiments may be applied to the codec engine 1516. More specifically, for example, the codec engine 1516 may have a function block for realizing the encoding device and the decoding device according to the first embodiment. Further, for example, the codec engine 1516 performs this way, so that the video processor 1332 can achieve the same effects as the affects explained above with reference to FIGS. 1 to 17.

In the codec engine 1516, the present disclosure (more specifically, the functions of the image coding device and the image decoding device according to each of the above embodiments) may be achieved by hardware such as a logic circuit, may be achieved by software such as an incorporated program, or may be achieved by them both.

In the above explanation, the two examples of configurations of the video processor 1332 have been shown, but the configuration of the video processor 1332 is not particularly limited, and may be those other than the above two examples. This video processor 1332 may be configured as a single semiconductor chip, but may be configured as multiple semiconductor chips. For example, it may be a three-dimensionally stacked LSI in which multiple semiconductors are stacked. Alternatively, it may be realized by multiple LSIs.

(Example of Application to Device)

The video set 1300 can be incorporated into various kinds of devices for processing image data. For example, the video set 1300 can be incorporated into a television reception device 900 (FIG. 28), a cellular phone 920 (FIG. 29), a recording/reproducing device 940 (FIG. 30), an image-capturing device 960 (FIG. 31), and the like. When the video set 1300 is incorporated thereto, the device can achieve the same effects as the affects explained above with reference to FIGS. 1 to 17.

The video set 1300 can be incorporated into, for example, the terminal device such as the personal computer 1004, the audio visual device 1005, the tablet device 1006, the cellular phone 1007, and the like in the data transmission system 1000 of FIG. 32, the broadcast station 1101, the terminal device 1102, and the like in the data transmission system 1100 of FIG. 33, and the image-capturing device 1201, the scalable encoded data memory device 1202, and the like in the image-capturing system 1200 of FIG. 34. When the video set 1300 is incorporated thereto, the device can achieve the same effects as the affects explained above with reference to FIGS. 1 to 17.

Even if a part of each configuration of the video set 1300 explained above is incorporated, it can be carried out as the configuration to which the present disclosure is applied as long as it can include the video processor 1332. For example, only the video processor 1332 can be carried out as the video processor to which the present disclosure is applied. For example, as explained above, the video module 1311, the processor indicated by the dotted line 1341, and the like can be carried out as a processor, a module, and the like to which the present disclosure is applied. Further, for example, the video module 1311, the external memory 1312, the power management module 1313, and the front end module 1314 may be combined, and a video unit 1361 to which the present disclosure is applied may be carried out. In any configuration, the device can achieve the same effects as the affects explained above with reference to FIGS. 1 to 17.

More specifically, like the case of the video set 1300, any configuration can be incorporated into various kinds of devices processing image data as long as the video processor 1332 is included. For example, the video module 1311, the video unit 1361, or the processor indicated by the dotted line 1341, or the video processor 1332 can be incorporated into, for example, the television reception device 900 (FIG. 28), the cellular phone 920 (FIG. 29), the recording/reproducing device 940 (FIG. 30), the image-capturing device 960 (FIG. 31), the terminal device such as the personal computer 1004, the audio visual device 1005, the tablet device 1006, the cellular phone 1007, and the like in the data transmission system 1000 of FIG. 32, the broadcast station 1101, the terminal device 1102, and the like in the data transmission system 1100 of FIG. 33, and the image-capturing device 1201, the scalable encoded data memory device 1202, and the like in the image-capturing system 1200 of FIG. 34. When any configuration to which the present disclosure is applied is incorporated thereto, the device can achieve the same effects as the affects explained above with reference to FIGS. 1 to 17, like the case of the video set 1300.

In this specification, for example, various kinds of information such as the minimum TU size information and the skip TU information are multiplexed onto the encoded data, and are transmitted from the encoding side to the decoding side. However, the method for transmitting the information is not limited to the examples. For example, the information may not be multiplexed onto the encoded data, and may be transmitted or recorded as separate data associated with the encoded data. In this case, the term "associating" means allowing for linking, when decoding, between the image included in the bit stream (which may be a part of the image such as a slice or a block) and information corresponding to the image. More specifically, the information may be transmitted via a transmission path different from the encoded data. The information may be recorded to a recording medium different from the encoded data (or another recording area of the same recording medium). Further, for example, the information and the encoded data may be associated with each other in any given unit such as multiple frames, a single frame, or a part of a frame.

In this specification, the system means a set of multiple constituent elements (devices, modules (components), and the like), and it does not matter whether all the constituent elements are provided in the same housing or not. Therefore, multiple devices accommodated in separate housings and connected via a network and a single device including multiple modules accommodated in the single housing are systems.

The effects described in this specification are merely examples, and are not limited thereto. There may be other effects.

The embodiments of the present disclosure are not limited to the above embodiments. The embodiments of the present disclosure can be changed in various manners without deviating from the gist of the present disclosure.

For example, the present disclosure can also be applied to the encoding device and the decoding device of the encoding method other than the HEVC method which allows for the transform skip.

The present disclosure can also be applied to an encoding device and a decoding device used when an encoded stream is received via a network medium such as satellite broadcast, cable TV, the Internet, a cellular phone, and the like, or processing is performed on a memory medium such as an optical disk, a magnetic disk, or a flash memory.

Further, the present disclosure may be configured as a cloud computing in which a single function is processed in such a manner that it is distributed in a cooperating manner by multiple apparatuses via a network.

Each step explained in the above flowchart may be executed by a single apparatus, or may be executed by multiple apparatuses in a distributed manner.

Further, in a case where multiple pieces of processing are included in a single step, the multiple pieces of processing included in the step may be executed by a single apparatus, or may be executed by multiple apparatuses in a distributed manner.

It should be noted that the present technique can be configured as follows.

(1)

A decoding device including:

circuitry configured to decode a bit stream and generate a quantized value; and inversely quantize the generated quantized value by using a flat scaling list, in a case where a block size of a transform block to which a transform skip is applied is larger than a 4 by 4 block size.

(2)
The decoding device according to (1) above, wherein the flat scaling list corresponds to the block size of the transform block to which the transform skip is applied.

(3)
The decoding device according to (1) or (2) above, wherein when the block size of the transform block to which the transform skip is applied is an 8 by 8 block size, the generated quantized value is inversely quantized by using a flat scaling list of an 8 by 8 block size.

(4)
The decoding device according to any of (1) to (3) above, wherein when the block size of the transform block to which the transform skip is applied is a 16 by 16 block size, the generated quantized value is inversely quantized by using a flat scaling list of a 16 by 16 block size.

(5)
The decoding device according to any of (1) to (4) above, wherein when the block size of the transform block to which the transform skip is applied is a 32 by 32 block size, the generated quantized value is inversely quantized by using a flat scaling list of a 32 by 32 block size.

(6)
The decoding device according to any of (1) to (5) above, wherein the circuitry is further configured to determine whether the block size of the transform block is larger than the 4 by 4 block size and whether the transform skip is applied to the transform block,
wherein in a case where the block size of the transform block has been determined to be larger than the 4 by 4 block size and the transform skip has been determined to have been applied to the transform block, the generated quantized value is inversely quantized by using the flat scaling list corresponding to the block size of the transform block.

(7)
The decoding device according to (6) above, wherein the circuitry is further configured to determine whether the transform skip is applied to the transform block, by using a transform_skip_flag indicating whether the transform skip is applied to the transform block or not.

(8)
The decoding device according to any of (1) to (7) above, wherein the bit stream includes a residual data obtained by encoding a residual between an image and a prediction image of the image, and
the circuit is further configured to decode the residual data and generate the quantized value.

(9)
The decoding device according to any of (1) to (8) above, wherein the transform block is obtained by dividing, four times, a coding block in a recursive manner.

(10)
The decoding device according to any of (1) to (9) above, wherein the generated quantized value is inversely quantized by using a flat matrix that is set as the flat scaling list.

(11)
The decoding device according to any of (1) to (10) above, wherein the flat matrix has a quantization scaling factor set to a value of 15.

(12)
The decoding device according to any of (1) to (11) above, wherein in a case where the transform skip is applied, the generated quantized value is inversely quantized by using the flat scaling list, and
in a case where the transform skip is not applied, the generated quantized value is inversely quantized by using a default scaling list.

(13)
A decoding method, wherein a decoding device performs, via a processor, the following steps:
a decoding step that decodes a bit stream and generates a quantized value; and an inverse-quantization step that inversely quantizes the generated quantized value by using a flat scaling list, in a case where a block size of a transform block to which a transform skip is applied is larger than a 4 by 4 block size.

(14)
An encoding device including:
circuitry configured to
generate a quantized value by quantizing a transform block to which a transform skip is applied, by using a flat scaling list, in a case where a transform skip is applied to the transform block larger than 4 by 4 block size; and
encode the generated quantized value.

(15)
The encoding device according to (14) above, wherein the flat scaling list corresponds to a block size of the transform block to which the transform skip is applied.

(16)
The encoding device according to (14) or (15) above, wherein the quantized value is generated by quantizing the transform block to which the transform skip is applied, by using the flat scaling list of an 8 by 8 block size, in a case where the block size of the transform block to which transform skip is applied is an 8 by 8 block size.

(17)
The encoding device according to any of (14) to (16) above, wherein the quantized value is generated by quantizing the transform block to which the transform skip is applied, by using the flat scaling list of a 16 by 16 block size, in a case where the block size of the transform block to which transform skip is applied is a 16 by 16 block size.

(18)
The encoding device according to any of (14) to (17) above, wherein the quantized value is generated by quantizing the transform block to which the transform skip is applied, by using the flat scaling list of a 32 by 32 block size, in a case where the block size of the transform block to which transform skip is applied is a 32 by 32 block size.

(19)
The encoding device according to any of (14) to (19) above, wherein the circuitry is further configured to determine whether the block size of the transform block is larger than the 4 by 4 block size and whether the transform skip is applied to the transform block,
wherein in a case where the block size of the transform block has been determined to be larger than the 4 by 4 block size and the transform skip has been determined to have been applied to the transform block, the quantized value is generated by quantizing the transform block, by using the flat scaling list corresponding to the block size of the transform block.

(20)
The encoding device according to (19) above, wherein the circuitry is further configured to set a transform_skip_flag indicating whether the transform skip is applied to the transform block or not.

(21)
The encoding device according to any of (14) to (20) above, wherein the quantized value is generated by quantizing a residual between an image of the transform block and a prediction image of the image.

(22)

The encoding device according to any of (14) to (21) above, wherein the transform block is obtained by dividing, four times, a coding block in a recursive manner.

(23)

The encoding device according to any of (14) to (22) above, wherein the quantized value is generated by quantizing the transform block to which the transform skip is applied by using a flat matrix that is set as the flat scaling list.

(24)

The encoding device according to any of (14) to (23) above, wherein the flat matrix has a quantization scaling factor set to a value of 16.

(25)

The encoding device according to any of (14) to (24) above, wherein the transform skip is either applied or not applied to the transform block, based on a transform_skip_flag.

(26)

The encoding device according to any of (14) to (25) above, wherein in a case where the transform skip is applied, the quantized value is generated by quantizing the transform block by using the flat scaling list, and in a case where the transform skip is not applied, the quantized value is generated by quantizing the transform block by using a default scaling list.

(27)

The encoding device according to any of (14) to (26) above, wherein the quantized value is generated by quantizing the transform block by using the flat scaling list, hi a case where the block size of the transform block to which the transform skip is applied is larger than the 4 by 4 block size and a cost function value associated with a case of skipping a performing of the transform on the transform block is less than a cost function value associated with a case of not skipping the performing of the transform on the transform block.

(28)

An encoding method, wherein an encoding device performs, via a processor, the following steps:

a quantization step that generates a quantized value by quantizing a transform block to which a transform skip is applied, by using a flat scaling list, in a ease where a transform skip is applied to the transform block larger than a 4 by 4 block size; and an encoding step that encodes the generated quantized value.

REFERENCE SIGNS LIST

10 Encoding device
13 Transmission unit
34 Orthogonal transformation unit
35 Quantization unit
51 List setting unit
110 Decoding device
133 Inverse-quantization unit
134 Inverse-orthogonal transformation unit

The invention claimed is:

1. A decoding device comprising:
 circuitry configured to
 decode a bit stream and generate a quantized value,
 determine a minimum block size for which a transform skip is configured to be performed on a transform block,
 determine, for each transform block of a plurality of transform blocks in the bit stream, whether the transform skip is performed on the basis of a transform skip flag,
 inversely quantize the generated quantized value by using a flat scaling list corresponding to the minimum block size for each transform block that is the minimum block size,
 inversely quantize the generated quantized value using a non-flat matrix as a default scaling list for each transform block larger than the minimum block size when a value of the transform skip flag is 0, indicating that the transform skip is not performed, and
 inversely quantize the generated quantized value by using a flat scaling list corresponding to a block size larger than the minimum block size instead of the default scaling list for each transform block larger than the minimum block size when the value of the transform skip flag is 1, indicating that the transform skip is performed,
 wherein the minimum block size is a 4 by 4 block size,
 wherein the value of the transform skip flag is based on a cost function value, and
 wherein the flat scaling list had a quantization scaling factor set to a calue of 16.

2. The decoding device according to claim 1, wherein when the block size of the transform block to which the transform skip is applied is an 8 by 8 block size and the value of the transform skip flag is 1, the generated quantized value is inversely quantized by using a flat scaling list of an 8 by 8 block size.

3. The decoding device according to claim 1, wherein when the block size of the transform block to which the transform skip is applied is a 16 by 16 block size and the value of the transform skip flag is 1, the generated quantized value is inversely quantized by using a flat scaling list of a 16 by 16 block size.

4. The decoding device according to claim 1, wherein when the block size of the transform block to which the transform skip is applied is a 32 by 32 block size and the value of the transform skip flag is 1, the generated quantized value is inversely quantized by using a flat scaling list of a 32 by 32 block size.

5. The decoding device according to claim 1, wherein
 the bit stream includes a residual data obtained by encoding a residual between an image and a prediction image of the image, and
 the circuitry is further configured to decode the residual data and generate the quantized value.

6. The decoding device according to claim 1, wherein the transform block is obtained by dividing, four times, a coding block in a recursive manner.

7. A decoding method, implemented via a processor of a decoding device, the method comprising:
 decoding a bit stream and generating a quantized value;
 determining a minimum block size for which a transform skip is configured to be performed on a transform block;
 determining, for each transform block of a plurality of transform blocks in the bit stream, whether the transform skip is performed on the basis of a transform skip flag;
 inversely quantizing the generated quantized value by using a flat scaling list corresponding to the minimum block size for each transform block that is the minimum block size;

inversely quantizing the generated quantized value using a non-flat matrix as a default scaling list for each transform block larger than the minimum block size when a value of the transform skip flag is 0, indicating that the transform skip is not performed; and inversely quantizing the generated quantized value by using a flat scaling list corresponding to a block size larger than the minimum block size instead of the default scaling list for each transform block larger than the minimum block size when the value of the transform skip flag is 1, indicating that the transform skip is performed, wherein the minimum block size is a 4 by 4 block size, wherein the value of the transform skip flap is based on a cost function value, and wherein the flat scaling list had a quantization scaling factor set to a calue of 16.

8. The decoding device according to claim 1, wherein when the transform skip flag is 1 and the block size of the transform block is larger than the 4 by 4 block size, the circuitry inversely quantizes the generated quantized value by using the flat scaling list that is determined according to the block size of the transform block.

9. The decoding device according to claim 1, wherein the value of the transform skip flag is determined to be 0 in a case where the cost function value associated with a case of not performing the transform skip is less than the cost function value associated with a case of performing the transform skip, and wherein the value of the transform skip flag is determined to be 1 in a case where the cost function value associated with a case of not performing the transform skip is equal to or greater than the cost function value associated with a case of performing the transform skip.

* * * * *